(12) United States Patent     (10) Patent No.:     US 12,650,505 B2
Rezvani et al.     (45) Date of Patent:     Jun. 9, 2026

(54) MULTI-FREQUENCY RADAR ARRAY SYSTEMS AND SENSOR FUSION FOR SEEING AROUND CORNERS IN AUTONOMOUS DRIVING

(71) Applicant: Neural Propulsion Systems, Inc., Pleasanton, CA (US)

(72) Inventors: Behrooz Rezvani, Petaluma, CA (US); Babak Hassibi, San Marino, CA (US); Fredrik Brännström, Gothenburg (SE); Oguzhan Teke, Pasadena, CA (US)

(73) Assignee: Neural Propulsion Systems, Inc., Pleasanton, CA (US)

( * ) Notice: Subject to any disclaimer, the term of this patent is extended or adjusted under 35 U.S.C. 154(b) by 167 days.

(21) Appl. No.: 18/160,633

(22) Filed: Jan. 27, 2023

(65) Prior Publication Data

US 2023/0168359 A1     Jun. 1, 2023

Related U.S. Application Data

(63) Continuation of application No. PCT/US2021/043498, filed on Jul. 28, 2021.

(Continued)

(51) Int. Cl.
*G01S 13/46* (2006.01)
*G01S 13/00* (2006.01)
(Continued)

(52) U.S. Cl.
CPC ............ *G01S 13/46* (2013.01); *G01S 13/003* (2013.01); *G01S 13/865* (2013.01); *G01S 13/931* (2013.01); *G01S 2013/462* (2013.01)

(58) Field of Classification Search
CPC ...... G01S 13/46; G01S 13/003; G01S 13/865; G01S 13/931; G01S 2013/462; G01S 19/22
(Continued)

(56) References Cited

U.S. PATENT DOCUMENTS 4,884,229 A * 11/1989 Dekker ................... G06F 17/15
                                                        708/314
6,377,205 B1 * 4/2002 Eckersten ............... G01S 13/42
                                                        342/90

(Continued)

FOREIGN PATENT DOCUMENTS

CN        101765789 A      6/2010
JP        2004301649 A     10/2004
        (Continued)

OTHER PUBLICATIONS

Office Action from Japan Patent Office in App. No. 2023-506157, mailed May 27, 2025.

(Continued)

*Primary Examiner* — Nuzhat Pervin
(74) *Attorney, Agent, or Firm* — Krista S. Jacobsen; Jacobsen IP Law

(57)     ABSTRACT

Disclosed herein are systems, devices, and methods that may be used for autonomous driving and/or in autonomous vehicles. Some embodiments use an integrated wide-aperture multi-band radar subsystem and leverage the unique propagation properties of multiple bands and/or multiple sensor technologies to significantly improve detection and understanding of the scenery and, in particular, to see around corners to identify non-line-of-sight targets. In some embodiments, at least one processor of the system is capable of jointly processing return (reflected) signals in multiple bands to provide high accuracy in a variety of conditions (e.g., weather). The disclosed radar subsystem can be used alone or in conjunction with another sensing technology, such as, for example, LiDAR and/or cameras.

23 Claims, 28 Drawing Sheets

Related U.S. Application Data

(60) Provisional application No. 63/092,336, filed on Oct. 15, 2020, provisional application No. 63/058,471, filed on Jul. 29, 2020.

(51) Int. Cl.
*G01S 13/86* (2006.01)
*G01S 13/931* (2020.01)

(58) Field of Classification Search
USPC .......................................................... 342/54
See application file for complete search history.

(56) References Cited

U.S. PATENT DOCUMENTS

| | | | | |
|---|---|---|---|---|
| 6,882,311 | B2 * | 4/2005 | Walker | H01Q 21/0025 |
| | | | | 342/368 |
| 7,079,071 | B2 * | 7/2006 | Ikeda | H03K 3/33 |
| | | | | 342/132 |
| 7,202,776 | B2 * | 4/2007 | Breed | B60W 30/16 |
| | | | | 340/557 |
| 7,504,984 | B1 * | 3/2009 | Mitra | G01S 13/87 |
| | | | | 342/132 |
| 7,609,198 | B2 * | 10/2009 | Chang | G01S 13/89 |
| | | | | 342/179 |
| 7,911,373 | B2 * | 3/2011 | Weinstein | G01S 13/4463 |
| | | | | 342/81 |
| 9,058,303 | B2 * | 6/2015 | Bouchard | G06N 5/043 |
| 9,097,800 | B1 * | 8/2015 | Zhu | G01S 13/931 |
| 9,229,100 | B2 * | 1/2016 | Lee | G01S 7/28 |
| 9,523,766 | B2 * | 12/2016 | Turbide | G01S 7/497 |
| 9,632,178 | B2 * | 4/2017 | Kim | G01S 7/527 |
| 9,739,881 | B1 * | 8/2017 | Pavek | G01S 13/865 |
| 9,791,561 | B2 * | 10/2017 | Rhee | G01S 13/42 |
| 9,921,305 | B2 * | 3/2018 | Cao | G01S 7/2927 |
| 9,958,379 | B1 * | 5/2018 | Zhu | G01S 17/08 |
| 10,054,678 | B2 * | 8/2018 | Mei | G05D 1/0238 |
| 10,365,374 | B2 * | 7/2019 | Murphy | G01S 3/043 |
| 10,585,171 | B2 * | 3/2020 | Oswald | G01S 13/87 |
| 10,670,708 | B2 * | 6/2020 | Kemmer | G01S 13/865 |
| 10,705,208 | B2 * | 7/2020 | Shtrom | G06V 10/774 |
| 10,866,304 | B1 | 12/2020 | Hassibi et al. | |
| 11,047,970 | B2 * | 6/2021 | Bharadwaj | G01S 13/343 |
| 11,169,253 | B2 * | 11/2021 | Shapiro | G01S 7/417 |
| 11,360,191 | B2 * | 6/2022 | Izadian | G01S 13/87 |
| 11,609,305 | B2 * | 3/2023 | Dvorecki | G01S 7/4026 |
| 11,782,126 | B2 * | 10/2023 | van Meurs | G01S 7/4026 |
| | | | | 342/113 |
| 11,789,135 | B2 * | 10/2023 | Zeng | G01S 13/0209 |
| | | | | 342/27 |
| 2006/0250294 | A1 * | 11/2006 | Zemany | G01S 13/003 |
| | | | | 342/126 |
| 2007/0181810 | A1 * | 8/2007 | Tan | G01S 7/4811 |
| | | | | 250/341.1 |
| 2011/0102234 | A1 * | 5/2011 | Adams | G01S 13/867 |
| | | | | 342/52 |
| 2011/0273321 | A1 * | 11/2011 | Joshi | G01S 13/003 |
| | | | | 342/27 |
| 2013/0113647 | A1 * | 5/2013 | Sentelle | G01S 13/04 |
| | | | | 342/22 |
| 2014/0302869 | A1 * | 10/2014 | Rosenbaum | H04W 4/026 |
| | | | | 455/456.1 |
| 2015/0168546 | A1 * | 6/2015 | Nakagawa | G01S 13/931 |
| | | | | 342/21 |
| 2017/0261602 | A1 * | 9/2017 | Olshansky | G01S 7/411 |
| 2017/0287334 | A1 * | 10/2017 | Slutsky | G01S 13/42 |
| 2018/0074161 | A1 * | 3/2018 | Rosenbaum | G01S 11/04 |
| 2018/0088224 | A1 * | 3/2018 | Kishigami | G01S 13/46 |
| 2018/0088230 | A1 * | 3/2018 | Hung | G01S 13/931 |
| 2018/0136309 | A1 * | 5/2018 | Lo Monte | G01S 5/0231 |
| 2018/0149736 | A1 * | 5/2018 | Alland | H01Q 21/28 |
| 2018/0188366 | A1 * | 7/2018 | Kemmer | A01F 15/0825 |
| 2018/0217230 | A1 * | 8/2018 | Martone | G01S 7/4008 |
| 2018/0294575 | A1 * | 10/2018 | Kirino | H01Q 1/2291 |
| 2018/0341007 | A1 * | 11/2018 | Fetterman | G01S 7/4972 |
| 2018/0356506 | A1 * | 12/2018 | Bilik | G01S 13/46 |
| 2019/0115670 | A1 * | 4/2019 | Kishigami | G01S 13/003 |
| 2019/0166505 | A1 * | 5/2019 | Zhao | H04W 16/18 |
| 2019/0187250 | A1 * | 6/2019 | Ru | G01S 7/4052 |
| 2019/0375425 | A1 * | 12/2019 | Harrison | B60W 30/08 |
| 2019/0391235 | A1 * | 12/2019 | Harrison | G01S 7/003 |
| 2020/0041612 | A1 * | 2/2020 | Harrison | G01S 7/40 |
| 2020/0086867 | A1 * | 3/2020 | Manocha | B60W 30/12 |
| 2020/0116850 | A1 * | 4/2020 | Santra | A61B 5/0507 |
| 2020/0124698 | A1 * | 4/2020 | Noujeim | G01S 13/931 |
| 2020/0174481 | A1 * | 6/2020 | Van Heukelom | G05D 1/0214 |
| 2020/0228272 | A1 * | 7/2020 | Soriaga | H04L 5/0048 |
| 2020/0258392 | A1 * | 8/2020 | Weissman | G01S 13/876 |
| 2020/0326411 | A1 * | 10/2020 | Zhou | G01S 7/415 |
| 2020/0386882 | A1 * | 12/2020 | Klein | G06Q 10/103 |
| 2021/0141078 | A1 * | 5/2021 | Ahmadloo | G01S 13/42 |
| 2021/0141092 | A1 * | 5/2021 | Chen | G01S 13/867 |
| 2021/0173055 | A1 * | 6/2021 | Jian | G01S 7/4808 |
| 2021/0199758 | A1 * | 7/2021 | Izadian | G01S 13/931 |
| 2022/0128649 | A1 * | 4/2022 | McCloskey | G01S 7/003 |
| 2022/0215508 | A9 * | 7/2022 | Harrison | G06N 3/045 |
| 2022/0317254 | A1 * | 10/2022 | Chen | G05D 1/024 |
| 2022/0373645 | A1 * | 11/2022 | Travnikar | G01S 13/42 |
| 2022/0373669 | A1 * | 11/2022 | Mannesson | G01S 13/42 |
| 2023/0161027 | A1 * | 5/2023 | Amihood | G01S 7/023 |
| | | | | 342/109 |
| 2023/0196510 | A1 * | 6/2023 | Harrison | G06N 20/00 |
| | | | | 382/100 |
| 2023/0314588 | A1 * | 10/2023 | Hoffmann | G01S 13/878 |
| | | | | 342/59 |
| 2024/0345216 | A1 * | 10/2024 | Tzagkas | G01S 7/4026 |

FOREIGN PATENT DOCUMENTS

| | | |
|---|---|---|
| JP | 2006177858 A | 7/2006 |
| JP | 2010060459 A | 3/2010 |
| JP | 2010096615 A | 4/2010 |
| JP | 2010139325 A | 6/2010 |
| JP | 2013160645 A | 8/2013 |
| JP | 2016535243 A | 11/2016 |
| JP | 2017203751 A | 11/2017 |
| JP | 2020052897 A | 4/2020 |
| JP | 2020515873 A | 5/2020 |
| WO | 2006123628 A1 | 11/2006 |
| WO | 2020009060 A1 | 1/2020 |

OTHER PUBLICATIONS

Badri Narayan Bhaskar, Gongguo Tang, and Benjamin Recht, "Atomic norm denoising with applications to line spectral estimation," Apr. 2012, Revised Feb. 2013.

Danial Ehyaie, "Novel Approaches to the Design of Phased Array Antennas," dissertation submitted in partial fulfillment of the requirement for the degree ofDoctor of Philosophy (Electrical Engineering) in The University of Michigan, 2011.

Dijana Tralic, Sonja Grgic, "Signal Reconstruction via Compressive Sensing," Proceedings ELMAR-2011, Sep. 14-16, 2011.

Emmanuel Candes and Benjamin Recht, "Simple Bounds for Recovering Low-complexity Models," Jun. 2011; revised Feb. 2012.

Emmanuel Candes and Terence Tao, "Decoding by Linear Programming," Dec. 2004.

Emmanuel J. Candès and Michael B. Wakin, "An Introduction To Compressive Sampling," IEEE Signal Processing Magazine, Mar. 2008.

Gianluigi Pillonetto et al., "Regularized linear system identification using atomic, nuclear and kernel-based norms: the role of the stability constraint," Jul. 2, 2015.

Guoshen Yu et al., "Audio Denoising by Time-Frequency Block Thresholding," IEEE Transactions on Signal Processing, vol. 56, No. 5, May 2008.

International Search Report and Written Opinion from PCT App. No. PCT/US2021/043498 (filed Jul. 28, 2021), mailed Feb. 24, 2022.

(56) References Cited

OTHER PUBLICATIONS

Laurent Condat, "Atomic Norm Minimization for Decomposition into Complex Exponentials," First version: Jan. 2016, enclosed version: Sep. 25, 2018.

Louis L. Scharf et al., "Sensitivity Considerations in Compressed Sensing," 2011 Asilomar Conference on Signals, Systems, and Computers, Pacific Grove, CA, Nov. 6-9, 2011.

M. Fazel et al., "Hankel Matrix Rank Minimization With Applications to System Identification and Realization," SIAM J. Matrix Anal. Appl., 34(3), 946-977 (2013).

Mark Weber, John Cho, James Flavin, Jeffrey Herd, and Michael Vai, "Multi-Function Phased Array Radar for U.S. Civil-Sector Surveillance Needs," 2005.

Matthew A. Herman and Thomas Strohmer, "High-Resolution Radar via Compressed Sensing," IEEE Transactions on Signal Processing, vol. 57, Issue: 6 , Jun. 2009, pp. 2275-2284.

Matthew Herman and Thomas Strohmer, "Compressed sensing radar," 2008 IEEE Radar Conference, May 26-30, 2008.

Mohammad Toghi et al., "Projection Onto Convex Sets (POCS) Based Signal Reconstruction Framework with an associated cost function," Feb. 11, 2014.

N. P. Waweru et al., "Performance Analysis of MUSIC, Root-MUSIC and ESPRIT DOA Estimation Algorithm," World Academy of Science, Engineering and Technology International Journal of Electronics and Communication Engineering vol. 8, No. 1, 2014.

Ousmane Abdoulaye Oumar et al., "Comparison between MUSIC and ESPRIT Direction of Arrival Estimation Algorithms for Wireless Communication Systems," The First International Conference on Future Generation Communication Technologies, London, UK, Dec. 12-14, 2012.

Parikshit Shah et al., "Linear System Identification via Atomic Norm Regularization," Apr. 3, 2012.

Parikshit Shah, "Atomic Norm Regularization for Signal and System Identification," 2012.

Reinhard Heckel, "Super-resolution MIMO radar," 2016 IEEE International Symposium on Information Theory, pp. 1416-1420, Jul. 2016.

Sean Victor Hum, "Radar Systems," Aug. 2018.

Shuang Li et al., "Atomic Norm Minimization for Modal Analysis from Random and Compressed Samples," Dec. 21, 2017.

Thomas Strohmer and Benjamin Friedlander, "Analysis of Sparse MIMO Radar," Applied and Computational Harmonic Analysis, vol. 37, Issue 3, Nov. 2014, pp. 361-388.

Thu L. N. Nguyen and Yoan Shin, "Detection and Estimation via Compressive Sensing," Dec. 2014.

Venkat Chandrasekaran et al., "The Convex Geometry of Linear Inverse Problems," Dec. 3, 2010; revised Feb. 24, 2012.

W. Xu, C. Gu, C. Li and M. Sarrafzadeh, "Robust Doppler radar demodulation via compressed sensing," Electronics Letters Oct. 25, 2012 vol. 48 No. 22.

Weiyu Xu et al., "Precise Semidefinite Programming Formulation of Atomic Norm Minimization for Recovering D-Dimensional (D >= 2) Off-the-Grid Frequencies," Dec. 2, 2013.

Y. Chi et al., "Harnessing Sparsity over the Continuum: Atomic Norm Minimization for Super Resolution," Aug. 26, 2019.

Yuejie Chi et al., "Compressive Two-Dimensional Harmonic Retrieval via Atomic Norm Minimization," IEEE Transactions on Signal Processing, vol. 63, No. 4, Feb. 15, 2015.

Yuejie Chi et al., "The Sensitivity to Basis Mismatch of Compressed Sensing for Spectrum Analysis and Beamforming," 2009.

Zhihui Zhu et al., "Super-Resolution in SAR Imaging: Analysis With the Atomic Norm," 2016 IEEE Sensor Array and Multichannel Signal Processing Workshop (SAM), Jul. 2016.

Communication pursuant to Article 94(3) EPC in App. No. 21762185. 3, mailed Jan. 27, 2025.

* cited by examiner

200

Start

202
Transmit plurality of
scanning signals

204
Collect plurality of
reflected signals

206
Determine categorization for
each of at least a subset of
plurality of reflected signals 208
Determine projected
position of at least
one target 210
Information about
stationary objects in
scene End

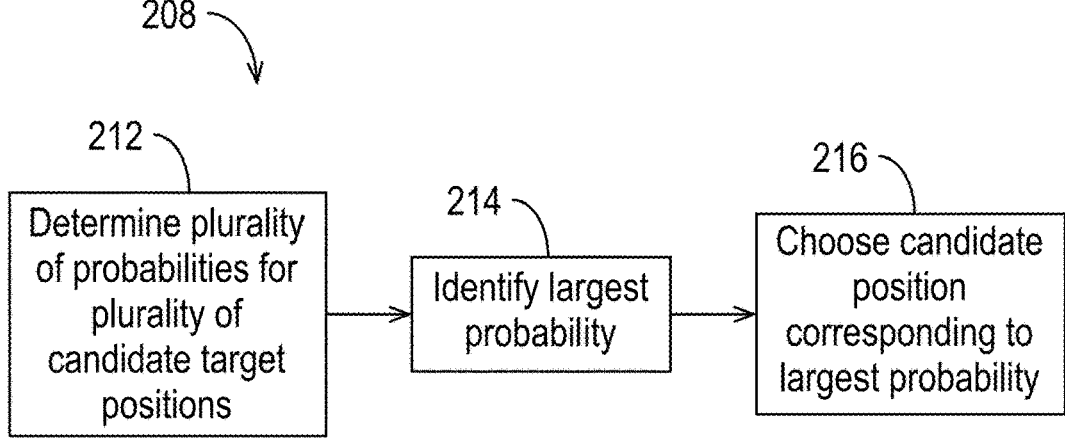

212
Determine plurality
of probabilities for
plurality of
candidate target
positions 214
Identify largest
probability 216
Choose candidate
position
corresponding to
largest probability

FIG. 26B

MULTI-FREQUENCY RADAR ARRAY SYSTEMS AND SENSOR FUSION FOR SEEING AROUND CORNERS IN AUTONOMOUS DRIVING

CROSS-REFERENCE TO RELATED APPLICATIONS

This application is a continuation of PCT Application No. PCT/US2021/043498, filed Jul. 28, 2021 and entitled "MULTI-FREQUENCY RADAR ARRAY SYSTEMS AND SENSOR FUSION FOR SEEING AROUND CORNERS IN AUTONOMOUS DRIVING", which published on Feb. 3, 2022 as WO 2022/026576 and claims priority to U.S. Provisional Application No. 63/058,471, filed Jul. 29, 2020 and entitled "Next Generation Sensor Technology For Autonomous Driving", and U.S. Provisional Application No. 63/092,336, filed Oct. 15, 2020 and entitled "Next Generation Sensor Technology for Autonomous Driving". All of the above-referenced applications are hereby incorporated by reference in their entireties for all purposes.

BACKGROUND

Many companies today are creating or using technology for autonomous driving (AD) applications (e.g., in autonomous vehicles, such as cars). An important consideration for AD systems is safety while operating in an almost-limitless set of complex and dynamic scenes. The goal in AD is to reduce the probability of accidents in all scenes that might be encountered by an autonomous vehicle (AV) to near zero, thereby providing much higher safety than can be achieved by human drivers.

Both line-of-sight (LOS) and non-line-of-sight (NLOS) targets (e.g., other vehicles, people, animals, buildings, etc.) can create hazards for vehicles equipped with AD systems. The ability to detect NLOS targets would be particularly valuable so that hidden targets that might cause collisions could be avoided. For example, in an urban environment, an oncoming car that is speeding toward an intersection might initially be occluded by a building. It would be desirable for an AD system on a vehicle approaching the intersection from another direction, which could be hit by the oncoming car, to detect the oncoming car before it is even visible and avoid an accident if the oncoming car fails to stop at a red light at the intersection. Adverse weather and other conditions such as rain, snow, fog, bright sunlight, dust, etc. can also present challenges to AD systems.

As a result of these challenges, even under ideal conditions, current AD solutions only provide partial L4 (high driving automation) and/or partial L5 (full driving automation) autonomy. Therefore, it is desirable to provide AD systems, methods, and devices that address disadvantages of current approaches.

BRIEF DESCRIPTION OF THE DRAWINGS

Objects, features, and advantages of the disclosure will be readily apparent from the following description of certain embodiments taken in conjunction with the accompanying drawings in which:

FIG. 26A is a flow diagram of an exemplary method of identifying the positions of targets in a scene in accordance with some embodiments.

FIG. 26B is a flow diagram of an example procedure that can be performed to carry out the determination the projected position of a target in accordance with some embodiments.

Figure 1:
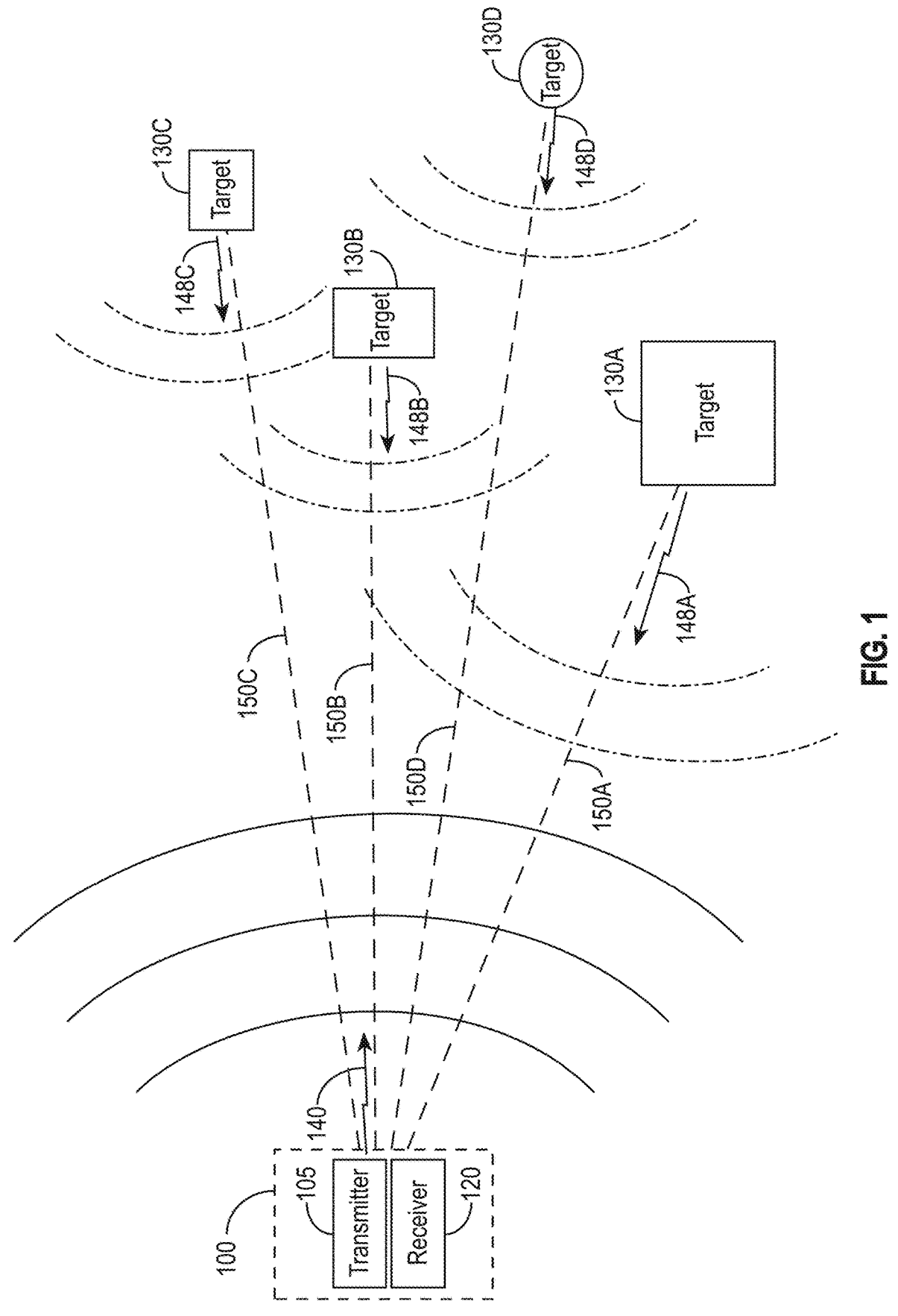
FIG. 1 illustrates a system in accordance with some embodiments.

To facilitate understanding, identical reference numerals have been used, where possible, to designate identical elements that are common to the figures. Some of the drawings illustrate multiple instances of certain elements (e.g., signals, targets, transmitters, receivers, array elements, etc.). The convention used herein is to denote specific instances of an element illustrated in a drawing by a reference numeral followed by a letter (e.g., A, B, C, etc.). When the specification refers generally to an element, only the reference numeral is used. Thus, as one example, the specification refers to, and the drawings illustrate, specific targets 130A, 130B, etc., and the specification also refers simply to a target 130 or targets 130. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

A number of types of sensors can be used in AD systems. For example, cameras are a well-understood, twentieth-century two-dimensional sensor technology that is inexpensive and easily integrated in convenient locations in or on a vehicle. Conventional cameras in stereo mode can be used to detect some objects and their respective speeds, but cameras have limited range and depth estimation. Thus, the accuracy of cameras is often below what is needed for safe AD systems, and cameras cannot detect NLOS targets. In addition, cameras do not work as well at night, in fog, in direct sunlight, and in other conditions, and they are also vulnerable to optical illusions. Standing alone, cameras are insufficient for AD. As a result, other sensor technologies have been developed to augment and/or enhance the performance of cameras to detect and/or track targets.

Two technologies capable of providing more accurate range estimates and more accurate depth information are radio detection and ranging (radar) and light detection and ranging (LiDAR). Radar systems transmit electromagnetic waves (e.g., at radio or microwave frequencies) and receive reflections of the waves off of a target. The target's position and speed can be determined from the reflections.

The performance of a radar system can be characterized by its range resolution and its angular resolution. (In this document, resolution refers to how close two objects must be (in range or angular separation) before they cannot be distinguished and appear as one.) The range resolution is the minimum difference in range that can be distinguished between two targets that are at the same bearing but different ranges. The angular resolution is the minimum separation at which two targets of the same size and at the same range can be distinguished. The range resolution of a radar system depends on the bandwidth of the modulated waveform, and the angular resolution (in both azimuth and elevation) depends on the physical aperture of the radar array itself. The accuracy of radar, that is, how accurately targets can be identified in range and angle, depends on the received signal-to-noise ratio (SNR), among other things. Current AD systems that use radar typically operate at 77 GHz and use linear frequency modulation (FM). These AD systems reportedly have sub-meter range resolution and sub-degree angular resolution.

Radar systems are fast, can operate over long distances, and do not need mechanical moving parts, but they can be inaccurate. For example, a radar system may mistake reflections off a small target as indicating a much larger target. Furthermore, higher-frequency radar bands are adversely affected by poor weather (e.g., rain, fog) and other impairments (e.g., dust), and lower-frequency radar bands provide less accuracy and use larger-aperture antennas.

LiDAR systems illuminate a target area or scene with pulsed light and measure how long it takes for pulses reflected by targets to be returned to an optical detector. Many LiDAR systems use lasers to transmit light pulses and measure the time of flight of a reflection off an object to a corresponding receiver (e.g., a photodiode). There are several variations of LiDAR, including spinning LiDAR and solid-state LiDAR. As the name suggests, a spinning LiDAR system has moving parts and physically scans the field-of-view. Solid-state LiDAR does not have moving parts. Another class of LiDAR is flash LiDAR, which has a single high-powered laser that illuminates the entire field-of-view of interest and a dense array of detectors in which each detector (pixel) corresponds to a particular azimuth and elevation angle. Flash LiDAR is similar to a digital camera, except that it is able to determine the time-of-flight corresponding to reflections observed at a given pixel. Yet another class of LiDAR, referred to as frequency-modulated continuous wave (FMCW) LiDAR, uses direct down-conversion of optical signals.

LiDAR systems are often superior to cameras in bad weather conditions because they supply their own photons. In addition, LiDAR systems can provide finer resolution than other types of systems, including radar, thereby providing good range, accuracy, and resolution, even for small targets. LiDAR systems are generally able to find and track LOS targets with a high probability of detection, but they can be stymied by occlusions, and their accuracy can be reduced by bad weather conditions. For LOS targets, LiDAR can achieve higher resolution than radar, but, as with cameras, the performance of a LiDAR system can deteriorate when its field-of-view (FOV) is affected by fog, rain, or bright sunlight. LiDAR systems typically have a range of 200-300 meters, but a larger range is often desirable for AD. In addition, LiDAR systems can be fragile. For example, spinning LiDAR is prone to mechanical failures, especially if hit by a foreign object, and flash LiDAR is dependent on the reliable operation of a single high-power laser and very accurate optics.

Depending on the frequency band in use, radar can be less susceptible than cameras to weather conditions, but, compared to LiDAR, it usually has an inferior range and angular resolution and accuracy.

Thus, for AD applications, cameras, radar, and LiDAR have different capabilities and properties, and each has drawbacks in at least some respects. The amount of information that can be extracted from each type of sensor is limited by physics, which can create dilemmas for an AD system that is attempting to avoid accidents and/or fatalities. It is the filling of gaps in information and the design of sensors that can complement one another that is of interest.

Disclosed herein are systems, devices, and methods that may be used for autonomous driving and/or in autonomous vehicles. Some embodiments use an integrated wide-aperture multi-band radar subsystem and leverage the unique propagation properties of multiple bands and/or multiple sensor technologies to significantly improve detection and understanding of the scenery and, in particular, to see around the corner to identify NLOS targets. Some embodiments include or use a radar subsystem that has a sparse array of transmit and receive elements (antennas). In some embodiments, the radar subsystem is capable of transmitting and receiving radar signals in multiple bands simultaneously, in which case it is sometimes referred to herein as "sparse wide-aperture multi-band" (SWAM) radar. In some embodiments, at least one processor of the system is capable of jointly processing return (reflected) signals in multiple bands to provide high accuracy in a variety of conditions (e.g., weather). The disclosed radar subsystem can be used alone or in conjunction with another sensing technology, such as, for example, LiDAR and/or cameras.

The disclosed systems, devices, and methods can be used in AD systems to provide higher performance than alternative approaches. For example, LiDAR systems may not be able to detect targets in certain conditions, including in fog or rain. The auto industry has dealt with the issue of fog by introducing mm-wave band radars, at 77 GHz, but this, too, has significant loss issues with rain. Moreover, alternative systems can suffer from significant mis-detection probability. As a result, in the United States, AVs equipped only with LiDAR and 77 GHz radar cannot practice autonomy 100% of the time except in desert states such as Arizona, where fog and heavy rain are extremely rare. This limitation prevents fully autonomous driving using these types of systems in most of Europe, Asia, and other rain-prone or fog-prone regions. Some embodiments of the disclosed systems, and in particular the disclosed SWAM radar, can overcome these issues.

Additionally, from the perspective of safety issues, such as being able to detect moving and stationary targets around corners, embodiments of the disclosed systems can use additional radar observations at multiple (e.g., lower) frequency bands. The system may use the full width of the car and a sparse array to achieve higher resolution than conventional AV radar systems. The disclosed embodiments also provide advantages in congested EM environments in which multiple vehicles operate their radars simultaneously. The existence of multiple bands adds extra dimensions in which to further orthogonalize the transmitted waveforms, through, for example, frequency hopping or time-sharing, which can be helpful to reduce the interference from other radars and thereby scale AD radars to urban traffic environments. Some embodiments are capable of providing up to 360° coverage under adverse conditions, thereby overcoming at least some of the disadvantages of conventional AD systems. In contrast to conventional radar systems or other approaches being considered for AD, some embodiments can provide near 100% observability and improved safety.

In some embodiments, a radar subsystem augments and synchronizes with a LiDAR subsystem, camera subsystem, and/or other information sources (e.g., GPS, maps, etc.). Some embodiments have access to at least two sources of information (e.g., radar, LiDAR, cameras, GPS coordinates, etc.), and the information obtained from the multiple sources is fused together to improve performance. The combining or merging of information about a scene from different sensing technologies is referred to herein as "sensor fusion."

Some embodiments of the disclosed systems, devices, and methods use multiple sensing technologies and sensor fusion to identify and track both LOS and NLOS targets. Some embodiments use SWAM radar along with advanced signal processing and probabilistic sensor fusion algorithms. In some embodiments, information obtained from different sensor types is combined to obtain a coherent understanding of the scenery. In some embodiments, the disclosed systems, devices, and methods exploit the unique propagation properties of electromagnetic (EM) waves in different frequency bands to achieve an improved understanding of the scenery in a variety of weather conditions. In particular, in some embodiments, the disclosed systems are able to see through and around corners, something that is not possible with conventional systems, thereby improving the safety of autonomous driving.

The disclosed methods, systems, and devices can provide a number advantages. For example, some embodiments are able to see into crossroads from a far distance when a vehicle approaches urban intersections, and to look for targets occluded by buildings. (It is to be understood that as used herein, the words "see" and "look for" refer generally to detecting presence, e.g., of an object or target that might be occluded by an obstacle.). Some embodiments have the ability to see around corners when the vehicle approaches rural intersections blocked by trees, wooded forests, or other vegetation. Some embodiments allow adaptive smart tracking by being able to see far greater distances (e.g., one kilometer) as compared to conventional systems (which see, e.g., only up to about 300 meters). Some embodiments provide dynamic performance with the ability to simultaneously track a large number of targets (e.g., 100 or more targets) at a high resolution rate (e.g., of 50 frames per second (FPS)).

The methods, systems, and devices disclosed herein can provide high resolution and high resolution/accuracy detection and tracking of a large number of targets in highly complex scenes encountered by AD systems. Moreover, the use of multi-band radar provides an advantage in congested environments in which multiple vehicles' radar systems are operating simultaneously. Embodiments of the disclosed systems are able to "orthogonalize" their waveforms and transmissions, both to reduce interference and to distinguish their return signals from those of other vehicles' radar systems. The existence of multiple bands adds extra dimensions in which to achieve such orthogonalization (e.g., through frequency hopping or time-sharing), which allows AD radar to be scaled to urban traffic environments.

The term "array element" is sometimes used herein to refer to an antenna that is included in an antenna array. An array element can be used to transmit signals, to receive signals, or to both transmit and receive signals. A "transmit element" is an array element that is capable of transmitting, and a "receive element" is an array element that is capable of receiving. A single array element may be capable of both transmitting and receiving, as described further below. The terms "antenna" and "antenna element" are used largely interchangeably herein. An antenna is one example of a sensor, and some of the description below refers to antennas and antenna elements, although some of the description uses the term sensor. As will be appreciated by those having ordinary skill in the art, however, the word "antenna" can often be replaced by "sensor."

FIG. 1 illustrates a system 100 in accordance with some embodiments. The system 100, which may be an AD system, comprises at least one transmitter 105 (or transmitter array 111, described further below) and at least one receiver 120 (or sensor array 121, described further below). For simplicity, the explanation of FIG. 1 refers to a single transmitter 105 and a single receiver 120, but it is to be understood that, as discussed in further detail below, a system 100 can include a transmitter array 111 and multiple receivers 120. Likewise, FIG. 1 illustrates the transmitter 105 and receiver 120 being collocated, but the transmitter(s) 105 and receiver(s) 120 are not required to be collocated. In some embodiments, described below, the transmitter(s) 105 and receiver(s) 120 are distributed over the body of a vehicle, such as a car. The positions of the transmit and receive elements can be arbitrary. In other words, they can have any coordinates in three-dimensional space. The transmit and receive elements do not have to be in a linear or planar array. In particular, when the antenna elements are distributed in the body of the vehicle, they may be in a curvilinear, or curviplanar, placement.

FIG. 1 illustrates four targets, 130A, 130B, 130C, and 13D, in the vicinity of the system 100. The target 130A is a distance 150A from the system 100, the target 130B is a distance 150B from the system 100, the target 130 is a distance 150C from the system 100, and the target 130D is a distance 150D from the system 100. In accordance with some embodiments, one objective of the system 100 is to estimate the distances 150A, 150B, 150C, and 150D. Another objective of the system 100 in some embodiments is to estimate the angular positions of the targets 130 (e.g., where on a circle having a radius equal to the distance 150A the target 130A is, where on a circle having radius equal to the distance 150B the target 130B is, etc.), which are referred to as (or can be determined from) the angles of arrival.

In operation, the transmitter 105 transmits a respective waveform 140. The waveform 140 may be a baseband signal modulated onto a carrier signal that has a specified frequency and phase. For ease of explanation, the details of modulation onto a carrier signal in the transmitter 105 and demodulation of the passband signal, whether to baseband or to an intermediate frequency, at the receiver 120 are not described in detail herein. These techniques are conventional and are well known in the art.

The transmitted waveform 140 propagates through the medium (e.g., free space, air, fog, rain, buildings, etc.), which causes attenuation and potentially distortion, and reflects off of targets 130. The reflected signal 148A (reflected by the target 130A), the reflected signal 148B (reflected by the target 130B), the reflected signal 148C (reflected by the target 130C), and the reflected signal 148D (reflected by the target 130D) propagate back to the receiver 120. The reflected signals 148A, 148B, 148C, and 148D are attenuated by the medium and arrive at the receiver 120 at some time after being transmitted, where the time depends on the speed at which signals propagate through the medium and whether the reflected signals 148A, 148B, 148C, and/or 148D are direct returns from line-of-sight (LOS) targets 130, through-building returns, or multi-path returns. The medium and/or receiver 120 may add noise to the reflected signals 148A, 148B, 148C, and 148D.

Figure 2:
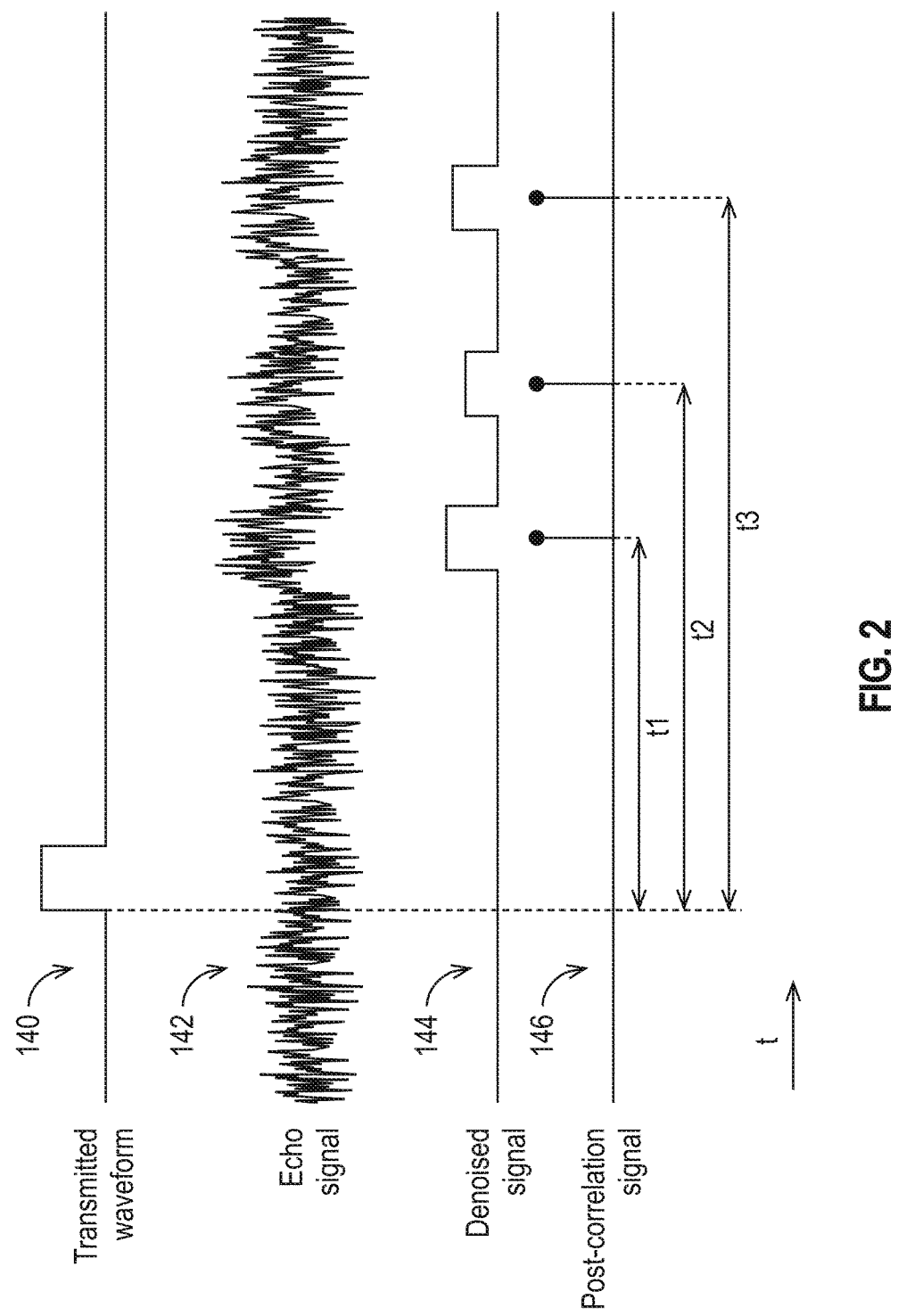
FIG. 2 provides a conceptual illustration of the relationships between various signals transmitted and received by the system in accordance with some embodiments.

FIG. 2 provides a conceptual illustration of the relationships between various signals transmitted and received by the system 100 in accordance with some embodiments. In the conceptual illustration of FIG. 2, the transmitted waveform 140 is illustrated as a simple pulse. As shown in FIG. 2, the received noisy waveform, referred to herein as the echo signal 142, is a superposition of the reflected signals (e.g., the reflected signals 148A, 148B, 148C, and 148D of FIG. 1) and includes contributions due to interference (e.g., multipath), noise, and other impairments. It is to be understood that when the transmitted waveform 140 has been modulated onto a carrier signal for transmission, the received echo signal 142 has both an amplitude and a phase, and, when converted to baseband, has both in-phase (I) and quadrature (Q) components. (FIG. 2 does not illustrate the phase of the echo signal 142 or of any of the contributions of the reflected signals 148A, 148B, 148C, and 148D.) The reflected signals 148 (e.g., 148A, 148B, 148C, and 148D in FIG. 2) may add constructively at some distances between the targets 130 and the system 100 and destructively at others. In the high-level, conceptual illustration of FIG. 2, the echo signal 142 has three distinct attenuated and distorted reflections, but they are obscured by noise. Each of these reflections corresponds to at least one target 130 at some distance from the system 100. One objective of the system 100 is to process the noisy echo signal 142 and identify targets 130 and their locations relative to the system 100. In some embodiments, the system 100 applies a sensor fusion procedure to identify the locations of the targets 130.

For targets 130 within the line of sight of the system 100, the time between when the transmitted waveform 140 is launched and the echo signal 142 is received allows the distance 150 to be calculated directly because the signals travel with a known speed (e.g., the speed of light when the medium is air). The distance 150 between the target 130 and the system 100, which can be computed from the measured propagation time, provides a circle, centered at the system 100's position, on which the target 130 lies.

In accordance with some embodiments disclosed herein, the receiver 120 processes the echo signal 142 using an optimization procedure to obtain a denoised signal 144. The receiver 120 then uses the denoised signal 144 to estimate the distances 150 from the system 100 at which targets 130 are positioned. The use of the denoised signal 144 to estimate the ranges of the targets 130 can improve the performance of the system 100 substantially with respect to conventional systems (e.g., by improving the SNR by 10-12 dB or more).

FIG. 2 illustrates, at a high level, the denoising procedure used in accordance with some embodiments. The receiver 120 can perform an optimization procedure, described in more detail below, using the echo signal 142, to obtain the denoised signal 144. The optimization procedure takes advantage of the knowledge that the ideal echo signal 142 (absent noise) is a structured signal that is the superposition of a relatively small number of time-shifted and attenuated copies of the transmitted waveform 140, even though the time-shifts and attenuations are unknown. The optimization denoises the signal in such a way that the resulting denoised signal 144 looks like the linear superposition of a few time-shifted and attenuated transmitted waveforms 140, while still being "close" to the received echo signal 142. The receiver 120 can then use the resulting denoised signal 144 to estimate the distances 150 from the system 100 at which targets 130 reside. In some embodiments, to estimate the distances 150, the receiver 120 performs a correlation of the transmitted waveform 140 and the denoised signal 144, and then uses the positions of peaks in the correlation result to estimate the distances 150. The correlation may be performed in the time domain or by performing an equivalent procedure in the frequency domain. FIG. 2 provides a conceptual illustration of the post-correlation signal 146, which is shown as having peaks at times t1, t2, and t3. Using the speed at which the transmitted signal 140 and the reflected signals 148 propagate through the medium, the distances 150 for LOS targets can be estimated from the positions of the peaks in the post-correlation signal 146.

As illustrated in FIG. 2, the number of peaks in the post-correlation signal may not be the same as the number of targets 130. For example, if multiple targets 130 are approximately equidistant from the system 100, their reflected signals 148 will arrive at substantially the same time at the receiver 120. Referring again to FIG. 1, the targets 130A and 130B are approximately the same distance from the system 100 (e.g., the distance 150A is approximately the same as the distance 150B). Thus, their reflected signals 148A and 148B arrive at the receiver 120 at approximately the same time. In FIG. 2, the reflected signals 148A and 148B correspond to the first "bump" (obscured by noise)

in the echo signal 142. As this example illustrates, the receiver 120 can identify, from the post-correlation signal 146, that there is at least one target 130 at the distance 150 corresponding to the peak at time t1, but may not be able to identify, solely from the post-correlation signal 146, how many targets are at that distance 150. In some embodiments, the system 100 includes multiple receiver sensors (e.g., an antenna array), each of which receives a respective echo signal 142. In some such embodiments, in addition to (or instead of) using the echo signal 142 to estimate the distances 150 of targets 130 from the system 100, the receiver 120 processes multiple echo signals 142 to determine the angles of arrival of the targets 130.

Figure 3:
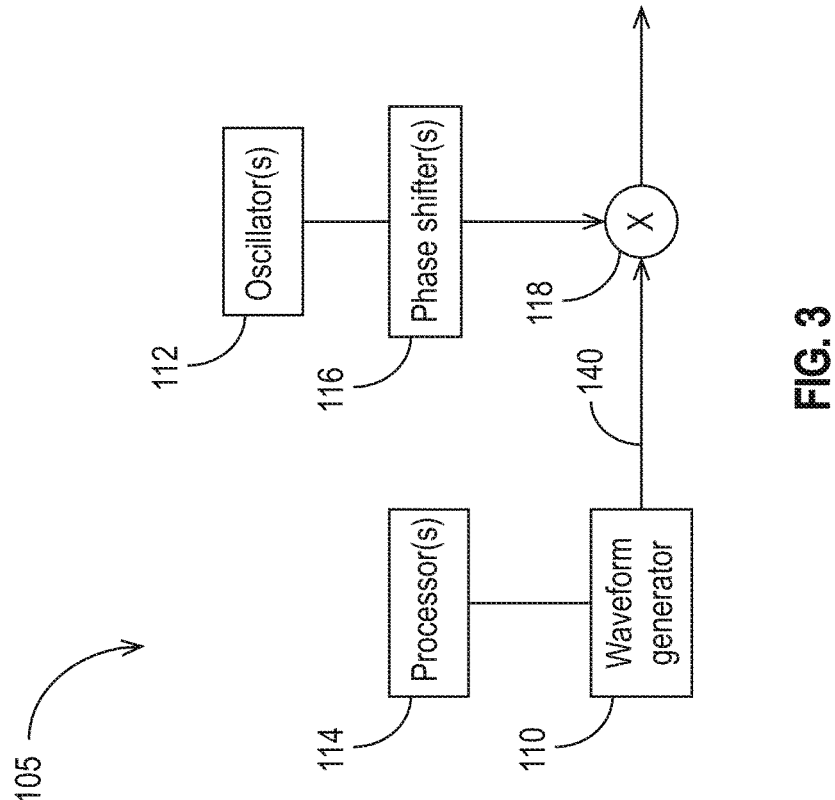
FIG. 3 illustrates certain components of a transmitter of a system in accordance with some embodiments.

FIG. 3 illustrates certain components of a transmitter 105 of a system 100 in accordance with some embodiments. The transmitter 105 comprises a waveform generator 110 and other components for transmitting the transmitted waveform 140. The transmitted waveform 140 may be any suitable waveform. For example, the transmitted waveform 140 may comprise a train of pulses, with each pulse having a specified duration or with different pulses having different durations. In some embodiments, the transmitted waveform 140 has good autocorrelation properties, meaning that the autocorrelation is small except near the origin. The better the autocorrelation properties, the better the performance of the correlation receiver, discussed below. To probe targets in an area, a transmitted waveform 140 may be comprised of one or more pulses having a first, short duration, and, to probe targets that are further away, one or more pulses having a second, longer duration. The embodiments herein are presented in the context of pulsed array processing, but it is to be understood that the principles disclosed can be applied to continuous-wave (CW)-types of systems (e.g., radar systems) as well.

The transmitter 105 may modulate the transmitted waveform 140 onto one or more carrier signals. For example, in the example embodiment shown in FIG. 3, the waveform generator 110 is coupled to a mixer 118. The mixer 118 modulates the transmitted waveform 140 onto a carrier signal.

The frequency of the carrier signal may remain the same all the time, or it may be different at different times. Likewise, the phase of the carrier signal may be constant, or it may change. The carrier signal may be generated by one or more oscillators 112, and its phase may be generated by one or more phase shifters 116. At least one processor 114 may control the oscillator(s) 112 and/or the phase shifter(s) 116.

In some embodiments, the system 100 is capable of transmitting in multiple frequency bands (e.g., in two or more of the L, S, X, C, K, Ka, Ku, W, or UHF bands). In such embodiments, the same transmitted waveform 140 may be transmitted in multiple frequency bands (e.g., disjoint or nonoverlapping bands), or different transmitted waveforms 140 may be transmitted in different frequency bands (e.g., a first transmitted waveform 140 may be transmitted in a first frequency band, and a second transmitted waveform 140 may be transmitted in a second frequency band). The existence of multiple bands adds extra dimensions in which to further separate the transmitted waveforms 140, a concept called "orthogonalization," through, for example, frequency hopping or time-sharing, which can reduce interference from other radar systems that may be operating nearby and/or allow the system 100 to be used in urban traffic environments.

Figure 4:
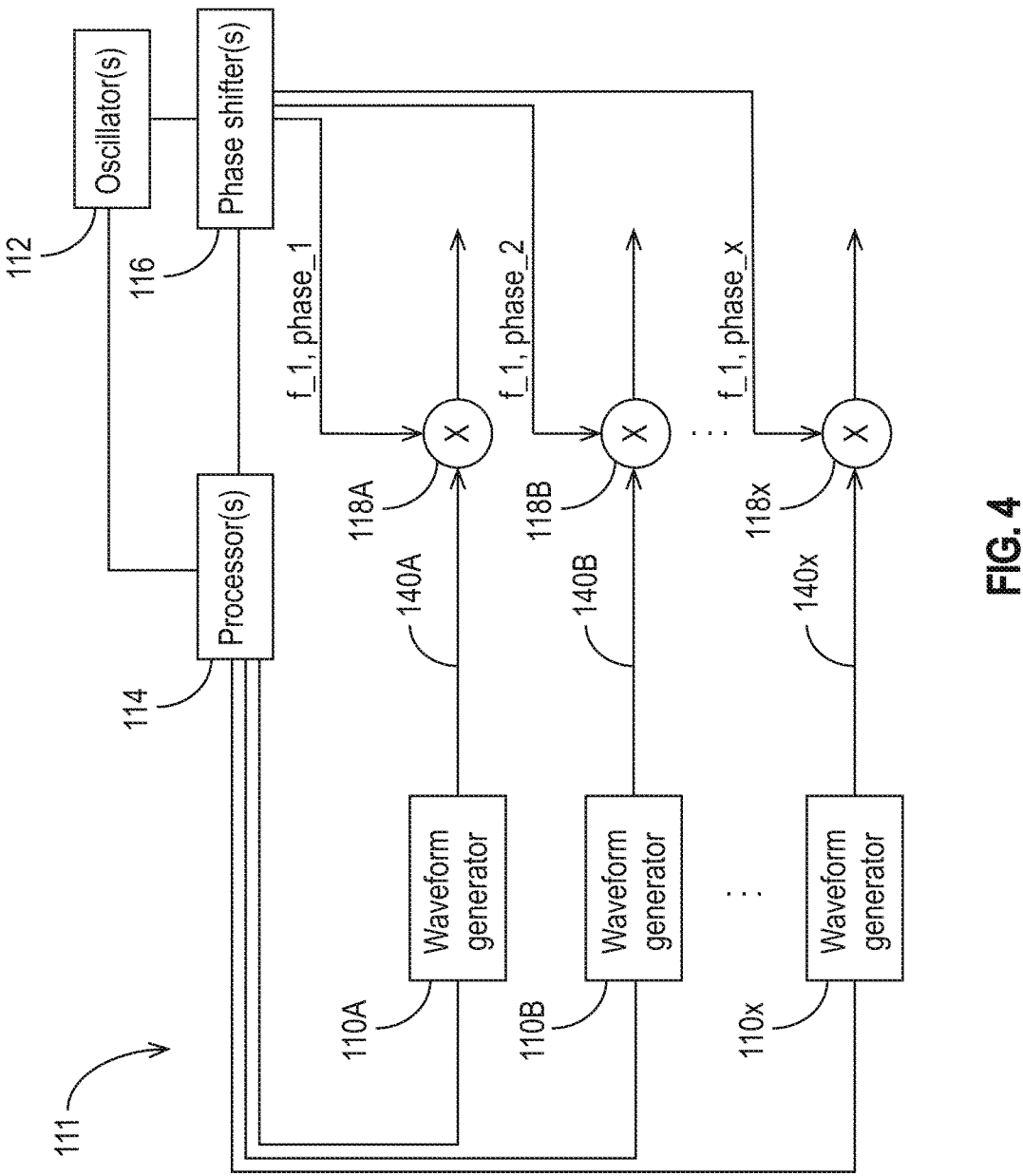
FIG. 4 illustrates certain components of a transmitter array of a system in accordance with some embodiments.

In some embodiments, the transmitting portion of the system 100 comprises a transmitter array 111. FIG. 4 illustrates certain components of a transmitter array 111 of a system 100 in accordance with some embodiments. The transmitter array 111 can be part of or can include an antenna array. The transmitter array 111 comprises waveform generators 110A, 110B, . . . , 110x and other components for transmitting instances of the transmitted waveforms 140A, 140B, . . . 140x, where "x" represents the number of waveform generators 110 and waveforms 140. In some embodiments, at every instant in time the transmitted waveforms 140A, 140B, . . . , 140x are identical to each other. Thus, in these embodiments, if multiple waveform generators 110A, 110B, . . . , 110x are active, they are generating the same physical transmitted waveform 140, but each waveform generator 110A, 110B, . . . , 110x may generate the transmitted waveform 140 independently from other waveform generators 110. In other embodiments, at least some of the transmitted waveforms 140A, 140B, . . . , 140x are different. Thus, in these embodiments, if multiple waveform generators 110A, 110B, . . . , 110x are active, at least some of them are generating different physical transmitted waveforms 140.

The transmitted waveform 140 may be any suitable waveform. For example, the transmitted waveform 140 may comprise a train of pulses, with each pulse having a specified duration or with different pulses having different durations. As explained above, in some embodiments the transmitted waveform 140 has good autocorrelation properties.

The transmitter array 111 may modulate each instance of the transmitted waveform 140 onto one or more carrier signals. For example, in the example embodiment shown in FIG. 4, each of the waveform generators 110 shown is coupled to a respective mixer 118 (i.e., waveform generator 110A is coupled to mixer 118A, waveform generator 110B is coupled to mixer 118B, etc.). The mixers 118 modulate the instances of the transmitted waveform 140 onto the carrier signals. At any particular time, each carrier signal has the same frequency, but each instance of the transmitted waveform 140 corresponding to a particular waveform generator 110 is modulated onto a carrier signal that has a different phase from the carrier signals onto which all other instances of the transmitted waveform 140 are modulated. For example, as shown in FIG. 4, the instance of the transmitted waveform 140A is modulated onto a carrier signal having a frequency "f_1" and a phase "phase_1," the instance of the transmitted waveform 140B is modulated onto a carrier signal having the same frequency "f_1" but a different phase, "phase_2," etc.

The carrier frequency of each carrier signal may remain the same, or it may be different at different times. Likewise, the phase of each carrier signal may be constant, or it may change. As shown in FIG. 4, the carrier signals may be generated by one or more oscillators 112, and the various phases for the carrier signals for the waveform generator(s) 110 may be generated by one or more phase shifters 116. At least one processor 114 may control the oscillator(s) 112 and/or the phase shifter(s) 116.

In some embodiments, the system 100 is capable of transmitting simultaneously in multiple frequency bands (e.g., in two or more of the L, S, X, C, K, Ka, Ku, W, or UHF bands) at the same time. In such embodiments, the same transmitted waveform 140 can be transmitted simultaneously in multiple frequency bands, or different transmitted waveforms 140 can be transmitted in different frequency bands (e.g., a first transmitted waveform 140 may be transmitted in a first frequency band, and a second transmitted waveform 140 may be transmitted in a second frequency band). In some embodiments, at any particular time, each carrier signal within a particular frequency band in use has the same frequency, but each instance of the transmitted waveform 140 corresponding to a particular waveform generator 110 transmitting within that band is modulated onto a carrier signal that has a different phase from the carrier signals onto which all other instances of the transmitted waveform 140 are modulated by other waveform generators 110 transmitting within that band. It is to be appreciated, as explained above, that different transmitted waveforms 140 can be transmitted simultaneously in the same frequency band.

Without loss of generality, it is assumed that there are P waveform generators 110 in a transmitter array 111. Although all P of the waveform generators 110 in a transmitter array 111 are able to transmit simultaneously, in some embodiments having a transmitter array 111, fewer than all of the P waveform generators 110 in the transmitter array 111 transmit at the same time. Moreover, the number of waveform generators 110 may be greater than, less than, or equal to the number of receiver sensors 122 (described below).

In some embodiments, a transmitter array 111 transmits an (up to) P-dimensional sensing vector. The sensing vector is the result of each waveform generator 110 generating a transmit waveform 140 (e.g., a pulse, a train of pulses, etc.) that is modulated onto a carrier signal having a particular carrier frequency, which is the same for all of the waveform generators 110 in the array. Preferably, the phases of the carrier signals transmitted by the (up to) P waveform generators 110 are different from one another. In some embodiments, the phases are randomly selected. For example, they could be truly random and changing as time proceeds, or they could be truly random and fixed for all time. Alternatively, they could be deterministic and selected according to some algorithm or criterion, potentially in coordination with the at least one processor 114. The objective of transmitting modulated carrier signals having different phases is to send energy into many directions at once. The different phases of the transmitted modulated carrier signals affect the amplitude and phase of the echo signal(s) 142 received by the receiver sensor(s) 122 (discussed below). In embodiments in which the system 100 includes multiple receivers (e.g., multiple receiver sensors 122), the differences in the amplitude and phase of each received echo signal 142 may be used to determine the angles of arrival of the targets 130.

It is to be understood that in embodiments using random or multiple carrier signal phases, the randomness or variability in the phases of the carrier signals is in the spatial sense. Each waveform generator 110 transmits the same average energy when the transmit waveforms 140 modulated onto the carrier signals are the same.

In some embodiments in which the system 100 comprises an array of P waveform generators 110, different subsets of the P waveform generators 110 transmit at different times. In some embodiments, the active waveform generators 110 transmit the same amounts of energy. Over time, the process of changing the subsets of active waveform generators 110 creates a randomized antenna gain pattern that is suitable to probe a three-dimensional environment.

Referring again to FIG. 4, the transmitter array 111 includes at least a first waveform generator 110A and a second waveform generator 110B. The first waveform generator 110A generates, for a time period, a first instance (140A) of the transmitted waveform 140, which is modulated onto a first carrier signal that has a specified carrier frequency and a first phase. The second waveform generator 110B generates, during the same time period and substantially synchronously with the first waveform generator 110A, a second instance (140B) of the transmitted waveform 140, which is modulated onto a second carrier signal that has the same specified carrier frequency but a second phase that is different from the first phase. The first and second phases may be randomly selected, or they may be deterministic. For example, the first and second phases may be selected as the result of a randomization procedure (e.g., using a pseudo-random sequence generator to determine randomized first and second phases, etc.). As another example, the first and second phases may be deterministic, meaning that they are selected according to an algorithm known to the first and second transmitters (e.g., a deterministic sequence through which the first and second phases are selected and/or changed as the system operates, e.g., by selecting a predefined phase from a look-up table, etc.).

The first and second waveform generators 110A, 110B may include or may be coupled to at least one processor 114 that is configured to execute at least one machine-executable instruction. As a result of executing the at least one machine-executable instruction, the at least one processor 114 may determine or choose the first and second phases (which, as explained above, may be implemented using the oscillator(s) 112 and phase shifter(s) 116).

In some embodiments in which the first and second waveform generators 110A, 110B include or are coupled to at least one processor 114, that at least one processor 114 controls one or more characteristics of the signals transmitted by the first and second waveform generators 110A, 110B. For example, the at least one processor 114 can control the shape and/or timing and/or duration of the transmit waveform(s) 140 modulated onto carrier signal(s) by each of the first and second waveform generators 110A, 110B. The at least one processor 114 may also, or alternatively, be able to control (either directly or in cooperation with other waveform generator 110 components that are well known to those of ordinary skill in the art) some aspect of the carrier signals, such as, for example, the carrier frequency, amplitude, and/or, as explained above, phase.

The system 100 may include other waveform generators 110 in addition to the first and second waveform generators 110A, 110B, as shown in FIG. 4. In such embodiments, each additional waveform generator 110x transmits, during the same time period and substantially synchronously with the first and second waveform generator 110A, 110B, a respective instance of the transmit waveform 140 modulated onto a respective carrier signal that has the same carrier frequency as the first and second carrier signals but a different respective phase. Each waveform generator 110 transmits a modulated carrier signal that has a phase that is different from every other modulated carrier signal's phase. In some embodiments, each of the respective instances of the transmitted waveform 140 is substantially identical to the first and second instances of the transmitted waveform 140.

Figures 5, 6:
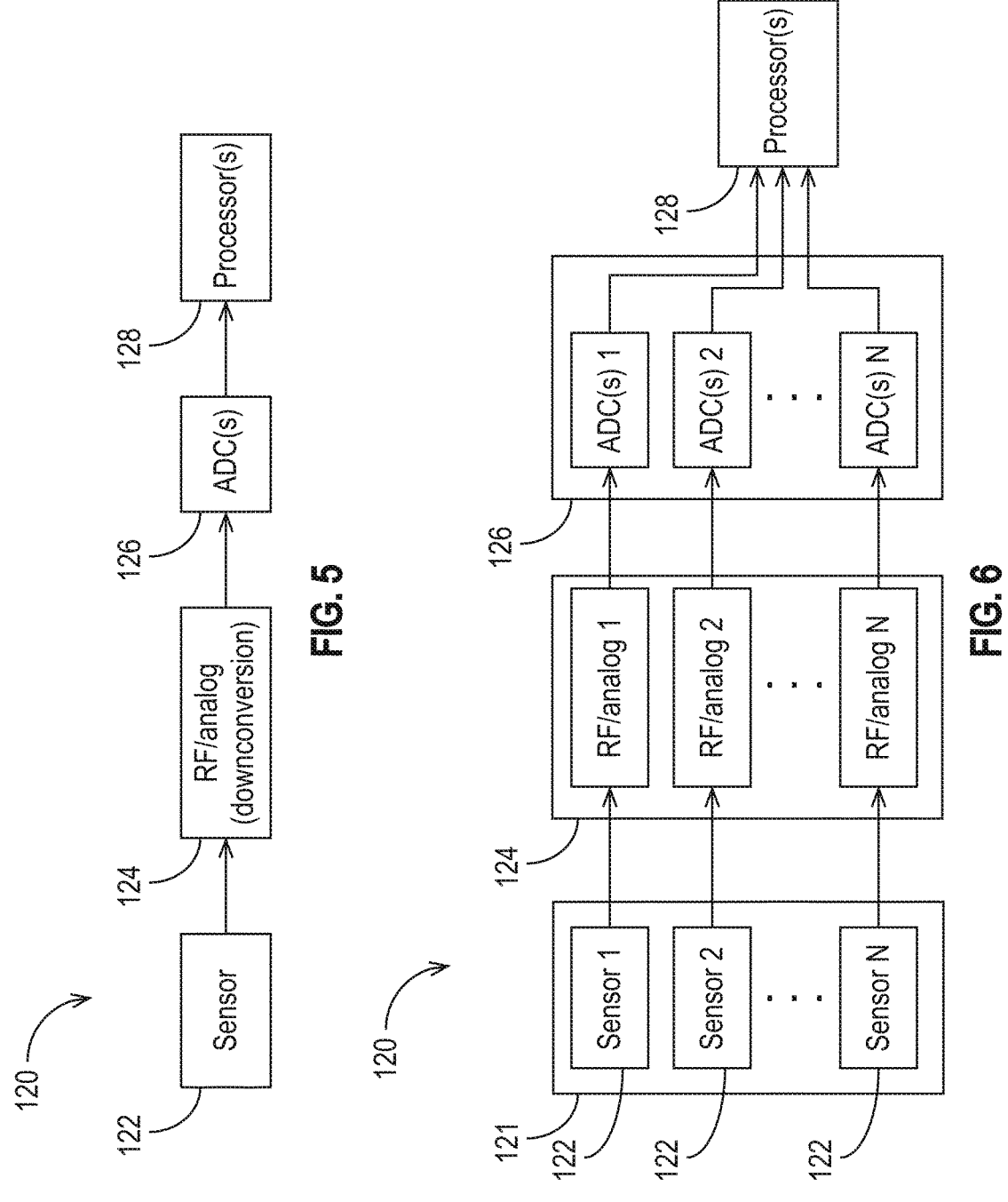
FIG. 5 is a high-level block diagram of a receiver in accordance with some embodiments.
FIG. 6 illustrates an example embodiment comprising multiple sensors included in a sensor array.

Referring again to FIG. 1, the system 100 also includes at least one receiver 120. FIG. 5 is a high-level block diagram of a receiver 120 in accordance with some embodiments. The receiver 120 includes at least one sensor 122, at least one radio-frequency (RF)/analog circuit 124 (e.g., to perform downconversion), at least one analog-to-digital converter (ADC) 126, and at least one processor 128. It is to be understood that the at least one receiver 120 may include components that are not illustrated in FIG. 5. As just one example, the at least one receiver 120 may include memory, and this memory may be coupled to the at least one processor 128 and/or the at least one ADC 126. It is also to be understood that the at least one processor 128 may be one and the same with the at least one processor 114 of the transmitter 105.

Each sensor 122 may comprise, for example, an antenna. In some embodiments, the sensor(s) 122 are capable of receiving signals in at least two frequency bands (e.g., more than one of the L, S, X, C, K, Ka, Ku, W, and UHF bands). Such sensor(s) 122 may be capable of receiving signals in more than one band at the same time.

Each RF/analog circuit 124 may be any conventional RF/analog circuit 124, which circuits are familiar to and well known by those having ordinary skill in the art. In some embodiments, each RF/analog circuit 124 downconverts a respective received echo signal 142 to baseband. In such embodiments, the at least one ADC 126 is configured to generate a set of in-phase (I) and quadrature (Q) samples of the echo signal 142 for further processing by the receiver 120. In other embodiments, each RF/analog circuit 124 is configured to downconvert a respective echo signal 142 to an intermediate frequency, and the ADC is configured to sample the echo signal 142 while it resides at the intermediate frequency. Still other embodiments do not include any RF/analog circuit 124, in which case the ADC samples the echo signal 142 directly, without any downconversion.

The term "analog-to-digital converter (ADC)" is used broadly to mean any component that converts the continuous-time, continuous-amplitude (analog) received echo signal(s) 142 to discrete-time, discrete-amplitude (digital) signals (e.g., samples). Such components are well known to those having ordinary skill in the art and are not discussed further herein.

FIG. 6 illustrates an example embodiment comprising multiple sensors 122 included in a sensor array 121 (e.g., an antenna array). In the embodiment shown in FIG. 6, a first sensor 122, labeled "Sensor 1," is coupled to a first RF/analog circuit 124, labeled "RF/analog 1," which is coupled to a first ADC 126, labeled "ADC 1," which is coupled to at least one processor 128. Similarly, a second sensor 122, labeled "Sensor 2," is coupled to a second RF/analog circuit 124, labeled "RF/analog 2," which is coupled to a second ADC 126, labeled "ADC 2," which is coupled to the at least one processor 128. As shown in FIG. 6, the receiver 120 can also include additional sensors 122, RF/analog circuits 124, and ADCs 126, which may be coupled to the at least one processor 128. As explained above, the RF/analog circuits 124 and the ADCs 126 are well known in the art. As also explained above, some embodiments do not include the RF/analog circuits 124.

In embodiments including multiple sensors 122, as explained previously, the sensors 122 need not be collocated (although they can be). Moreover, in embodiments that include three or more sensors 122, the sensors 122 need not be collinear (although they can be). Furthermore, the sensors 122 do not need to be disposed in any regular manner or with any particular spacing between them. For example, unlike in conventional systems, the distances between adjacent sensors 122 in a sensor array 121 need not be the same (although it can be). As a result, and as explained further below, the system 100 can be incorporated into a vehicle that has limited space and curvilinear surfaces.

The sensor(s) 122 (e.g., shown in FIG. 5 and FIG. 6) may be collocated with the waveform generator(s) 110 (e.g., shown in FIG. 4). In some embodiments, the waveform generator(s) 110 use the sensor(s) 122 to transmit signals. For example, the waveform generator(s) 110 and receiver(s) 120 can share some or all of the sensors 122 in a sensor array 121 (e.g., an antenna array). In embodiments in which at least some of the sensors 122 are collocated with at least some of the waveform generators 110, the at least one processor 128 (e.g., shown in FIG. 5 and FIG. 6) and the at least one processor 114 (e.g., shown in FIG. 4) may be the same at least one processor. In other words, at least one processor 114/128 may be configured to coordinate and manage the system 100's transmit and receive operations. The at least one processor 114/128 can also perform additional functions as discussed further below, such as sensor fusion.

In some embodiments, after transmission by the waveform generator(s) 110 of the transmit waveform(s) 140 (e.g., a wide beam), there is a listening period during which the at least one receiver 120 listens for the echo signal(s) 142. As explained above, in some embodiments, one or more waveform generator(s) 110 share an antenna (e.g., one of the sensors 122) with at least one receiver 120. In some such embodiments, if fewer than all waveform generators 110 are transmitting, these shared antennas may be used by the at least one receiver 120 to detect echo signals 142 while other antennas are being used by the one or more waveform generator(s) 110. It is to be understood that the number of antennas used by the waveform generator(s) 110 may be the same as or different from the number of sensors 122 used by the receiver 120.

As explained above, the range and accuracy (e.g., range resolution and angular resolution) are common metrics used to characterize the performance of AD systems. In addition to range and accuracy, other aspects of AD systems are of interest, such as, for example, the number of targets 130 that can be identified/detected and tracked (where a larger number is generally considered to be better), the size of point clouds (each point cloud being a collection of points that represent a three-dimensional shape or feature, from which range, angle, and velocity information can be determined) that can be handled by the perception engine (e.g., the at least one processor 114 and/or at least one processor 128), and the refresh rate (how many times per second the entire field-of-view is probed and the corresponding targets 130 are identified).

As explained above, the basic principle of radar operation is the transmission of EM waves (e.g., transmitted waveform 140) and the subsequent processing of the received scattered signal (e.g., reflected signals 148) for object detection. The accuracy of the detection procedure that processes the received scattered signals depends on an understanding of how EM waves propagate and are scattered. For AD applications, one goal of using radar either instead of or in addition to LiDAR is to compensate for LiDAR technology's shortfalls around physics of propagation and to solve some complex detection problems. Some of the challenges include scenes that include a large number of targets 130 at a time, a highly complex and dynamic environment, targets 130 located around corners (e.g., of buildings), and targets 130 obscured by vegetation and wooded areas. An objective for radar systems is to meet all of these challenges under various weather conditions while providing an angular resolution close to that of a LiDAR system.

In the automotive industry, millimeter-wave radar systems in the 77-81 GHz range have recently been introduced to augment LiDAR. One drawback of LiDAR systems and cameras is high signal loss in dense, low-visibility fog. For example, thick fog has a water liquid density of around 0.5 $g/m^3$ and a visibility of less than 50 m, which means that the light intensity attenuates by 10-15 dB over a 50 m range. In moderate fog, the water liquid density is about 0.05 $g/m^3$ and the visibility less than 200 m, meaning that the light intensity attenuates by 10-15 dB over 200 m. At 77 GHz (and lower frequency bands), the signal loss in thick and moderate fog is only a fraction of a dB per kilometer. Thus, for all practical purposes, millimeter-wave and lower frequency radars are not as affected by fog and can be used to compensate for the significant drop in performance of LiDAR due to fog.

Figure 7:
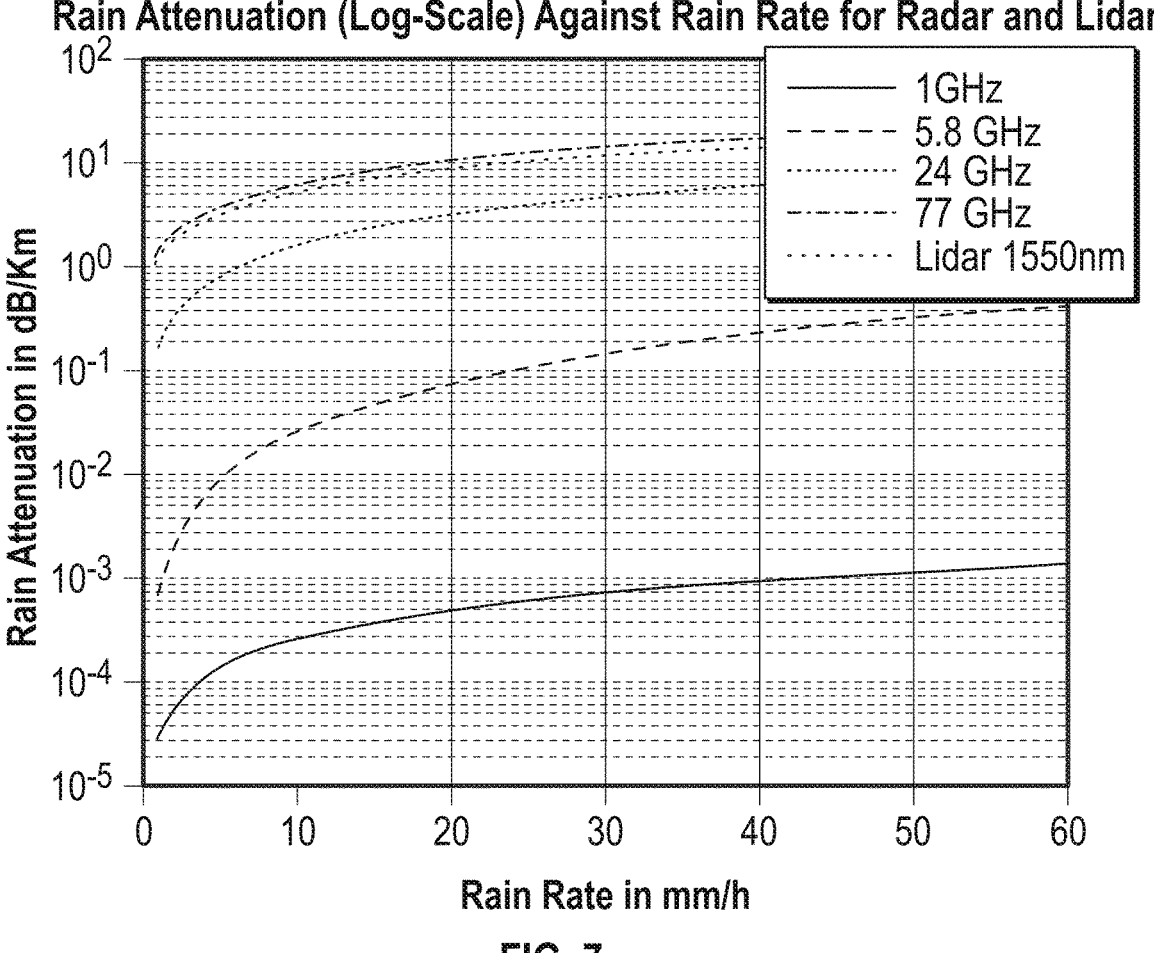
FIG. 7 is a plot showing the signal attenuation as a function of the rain rate.

Rain, however, can be more of a challenge for radar systems. There is a rich body of literature about EM wave propagation in different weather conditions, including rain. For example, the propagation loss due to heavy rain conditions (150 mm/h) can be measured and also theoretically computed for different frequency bands. Electromagnetic waves decay at 0.01 dB/km, 0.08 dB/km, 1.0 dB/km, 2.5 dB/km, and 12 dB/km at UHF, C, X, Ku, and Ka bands, respectively. FIG. 7 is a plot showing the signal attenuation (in dB/km) for 1550 nm LiDAR, as well as for 77 GHz, 24 GHz, 5.8 GHz, and 1 GHz radar as a function of the rain rate (in mm/hour). In heavy, moderate, and light showers, corresponding to around 50 mm/hour, 10 mm/hour, and 2 mm/hour, respectively, the signal attenuation for LiDAR and radar operating at 77 GHz is virtually identical: around 20 dB/km, 10 dB/km, and 5 dB/km, respectively. Thus, relative to a LiDAR system, a radar system operating at 77 GHz appears to offer no benefits in rain, and both systems are susceptible to moderate and heavy rain. The performance of radar systems at lower frequencies is better. In particular, radar systems operating 5.8 GHz and 1 GHz do not appear to be significantly susceptible to rain.

Despite being susceptible to rain-induced performance degradations, a radar system operating in, for example, the 77-81 GHz frequency band can address some of the drawbacks of radar systems operating at lower frequencies, including lower range and angular resolution. In these mm-wave frequencies, EM waves radiated from antenna arrays can have a narrow beamwidth and behave similarly to laser beams. Therefore, millimeter-wave radar systems can provide some of the benefits of LiDAR systems, but, as do LiDAR systems, they are limited to LOS detection (no around the corner option), and to shadowing and occlusion effects.

Thus, although radar is used in some AD systems today to allow operation in diverse environments and to detect a wide range of stationary and mobile targets at a variety of distances, conventional radar systems used in AD applications do not detect high details at long distances, nor do they see well sideways or through obstacles. Higher-frequency bands, such as, for example, K and W, can provide high resolution and can accurately estimate the locations and speeds of targets. But radar signals at these higher frequencies do not penetrate the walls of buildings or see around corners, and, as explained above, they are vulnerable to rain, fog, and dust. Lower-frequency bands, such as UHF and C, are much less vulnerable to these problems, but they use larger antenna elements and have smaller available bandwidth, which reduces range resolution (the ability to distinguish two objects of similar bearing but different ranges). They also require a large physical aperture size to provide the angular resolution that is desirable for AD applications.

Accordingly, it does not appear that a single radar band can provide the desired accuracy and range and angular resolution, as well as operate in all expected weather conditions and see through buildings and around corners. The inventors had the insight that the system 100 operating simultaneously at multiple frequency bands would be a significant improvement over conventional systems. By using multiple, disparate bands, the vulnerabilities of one band can be combined with the strengths of others.

The angular resolution of a radar system, which is the minimum separation at which two targets of the same size and at the same range can be distinguished, depends on the aperture of the radar system and is inversely proportional to the frequency in use. The range resolution, which is the minimum difference in range that can be distinguished between two targets at the same bearing but different ranges, is inversely proportional to the bandwidth. A radar system at the UHF (0.3-1 GHz) or C band (4-8 GHz) that achieves the same angular resolution as a radar system at the K (18-27 GHz) or W (75-110 GHz) band has a significantly larger aperture.

Figure 8:
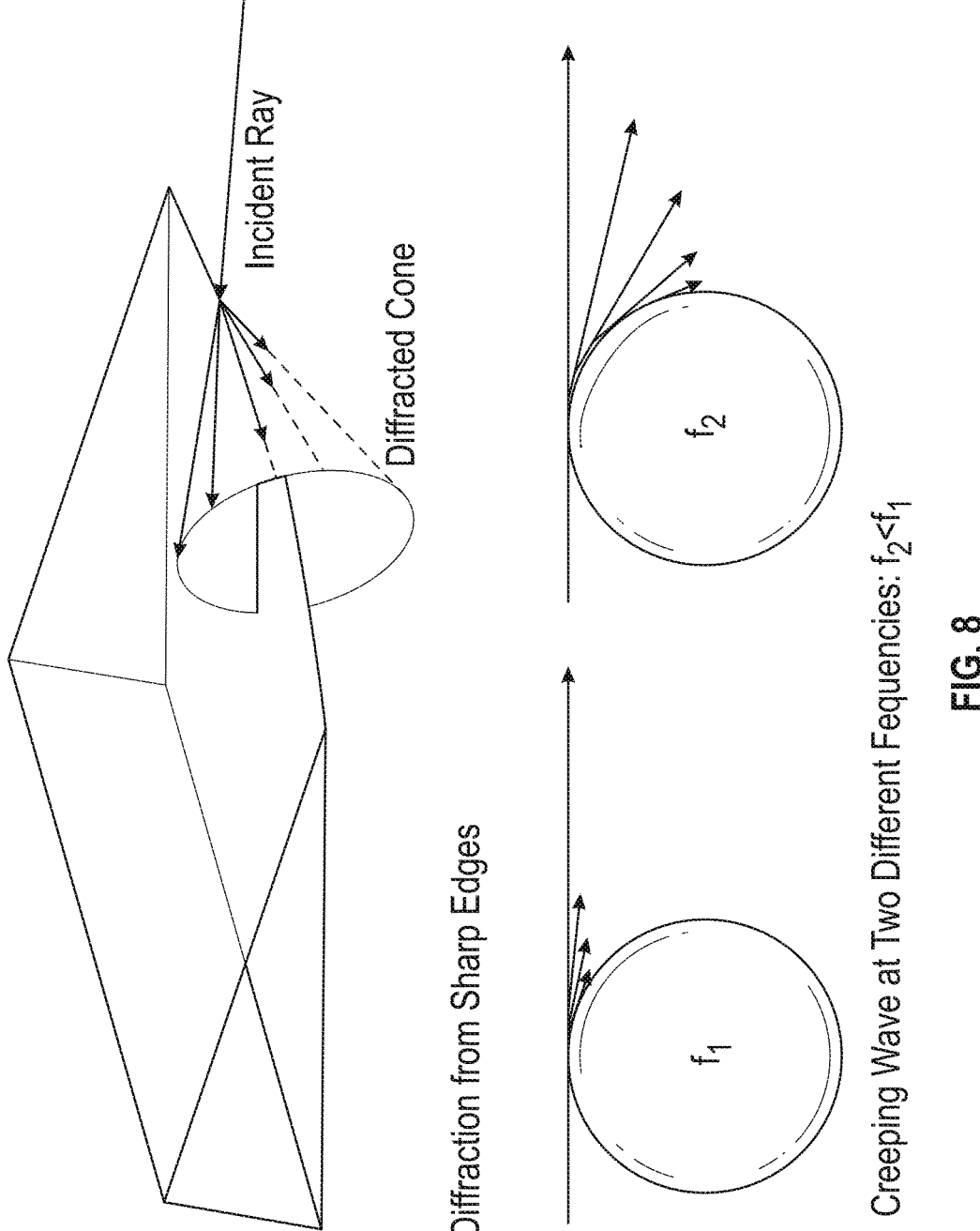
FIG. 8 illustrates that electromagnetic waves tend to diffract at sharp edges or propagate through as "creeping" waves on curved surfaces.

An advantage of lower-frequency radar systems (UHF and C bands) over millimeter-wave radar systems is that EM waves at lower-frequency bands have superior reflection, diffraction, and penetration properties, which can be important for NLOS detection. FIG. 8 illustrates that EM waves tend to diffract at sharp edges or propagate through as "creeping" waves on curved surfaces. These effects are weak at the higher frequencies (e.g., K and W bands), but they can be substantial in the UHF and C bands. Low penetration loss, in addition to EM wave diffraction, can allow radar systems operating at UHF bands to detect objects around the corner.

Higher-frequency bands (e.g., 24 GHz and 77 GHz) can provide high angular and range resolution and allow a radar system to accurately estimate the location and speed of targets in a scene because more bandwidth is available at higher frequencies. But, as explained above, higher-frequency bands generally do not penetrate the walls of buildings and are vulnerable to certain impairments (e.g., rain, fog, dust, etc.). Lower-frequency bands are less affected by these impairments, but lower-frequency bands correspond to larger antenna elements. Furthermore, the available bandwidth may be smaller at lower frequency bands, which adversely affects the range resolution, and a large physical aperture may be needed to form a phased array providing high angular resolution.

Generally, the radio-frequency (RF) channel is in a rich multipath environment, and in AD environments it may be highly congested due to the co-existence of multiple active automotive radar systems. Also, rain, fog, and dust may limit the range of radar operation, especially at millimeter-wave frequencies. This extensive list of challenges led the inventors to the conclusion that there is no single radar band that can provide high performance under all anticipated circumstances. The inventors had the insight that allowing the system 100 to operate in multiple frequency bands simultaneously would allow the complex RF channel to be viewed from multiple perspectives and could provide different modalities of information that could be leveraged, as described further herein, to improve performance for AD (and potentially other) applications.

Radar performance for AD applications is dependent on typical target 130 radar cross section (RCS), path loss in various weather conditions, reflection/transmission loss for a typical occluding building/wall diffraction coefficients of sharp edges, required power to detect targets accurately, and aperture size for the desired angular resolution. Each of these factors/characteristics is discussed further below.

Figure 9:
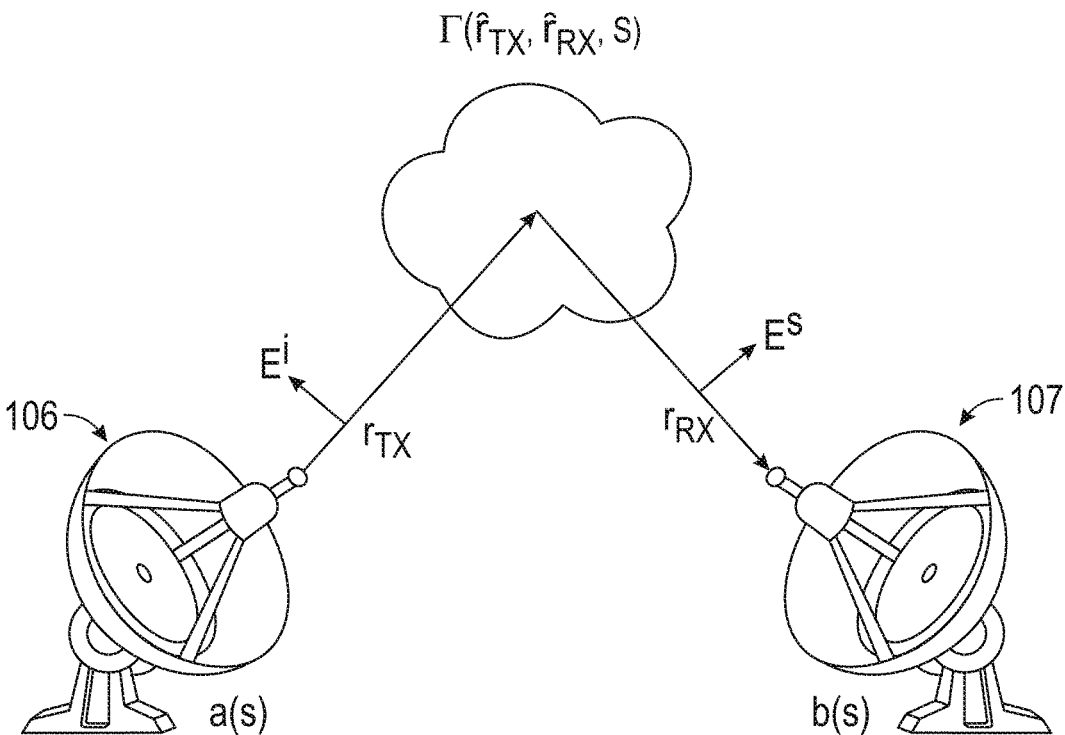
FIG. 9 illustrates a bistatic radar setting in accordance with some embodiments.

Radar cross-section (RCS) is a measure of a target 130's ability to reflect radar signals (e.g., transmitted waveform 140) in the direction of the radar receiver (e.g., receiver 120). In other words, the RCS is a measure of the ratio of backscatter density in the direction of the radar (from the target 130) to the power density that is intercepted by the target 130. FIG. 9 illustrates a bistatic radar setting in accordance with some embodiments. In FIG. 9, the transmit antenna 106 is shown as being separate from the receive antenna 107, but it is to be understood that a single antenna may be used to transmit and receive. A simplified form of the free space radar equation that relates the received signal at the receiver 120 antenna port, b(s), to the transmit signal at the transmitter 105 antenna port, a(s), in the Laplace domain is:

$$s_{12} = \frac{b(s)}{a(s)} = \frac{s\mu e^{-2s(r_{TX}+r_{RX})/c}}{8\pi^2 r_{TX} r_{RX} R_0} \langle H_{TX}(-\hat{r}_{TX}, s)|\Gamma(\hat{r}_{TX}, \hat{r}_{RX}, s)|H_{RX}(\hat{r}_{TX}, s)\rangle \quad (1)$$

where $\mu$ is the permeability, c is the speed of light, $H_{TX}$ and $H_{RX}$ are the transmit antenna 106 and receive antenna 107 realized effective lengths, respectively, when both antennas are matched to $R_0$, and $\Gamma(\hat{r}_{TX}, \hat{r}_{RX}, s)$ is the transfer function of the scatterer for an incident wave (e.g., transmitted waveform 140) from $\hat{r}_{TX}$ and scattered toward $\hat{r}_{RX}$. Because the scatterer may alter the polarization of the incident wave, $\Gamma$ is an operator. All of the scatterer information that can be accessed in the $\hat{r}_{RX}$ direction and observed in the $\hat{r}_{RX}$ direction is included in $\Gamma(\hat{r}_{TX}, \hat{r}_{RX}, s)$. In the monostatic case $(\hat{r}_{TX}=\hat{r}_{RX}=\hat{r})$ where the scatterer does not alter the polarization of the incident wave, the conventional RCS of the object is related to its $\Gamma$ as:

$$\sigma(\hat{r}, s) = \frac{4}{\pi}|\Gamma(\hat{r}, s)|^2. \quad (2)$$

Equation (2) indicates that $\sigma(\hat{r},s)$ does not include the phase information, which may potentially be used to estimate the material properties of the scatterer. Nevertheless, it facilitates link budget calculations.

Figure 10:
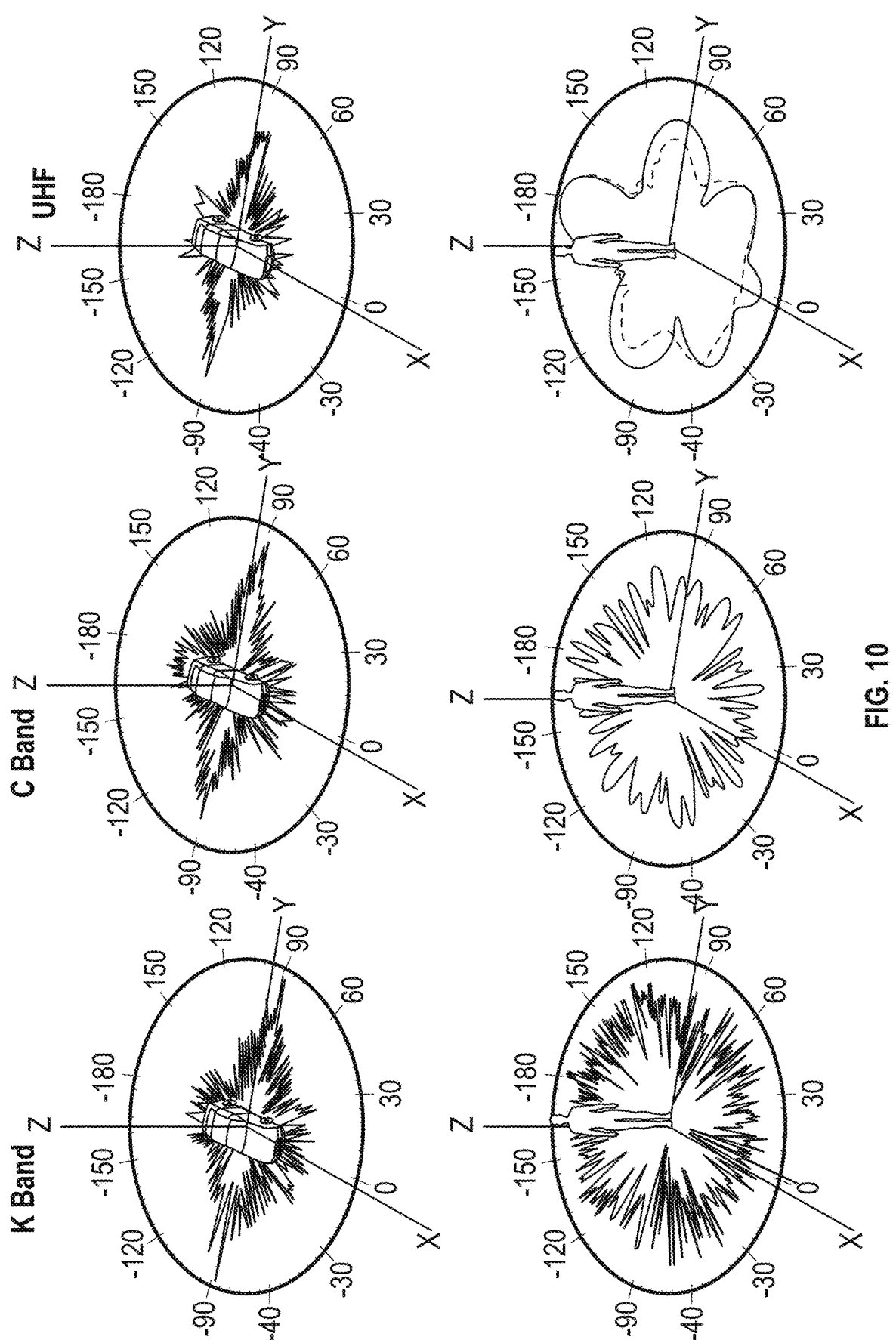
FIG. 10 illustrates the radar cross section for a car and for a person of average size.

FIG. 10 illustrates the RCS (in dBsm), computed using the physical theory of diffraction (PTD) and unified theory of diffraction (UTD) high-frequency techniques at the K (left), C (middle), and UHF (right) bands for two potential targets 130 that the system 100 might encounter, namely, a car and for a person of average size. (It is to be noted that the PTD and UTD techniques may not be accurate in the UHF band for small objects.) The RCS is computed using a full-wave analysis of the human body (solid line) to compare it with high-frequency techniques (dashed line). Although the RCS of the illustrated objects and in the illustrated bands share some commonalities, they differ in significant ways. For example, the UHF RCS of the front view of the car is much less than it is for the C and K bands. This result suggests that an approaching car will be easier to detect at the C and K bands, but it also suggests that it may be harder to see beyond (e.g., detect targets 130 behind) the nearest car while operating in the K or C band. Further, the UHF RCS for the person appears to be much smoother than the RCS at the C and K bands. This result suggests that, compared to the C and K bands, the UHF RCS will be more robust to the gait and position of the person, from which it can be inferred that people may be easier to detect using UHF radar.

The RCS of an object decreases when there is water on the scatterer's surface, which diminishes the radar reflections measured in the C and K bands, although this phenomenon does not notably affect radar systems using the UHF band.

The safety of AD systems would be improved significantly if such systems could use NLOS propagation to detect targets 130 (e.g., cars, motorcycles, bicycles, pedestrians, animals, etc.) around corners or behind other targets 130. To assess the viability of the system 100 using NLOS propagation for AD, the reflection/transmission coefficients of different objects (e.g., walls in case of city driving and vegetation in case of rural/country driving) can be assessed. The transmission coefficient of an object is a measure of how much of an electromagnetic wave passes through it, and the reflection coefficient is a measure of how much of a wave is reflected by an impedance discontinuity in the transmission medium.

Figure 11:
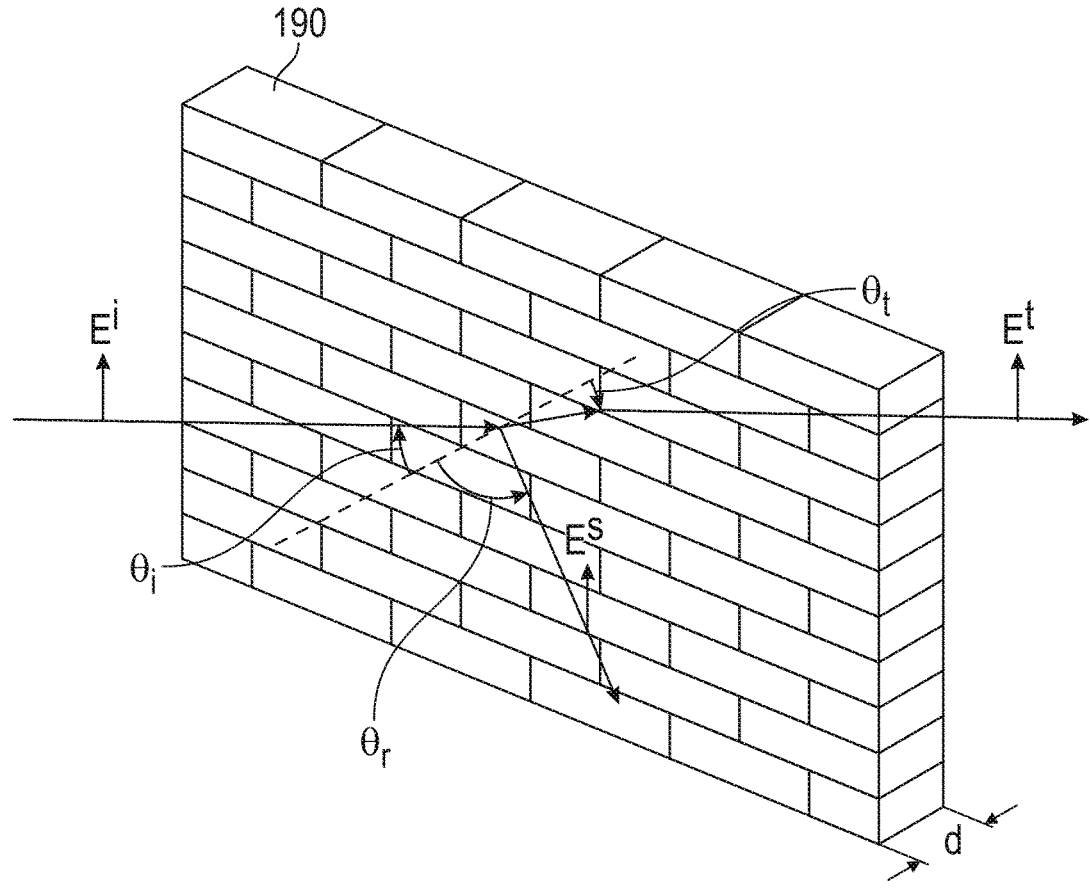
FIG. 11 illustrates the incident, reflected, and transmitted electric field through a wall

FIG. 11 illustrates the incident, reflected, and transmitted electric field through a wall 190 with a thickness of d as an example of how to calculate the loss of reflection and transmission of a plane wave through a typical wall. In the general case, the reflection and transmission coefficients are functions of the polarization of the incident field and the angle of incidence $\theta_i$. In the transverse electric (TE) mode, all transmitted fields are vertically polarized.

Figure 12A:
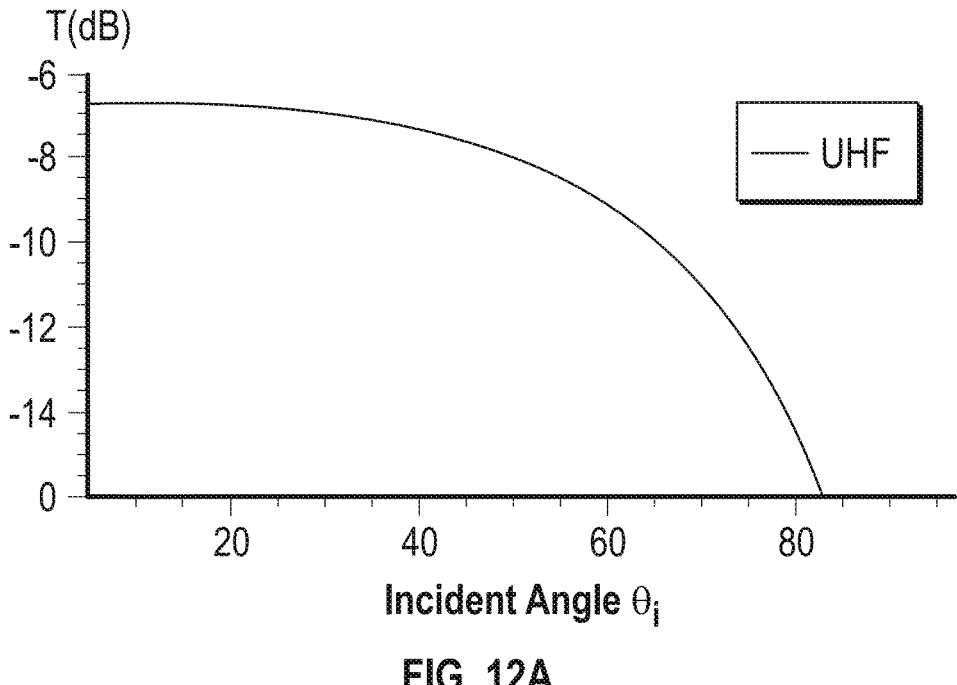
FIGS. 12A and 12B, show the transmission coefficient T and reflection coefficient F for three frequency bands using the example wall shown in FIG. 11.
Figure 12B:
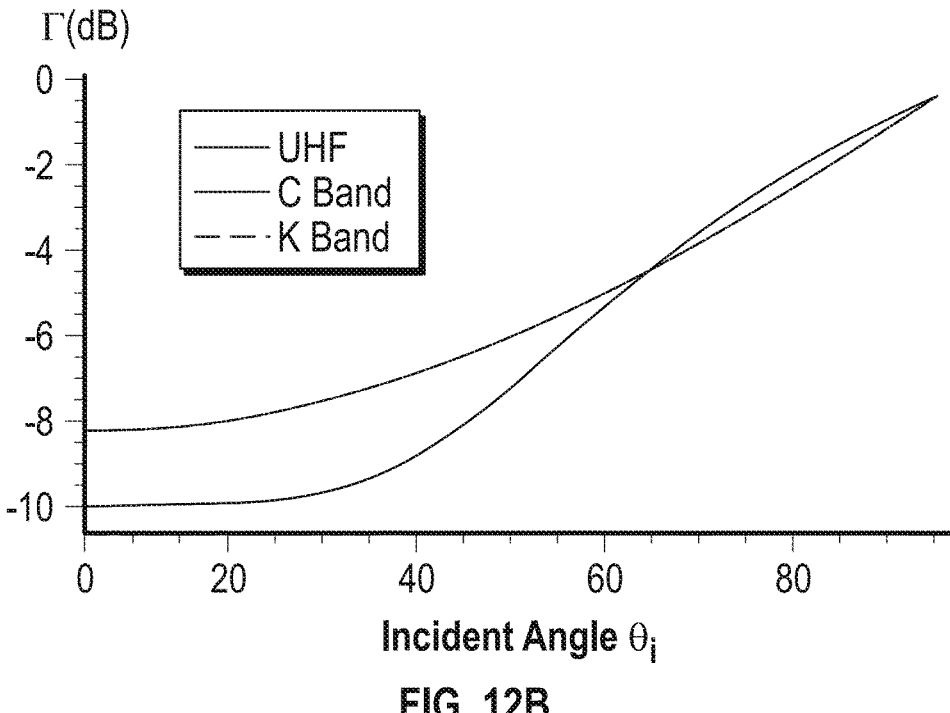

FIGS. 12A and 12B, respectively, show the transmission coefficient T and reflection coefficient F for three frequency bands using the example wall 190 shown in FIG. 11 with d set to 30 cm and assuming the wall 190 is made of concrete. As FIG. 12A indicates, in the UHF band, the transmission coefficient is approximately −6.5 dB in a large range of incident angles. The transmission coefficients for the C and K bands for the plotted incident angles are not shown in FIG. 12A because they are below −35 dB and −150 dB, respectively; thus, they are deemed to be negligible. In FIG. 12B, the reflection coefficients for the C and K bands are coincident. Thus, FIGS. 12A and 12B indicate that a signal in a lower frequency band can penetrate walls and pass through buildings, whereas higher frequencies cannot do so in any meaningful way.

In addition to reflection and penetration, diffraction caused by sharp edges also affects the propagation of EM waves in NLOS propagation. Based on the geometrical theory of diffraction (GTD), the power of signal diffracted by the edge of a metallic object (such as a building, window, billboard, etc.) is inversely proportional to frequency. Diffraction, therefore, may not be an essential phenomenon in NLOS propagation in higher frequency bands, whereas it can affect lower frequencies such as UHF.

Figure 13:
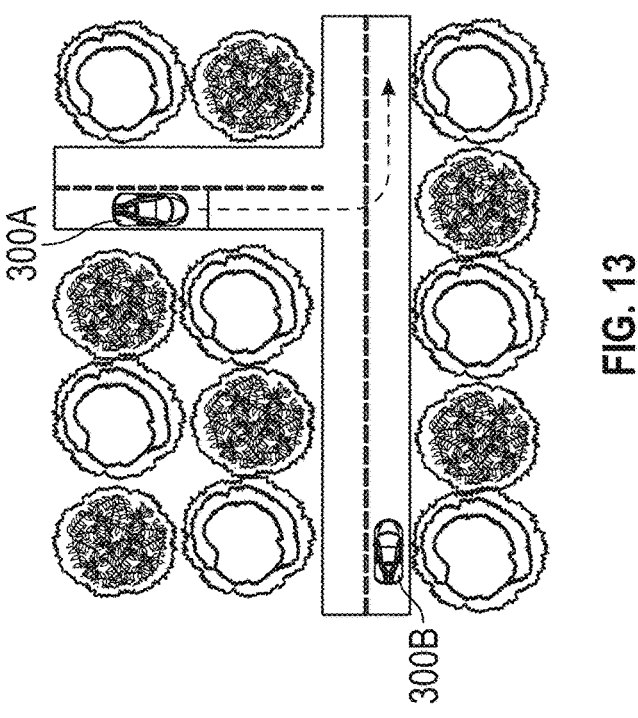
FIG. 13 illustrates an intersection in the countryside.

Signal blockage due to propagation loss in wooded and vegetated areas is of concern for AD applications. Various scenarios exist in rural (and urban) areas where vegetation blockage may increase the risk of misdetection. FIG. 13 illustrates an intersection in the countryside. As shown, because of the vegetation, the car 300A might not see the car 300B in time to prevent an accident.

Figure 14:
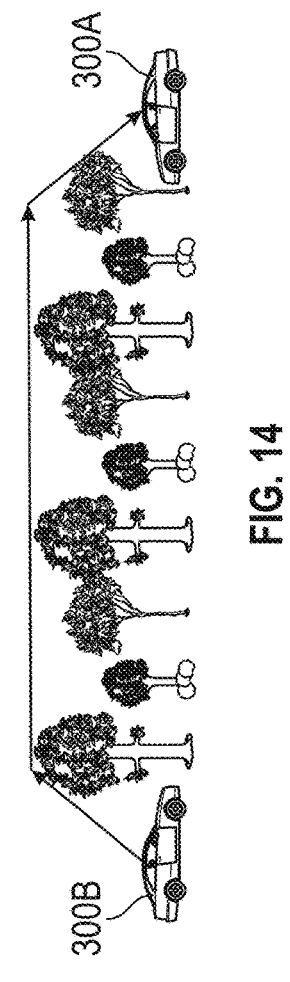
FIG. 14 illustrates how an electromagnetic wave can propagate through a wooded area.

The Commander's Critical Information Requirements (CCIR) Report 236-2, which discusses the influence of terrain on propagation, characterizes the foliage loss as:

$$L(dB)=0.2f^{\alpha}R^{\beta}$$

where f is the frequency in megahertz, and R is the range that the wave extends in the foliage. The parameters $\alpha$ and $\beta$ are functions of foliage density, type of vegetation, humidity, and temperature. Typical values of $\alpha$ and $\beta$ are, respectively, 0.3 and 0.6. EM waves do not move in a straight line in a layered medium where the transmitter and receiver are in a lossy layer due to the exponential decay. The EM wave has been shown to be able to leave the lossy layer and pass through the lossless layer and then enter the lossy layer again to reach the receiving antenna. A radar signal follows the same rule for a round trip propagation in a wooded area, as illustrated by the path 305 shown in FIG. 14.

The angular resolution of a radar system is dependent on its aperture size. Specifically, for a radar system that includes transmitting and receiving elements (antennas) in a linear array, the angular resolution is proportional to the wavelength and inversely proportional to the aperture (or physical length) of the array. Thus, the smaller the wavelength and/or the larger the aperture, the better the angular resolution. This is one of the reasons that millimeter waves have been proposed for AD. As previously explained, the angular resolution is the minimum separation at which two targets 130 of the same size and at the same range can be distinguished. Stated another way, the angular resolution is the minimum separation in the angles of arrival from two (or more) distinct targets 130 so that they can be resolved from one another. Consider, for example, a radar system with transmitting and receiving elements arranged in a linear array. The angular resolution (in radians) of such an arrangement is given by $$\theta = \frac{\lambda}{2D}$$

where $\lambda$ is the wavelength and D is the aperture (or length) of the array. From the above equation, it is clear that the smaller the wavelength and/or the larger the aperture, the better the angular resolution. For this reason, the 77 GHz frequency band has been used by AD systems. The angular resolution essentially separates the angles of arrival (AoA) from multiple distinct targets, and a solution can be obtained using array signal processing methods, such as MUSIC or ESPIRIT, which are known in the art and are not described herein.

Today, typical radar apertures are in the 15 cm range, which at 77 GHz results in angular resolutions of around 1°, which is insufficient for fully autonomous vehicles to operate in busy and/or complicated scenes and meet desired safety goals. The typical angular resolution of LiDAR systems is often around 0.1°-0.2°, e.g., up to an order of magnitude less than for radar operating at 77 GHz. It would be desirable for a radar system to provide angular resolution on the order of the angular resolution provided by a LiDAR system, because such a radar system would be able to avoid the significant loss in performance that LiDAR systems suffer in certain scenarios (e.g., fog, rain, etc.). In order to achieve an angular resolution of 0.1° at 77 GHz, however, the aperture must be relatively large. For example, an aperture of greater than 1 meter (e.g., 1.2 m) may be sufficient to yield the desired angular resolution. Such an aperture can be accommodated by the width of a car.

In addition to measures such as angular and range resolution, another measure of a radar system's performance is the maximum number of targets 130 that it can detect simultaneously. The term "range bin" is used herein to refer to objects that cannot be resolved from each other in terms of distance; those objects fall into the same range bin. As discussed further below, the range resolution can be approximated as c/2 W, where c is the speed of light, and W is the bandwidth of the transmitted waveform. Thus, if, for example, the bandwidth of the transmitted waveform is 100 MHz, the range resolution is around 1.5 m, and the size of each range bin is also 1.5 m.

For a uniform linear array (ULA) with M transmit and N receive elements spaced equidistantly (uniformly), the maximum number of targets 130 that can be detected simultaneously for any range bin is M+N. The AD environment can be quite complex with many objects populating a scene. Therefore, the number of targets 130 (or point clouds) that should be detectable can be quite large, perhaps in the tens or hundreds per range bin. Thus, an AD system using a ULA may need to use a large number of transmit and receive elements in order to be able to detect enough of the targets 130 in the scene. In addition, the desirability of a large aperture further increases the number of transmit and receive antennas (elements) for the ULA. As an example, a radar with a 1.2 m aperture operating at 24 GHz would need 192 antennas in a ULA with half-wavelength spacing (as is customary). For most AD applications, this is a prohibitively large number of transceivers (transmit and receive elements). Moreover, such a system would be disadvantageous and expensive in terms of RF and digital hardware, power dissipation, and weight. Furthermore, because of the geometrical constraints of a car (e.g., the curvature of its surface), it is usually not feasible to situate a ULA in or on a car.

One alternative approach to improve the angular resolution of a radar system without deploying a ULA is to situate multiple smaller-aperture ULA radar units in or on the body of a car along a virtual line. This solution, referred to herein as a divided array, is being considered by some AD system providers. Although several such smaller-aperture ULA units could, in theory, operate equivalently to a single radar unit having the desired wide aperture, the data collected by every radar unit would likely need to be jointly processed, which in turn would require all units to be perfectly synchronized with each other in both the RF and digital (sampled) domains. It also requires that the separate smaller-aperture ULA units be situated in precisely prescribed positions that are known to the processing blocks. Achieving perfect synchronization is particularly challenging because it may require very careful and calibrated clock and frequency synchronization across a wide physical aperture so that the RF and digital chains for every transmitting and receiving element can be fully synchronized.

Accordingly, as described further below, some embodiments of the system 100 use a sparse array of transmit and receive elements. For example, in some embodiments, the transmit and receive elements are placed at only a sparse subset of the positions that would be occupied by the elements in a full-sized ULA. A sparse array can behave as a non-sparse array with elements located at positions given by the distinct pairwise differences between the locations of each transmit and each receive element. If appropriately designed, so that each pairwise difference is unique, a sparse array can be made to behave as a ULA of the same aperture size, but whose number of array elements is the product of the number of receive and transmit elements of the sparse array. In other words, if each pairwise difference is unique, a sparse array with M transmit and N receive elements behaves as if it had M x N elements.

The use of a sparse array in the system 100 increases the maximum number of targets 130 that can be detected simultaneously at each range bin from M+N to M×N, which is a significant increase. In the example of a 1.2-m aperture radar operating at K band (24 GHz is allocated for radar applications), a sparse array with 30 transmit and 30 receive elements can provide the same performance as if it had 900 elements, and this performance is well beyond the performance of a ULA at half wavelength spacing. Similarly, a sparse array with 12 transmit and 16 receive elements can behave as a ULA with 192 elements (well above the performance of a ULA at half-wavelength spacing). Use of a sparse array allows the array to be embedded in (e.g., distributed over, within, under, etc.) the body of a vehicle (e.g., an automobile), as described further below.

Figure 15:
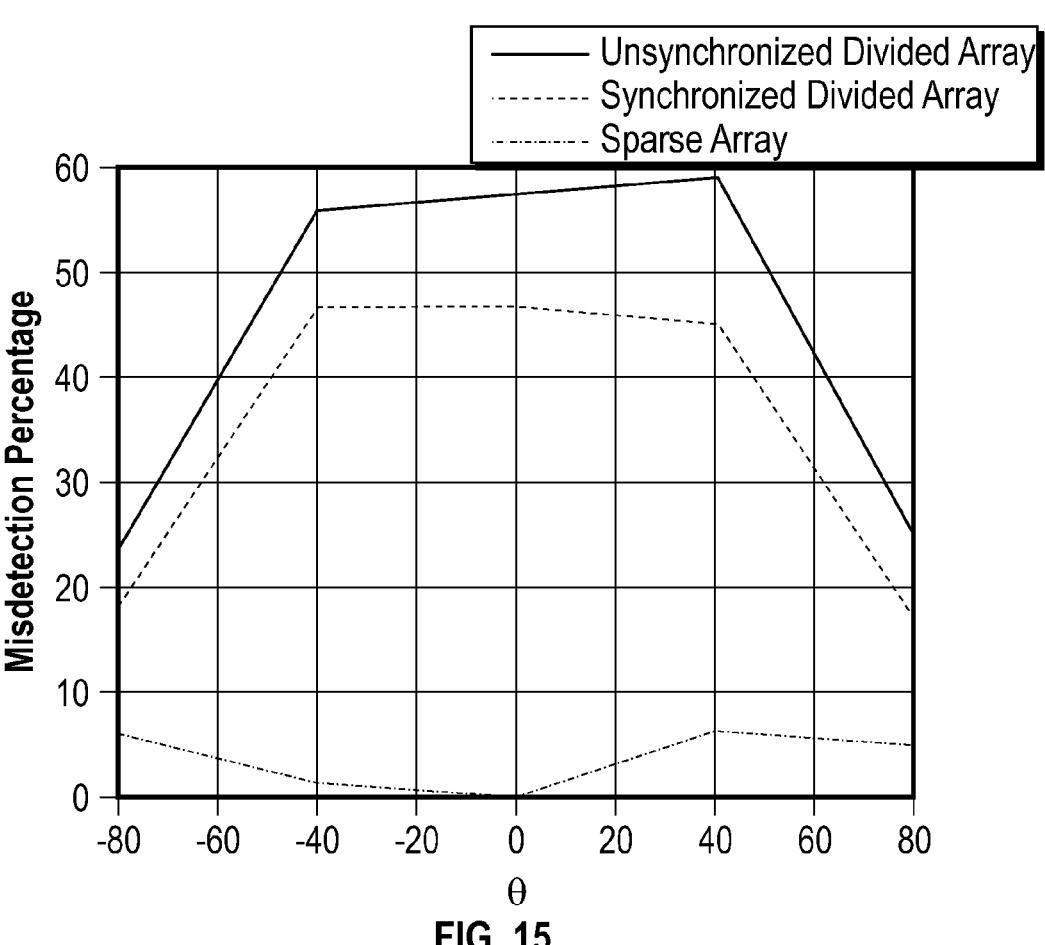
FIG. 15 compares the mis-detection percentage as a function of the angular position of the target for an example system using a sparse array in accordance with some embodiments and two divided-array systems.

As explained above, the divided array approach, which may be complex to implement, is being considered by some AD system manufacturers. Even if all of the units in the divided array approach can be perfectly synchronized (which may be expensive and/or cumbersome), and even if the data is jointly processed, the performance of the resulting divided array radar system falls short of that of the system 100 using a sparse array. To illustrate the difference, consider two wide-aperture radar systems at 77 GHz at W band, with a length of 1.2 m each, both of which have 12 transmit and 16 receive elements. The first system (system 100) uses a carefully designed sparse array, yielding the equivalent of 192 geometrically-placed virtual antenna elements. The second system uses two 14-element ULAs on the extreme sides of the 1.2 m aperture. The latter configuration is used to emulate a divided array that puts together two separate 14-antenna ULA systems in a divided fashion, which is the approach some AD manufacturers are considering. Even though both systems have the same aperture and the same number of antenna elements, the integrated sparse array system (system 100) has superior performance. FIG. 15 compares the mis-detection percentage as a function of the angular position of the target for three systems: the system 100 with a sparse array, a divided-array system with full synchronization at both the RF and digital domains (this result is the "Synchronized ULA" curve), and a divided-array system in which each of the two arrays operates independently, and their detected targets 130 are then fused (this result is the "Unsynchronized ULA" plot).

As FIG. 15 indicates, the system 100 with a sparse array has close to zero misdetection across all angles, whereas both versions of the divided array system behave poorly at small angles that represent the front of the array (as a result of the antenna elements in the divided array system being on the two extreme sides of the array). The center of the array behaves almost as a "blind spot" for the divided array, where for the synchronized case the misdetection is above 45% and for the unsynchronized case it is almost 60%. The "Synchronized ULA" scenario is an idealistic one (because full synchronicity between the two ULA subsets may not be feasible) and thus represents the best performance that can be achieved by a divided array system. Therefore, the observed difference in performance between the system 100 using a sparse array and the divided array approaches can be entirely attributed to the careful placement of the transmit and receive elements in the sparse array of the system 100.

As another example to illustrate the benefits of the sparse array approach, consider two additional wide-aperture radar systems with length 1.2 m each, both of which have 20 transmit and 20 receive elements. The first system is the system 100 with a carefully designed sparse array, yielding nearly 400 unique pairwise distances between antenna elements. The second system has two 10-element ULAs on the extreme sides of the 1.2 m aperture, which emulates putting together two separate 10-antenna ULA systems in a distributed fashion to make a divided array. The first and second systems have the same aperture and the same number of antenna elements.

Figure 16A:
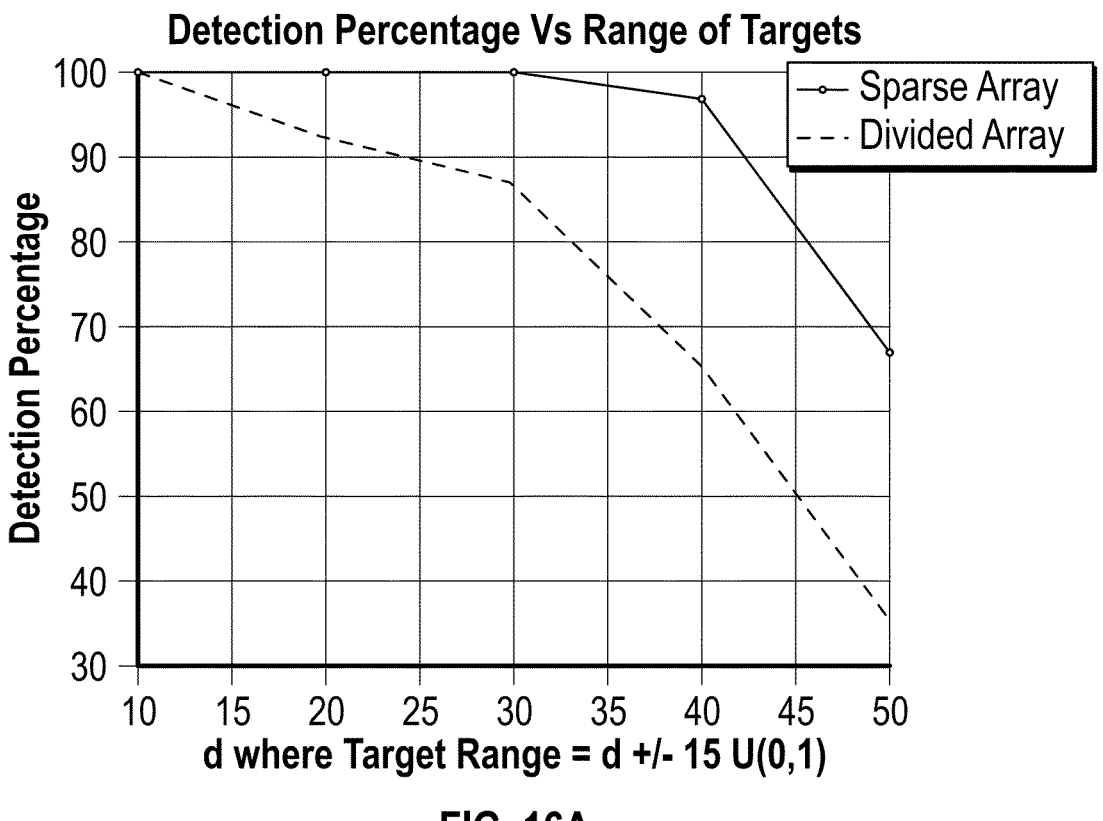
FIG. 16A plots the detection percentage as a function of target distance in accordance with some embodiments.
Figure 16B:
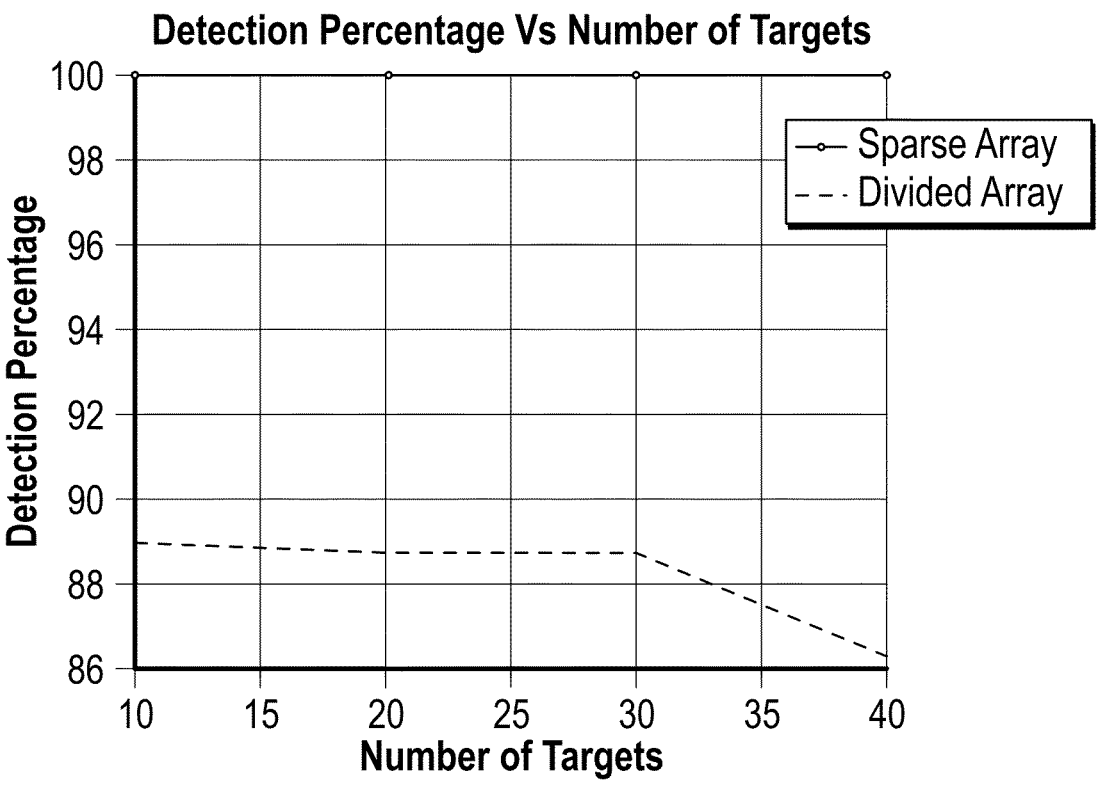
FIG. 16B shows the detection percentage as a function of the mean range of 20 random targets in accordance with some embodiments.

FIGS. 16A and 16B show the results of simulations to compare the performance of the first system (system 100 with sparse array) and the second system (divided array) described above. To provide a fair comparison, both systems used the same transmitted waveforms, the same type of beamforming, and the same joint range and angle estimation algorithm (described further below). For the second system, the two ULA subsets in the divided array were fully synchronous (in both the RF and digital domains). FIG. 16A plots the detection percentage, which is the percentage of targets 130 detected correctly, as a function of target 130 distance 150 from the radar system (range), and FIG. 16B shows the detection percentage as a function of the mean range of 20 random targets 130. As FIG. 16A shows, the performance of both systems decreases as the range increases because the received signals (e.g., reflected signals 148) become weaker due to path loss. Nevertheless, the superiority of the system 100 using the sparse array is clear from FIGS. 16A and 16B. FIG. 16B shows that the system 100 with the sparse array is capable of correctly detecting all targets 130, whereas the divided array system detects fewer than 90 percent of the targets 130. As shown by FIG. 16B, the performance of the divided array system (the second system) drops significantly when there are more than 30 targets 130. This is because the divided array with 20 transmit and receive antennas can detect 20 targets 130 at most. In other words, the divided system has 40 total antennas, M=20 transmit and N=20 receive antennas. (There are two 10-antenna ULAs, meaning each ULA has 10 transmit and 10 receive antennas.) Theoretically, the divided system should be able to detect up to 40 targets, but in practice, the degradation in performance starts earlier, namely at 30 targets in this case. Because all aspects of the two simulated systems were the same other than the arrays of transmit and receive elements, the superior performance of the system 100 using a sparse array can be fully attributed to the placement of the transmit and receive elements in the sparse array as opposed to in the divided array used in the second system.

Figure 17:
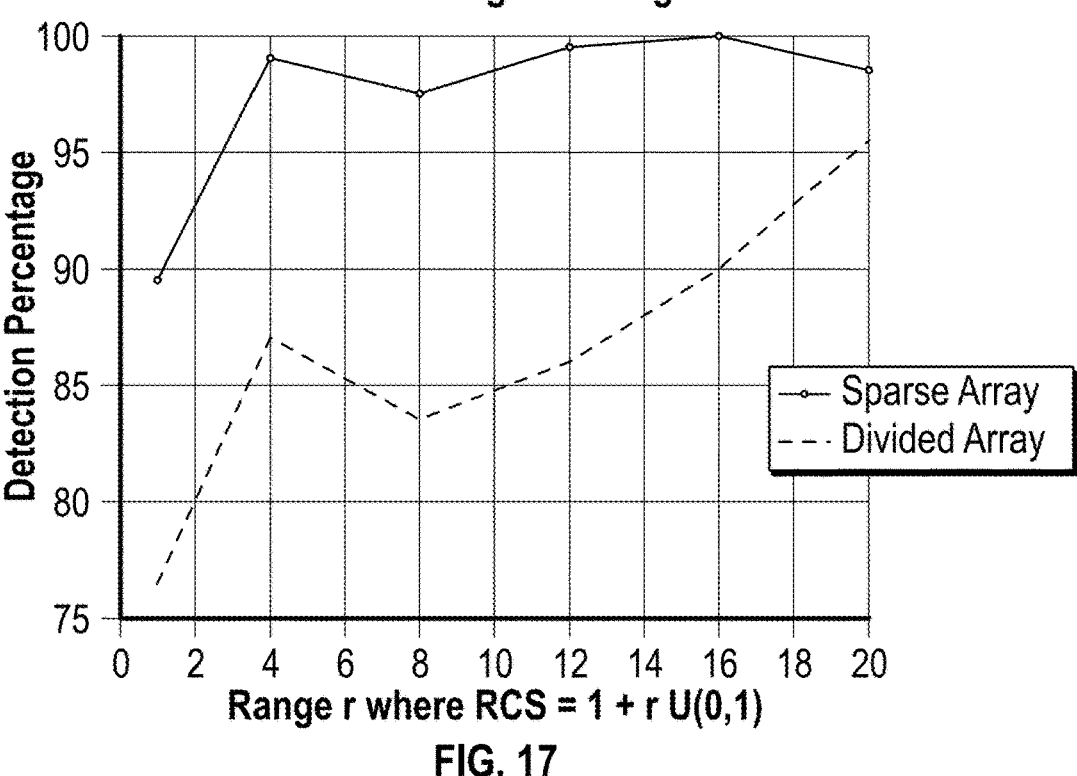
FIG. 17 plots the detection percentage as a function of the distribution of the radar cross section of 20 randomly-placed targets in accordance with some embodiments.

For a target-rich environment, the performances of the system 100 with a sparse array and the second system(s) (divided array) can be characterized by the percentage of targets 130 detected correctly (meaning that the targets 130 were detected and that they were estimated within a radius of 50 cm from the true target, the range resolution of both systems being 75 cm). FIGS. 16A and 16B, discussed above, compare the detection percentage versus the range of targets 130, as well as the number of targets 130. FIG. 17 plots the detection percentage as a function of the distribution of the RCS of 20 randomly-placed targets 130 to allow the distribution of the radar cross sections of the targets 130 to be compared. As expected, the performance of both systems improves as the RCS improves. Nevertheless, FIG. 17 illustrates that the performance of the system 100 with a sparse array is superior to that of the second system with a divided array. In all cases, the system 100 with a sparse array significantly outperforms the system with the divided array.

The performance of the system 100 can be improved and/or maximized by jointly processing the collected data across the range and angular domains. In conventional radar systems, the ranges of the targets 130 are determined by identifying peaks in the output of a correlation receiver (that correlates the received signal (e.g., reflected signals 148) against the transmitted pulse or linear FM waveform (e.g., transmitted waveform 140)). The peaks are then sampled and fed to a spatial array processing algorithm, such as MUSIC or ESPRIT, to determine the angles-of-arrival (AoAs) of the targets. Thus, the ranges and AoAs are determined separately. Furthermore, the range resolution is related to the inverse of the bandwidth of the transmitted pulse. A good approximation for the range resolution is:

$$\text{range resolution} = \frac{c}{2W}$$

where c is the speed of light and W is the bandwidth of the transmitted pulse (or, more generally, waveform (e.g., transmitted waveform 140)). The equation above is only an approximation because the actual range resolution depends on the entirety of transmitted waveform (in particular, its autocorrelation function), and not solely on its bandwidth.

The inventors had the insight that multidimensional joint processing of the range and angular domains can result in improvements in both the range resolution and the angular resolution of a radar system. For example, consider a radar system with 8 transmit elements and 8 receive elements operating at 24 GHz with a bandwidth of 200 MHz and an aperture of 46.9 cm (corresponding to 75 wavelengths). Such a system has a range resolution of 0.75 m and an angular resolution of 0.8° when the range and angular domains are processed separately. Therefore, targets 130 less than 0.75 m apart would not be able to be resolved by this system if the range and angular domains are processed separately.

Figure 18:
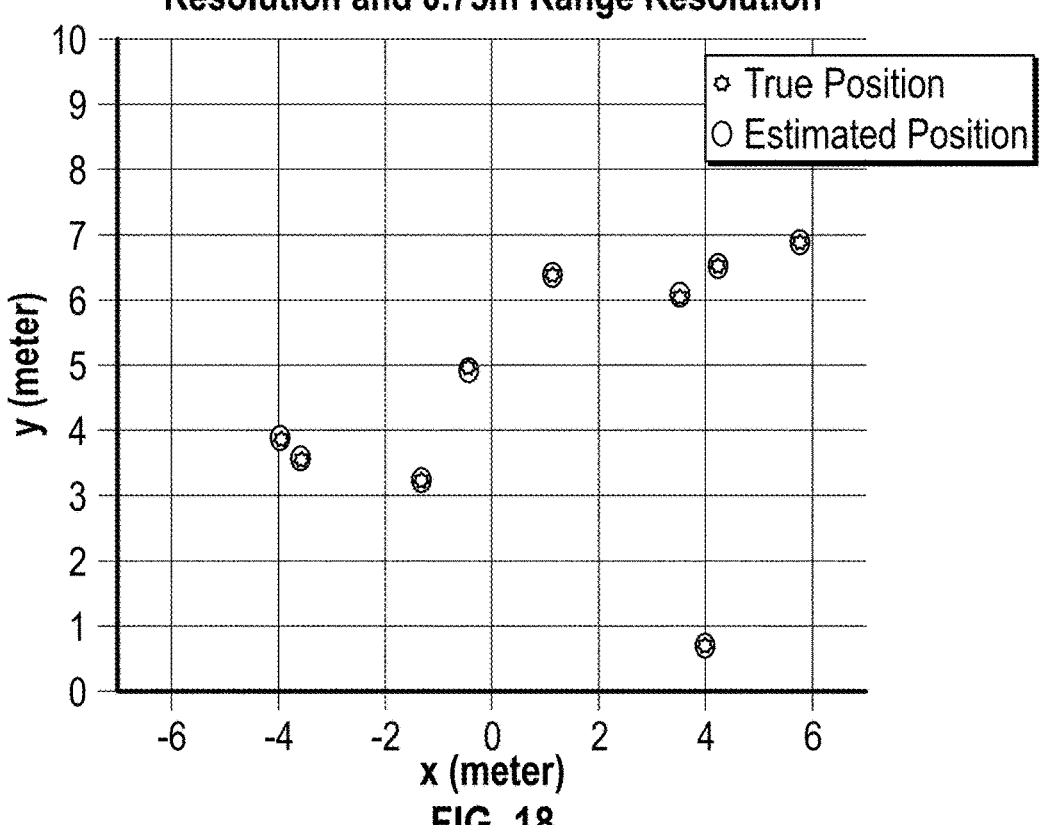
FIG. 18 shows the results when the system jointly processes the range and angle data in accordance with some embodiments.

FIG. 18 shows the results when the system 100 jointly processes the range and angle data. There are 10 targets 130 in the scene, with the true positions represented by sun-shaped symbols and the estimated positions (based on the radar data) represented by smooth ovals. The two left-most targets 130 are at ranges of 5.0 m and 5.4 m, respectively (thus, they are separated by less than the range resolution of 0.75 m) and angles of 45.0 degrees and 45.5 degrees, respectively (thus, they are separated by less than the angular resolution of 0.8°). As FIG. 18 indicates, the system 100 is able to identify and resolve the two targets 130 by jointly processing the range and angle data.

As explained above, even if the performance of a divided array system were sufficient for AD applications, the deployment environment, namely in/on automobiles, presents challenges not only because of limited physical space, but also because of the shape (e.g., curvature) of cars. The sparse array approach disclosed above overcomes both of these challenges. Specifically, the radar elements (e.g., transmit and receive antennas, possibly transmitting/receiving at different frequencies) of the system 100 can be embedded on/into the body of the car at various locations (e.g., the roof, the hood, the fenders, the front, the rear, the sides, around the wind shield, inside the wind-shield, etc.). The resulting array will likely not be linear, and will probably be curvilinear in two dimensions, or on a curved surface having three dimensions. As discussed above, the antenna element placements should be such that there are multiple distinct pairwise differences in x, y, and z coordinates between antenna elements. (In other words, the distribution of the array elements is nonuniform.) The more distinct pairwise differences there are (x, y, and z coordinates), the better the performance will be. Because the sparse array so situated is two- or three-dimensional, the system 100 (e.g., the at least one processor 114 and/or at least one processor 128) will be able to estimate the elevation angles of the targets 130 in addition to the azimuth angles. The ranges, azimuth angles, and elevation angles of targets 130 can be jointly estimated, but because the array is not uniform and linear, many AoA estimation methods, such as ESPRIT, do not work. Instead, atomic norm minimization can be used to jointly estimate ranges, azimuth angles, and elevation angles of targets 130 whenever the transmit and receive elements are at arbitrary positions in space.

In the atomic norm framework used in accordance with some embodiments, it is assumed that there is a set of atoms $$\mathcal{A} = \{\eta_i\}$$

where the set may be finite, countably infinite, or even uncountably infinite. A signal x is referred to as "structured" if it can be written as the sum of a few atoms, say K of them, where K is less than the dimension of the ambient space of x, i.e., $$x = \sum_{k=1}^{K} \alpha_k \eta_k,$$

In the above equation, the $\alpha_k$ are (possibly complex) scalars.

The atomic norm of a vector x, with respect to a set of atoms $\mathcal{A} = \{\eta_i\}$, is defined as $$\|x\|_{\mathcal{A}} = \min \text{ subject to } x = \sum_{k}^{\|c\|_1} c_k \eta_k$$

In other words, the atomic norm of x is the most economical way that x can be expressed in terms of a linear combination of atoms, where "economical" means the representation that minimizes the $\|\cdot\|$ norm, where $\|c\| = \Sigma_k |c_k|$. A small atomic norm means that x can be represented as the sum of a few atoms. Conversely, a large atomic norm means that many atoms are needed to represent x.

A processor (e.g., at least one processor 114 and/or at least one processor 128) of the system 100 can use an atomic norm denoiser (tuned to a corresponding transmitted waveform 140) followed by a correlation receiver. As another example, the at least one processor 114 and/or at least one processor 128 can use an atomic norm denoiser followed by any sinusoid-in-noise estimator, such as MUSIC, ESPRIT, Hankel norm approximation, Prony, Burg, or others. As yet another example, the at least one processor 114 and/or at least one processor 128 can use an atomic norm denoiser involving a search over a finite set of atoms. Systems and methods that use of the atomic norm to determine the ranges, angles of arrival, and velocities of targets 130 are described in detail in U.S. Pat. No. 10,866,304, which is hereby incorporated by reference in its entirety for all purposes.

In addition to embedding/positioning radar elements on the body of a car, the system 100 can also include LiDAR elements (e.g., light sources (e.g., lasers) and optical detectors (e.g., photodiodes)), which can also be embedded in or positioned on the body of a car. Various types of LiDAR elements, such as solid-state LiDAR, flash LiDAR, and single-photon avalanche detector SPAD) elements can be positioned as described herein, namely, at arbitrary positions on or embedded within a vehicle.

As described above, one desirable characteristic of AD systems would be the ability to "see around the corner." Electromagnetic waves tend to diffract at sharp edges, and when they encounter curved surfaces, they can diffract around those surfaces as "creeping" waves. (See FIG. 8.) As explained previously, these effects are weak at the higher frequencies (e.g., K and W bands), but they can be substantial in the UHF and C (4 to 8 GHz) bands. The inventors had the insight that this diffraction behavior, together with lower penetration loss as lower-frequency bands, can be exploited to allow a radar system to detect objects around corners.

Radar signals traverse many paths, bouncing off many objects on their way to and from objects being tracked. In AD applications, the radar returns (e.g., reflected signals 148) resulting from these multiple paths (referred to as multipaths or multipath signals) may also be affected by radar signals of other automotive radar systems in the vicinity. Nevertheless, these multipath signals can provide a processor (e.g., at least one processor 114 and/or at least one processor 128) of the system 100 with information about targets 130 that are not within the line of sight of the system 100, for instance, revealing cross traffic that is obscured from direct detection. In other words, these multipaths can be used to detect NLOS targets 130.

Figure 19A:
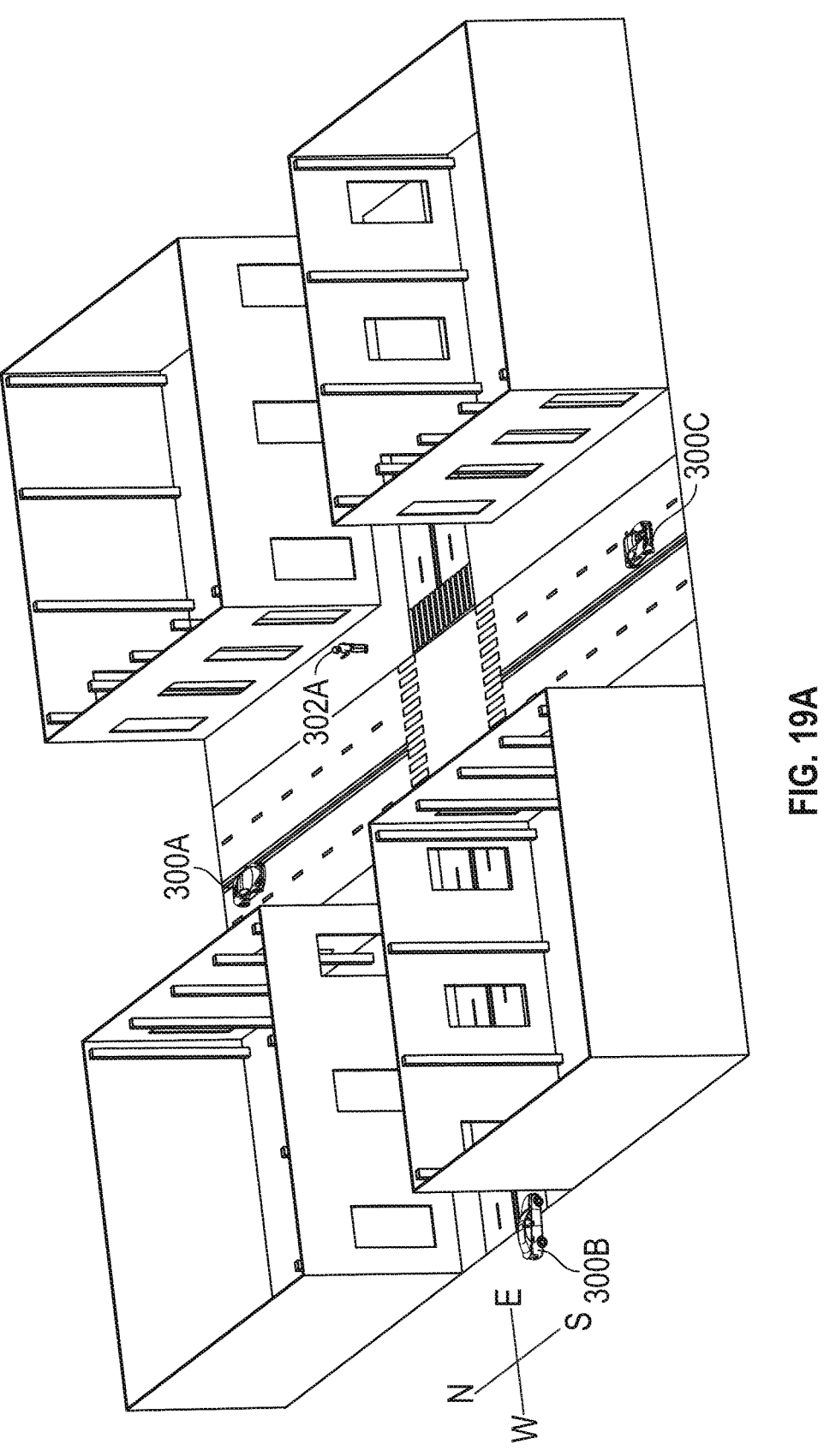
FIGS. 19A and 19B show a simulated AD scene.
Figure 19B:
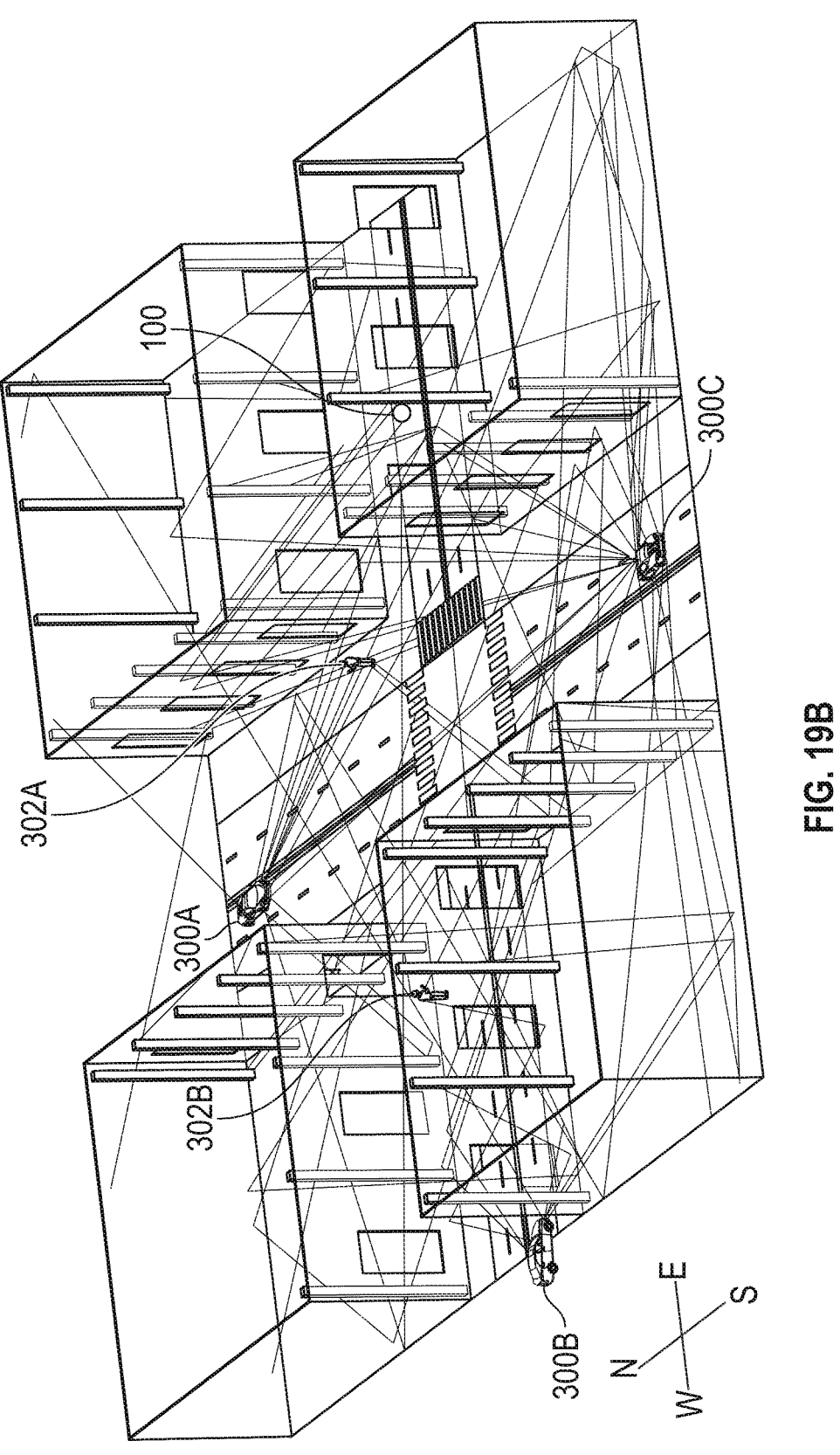

Simulations of a tri-band version of the system 100 can be used to demonstrate the ability to "see around the corner." Consider an autonomous vehicle (AV) equipped with a tri-band radar (e.g., UHF, C, and K band) system 100 that comprises a sparse, wide-aperture transmit and receive array for each band and operates simultaneously at multiple bands. Assume the AV is approaching an urban intersection surrounded by four high-rise concrete buildings, one at each corner of the intersection. For simplicity, the streets are assumed to run north-south and east-west. FIGS. 19A and 19B show the scene, which includes one person on the north-east side of the intersection and three vehicles approaching the intersection: a car 300A is approaching from north to south, a car 300B is approaching from south to north, and a car 300C is approaching from west to east. The AV is traveling from east to west and is not visible in FIG. 19A, but its position is indicated in FIG. 19B. In the scene illustrated in FIGS. 19A and 19B, the AV is 35 meters from the center of the intersection, and the car 300C is approaching the intersection from the south. The car 300C is 40 m from the center of the intersection and is not within the AV's line of sight. Thus, it cannot be detected by the system 100 via LOS techniques.

At each of the three frequency bands, the radar system can estimate the range and bearing (angle of arrival) of the targets 130. For LOS targets 130, the range of a target 130 (its distance from the system 100) is equal to the speed of light multiplied by half the time it takes the transmitted EM wave (e.g., transmitted waveform 140) to return to the system 100. In other words, the range corresponds to half the time-of-flight (ToF) of the transmitted EM wave that returns to the system 100. The bearing of a target 130 is determined from the incident angle of the received wavefronts (e.g., reflected signals 148) at the system 100. In other words, the AoA is simply the angle of the received waveform (e.g., reflected signal 148) from a particular target 130. Again, when the targets 130 is in the system 100's LOS, this is simply the angle where the target 130 is located.

When the targets 130 are not in the system 100's line of sight, the situation is more complicated because the signals (e.g., reflected signals 148) return along multiple routes. When a target 130 is NLOS, so that the EM wave (e.g., reflected signal 148) is received through multipath reflections or scatterings, the range has no interpretation beyond representing half the ToF and cannot be viewed as being the distance of the target 130 from the radar. Furthermore, the AoA for NLOS targets 130 is not necessarily related to the angle of the target 130, but rather the angle of last return (through reflection or scattering) of the multipath to the system 100. When interpreting the information from each of the bands of the system 100, the above considerations, along with any prior knowledge of the scenery (e.g., from cameras, LiDAR, maps, GPS, etc.), can be taken into consideration to infer, rather than directly measure, the locations of targets 130.

In some embodiments, returns (e.g., reflected signals 148) are classified as either line-of-sight (LOS), multipath, or through-the building (or NLOS) returns. For a given range, multipath returns are typically weaker (due to multiple reflections) and have a different polarization than LOS returns. Through-the-building returns are also weaker. In some embodiments, information about the environment (e.g., the positions, materials, etc. of buildings and other stationary objects around the AD system) is also accounted for. A framework can be constructed to find the possible positions of the true targets. That framework can then be used to estimate the probability that a target is in each of a plurality of candidate positions.

As an example of how returns can be classified, a return may be categorized as a LOS return if returns having substantially similar times of flight and angles of arrival are observed in multiple (e.g., in a majority of the) frequency bands, it has a return strength above (exceeding) a threshold, and/or it has an angular and range position (computed assuming the target is LOS) that changes slowly over time. A return may be categorized as a multipath return if returns having substantially similar times of flight and angles of arrival are observed mostly or entirely in lower frequency bands, it has a return strength that is below a threshold, and/or it has an angular and range position (computed assuming the target is LOS) that changes rapidly and erratically over time. Polarization information can also be taken into account to identify multipath returns. A return may be categorized as a through-the-building return if returns having substantially similar times of flight and angles of arrival are observed mostly or entirely in lower frequency bands, it has a return strength that is below a threshold, and/or it has an angular and range position (computed assuming the target is LOS) that changes slowly over time. Information about the scenery (the position of building, say, from maps or from LiDAR) can also be used to identify through-the-building returns.

As the AV and the targets 130 move, and the system 100 collects additional data (e.g., through reflected signals 148), the additional data can be used to update the probabilities of targets 130 being in the candidate locations. Each time the system 100 updates the estimated probabilities, it narrows the universe of possible locations until confidence in the positions of the targets 130 is high enough that they can be selected and "ghost" target positions vanish. The performance of the system 100 can be significantly enhanced by fusing information obtained from multiple bands.

The disclosed system 100 also provides an advantage in congested EM environments in which multiple autonomous vehicles' radar systems are operating simultaneously. The existence of multiple bands adds extra dimensions in which to further separate the transmitted waveforms (e.g., transmitted waveform 140), a concept called "orthogonalization," through, for example, frequency hopping or time-sharing, which allows interference from other radar systems to be reduced and allows the system 100 to be scaled for and used in urban traffic environments.

Figure 19C:
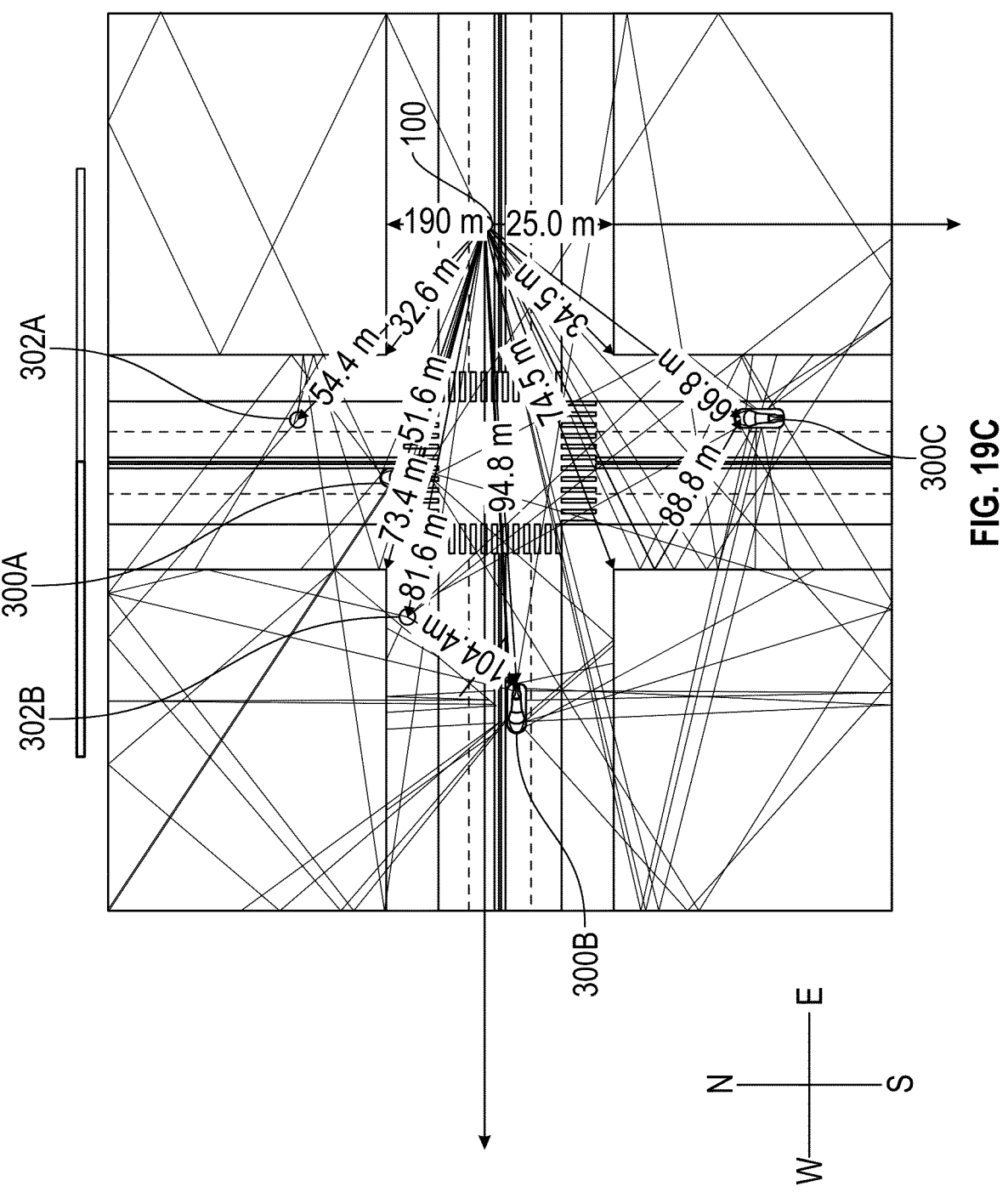
FIG. 19C illustrates the ray tracing for the scene shown in FIGS. 19A and 19B.

FIG. 19C illustrates the ray tracing for the scenario of FIGS. 19A and 19B at some point in time after the time shown in FIGS. 19A and 19B. The round-trip distances of some of the main rays that emanate and return to the system 100 are marked on each ray. For example, the round-trip distances to/from the cars 300B ("V1") and 300A ("V2"), both of which are in the system 100's LOS, are 94.8 m and 51.6 m, respectively. (As will be understood by those having ordinary skill in the art, the round-trip distance is a proxy for round-trip time.) The round-trip distance to the pedestrians 302A ("P1") and 302B ("P2"), both of whom are also within the system 100's LOS are 56.4 m and 81.6 m, respectively.

Figure 20A:
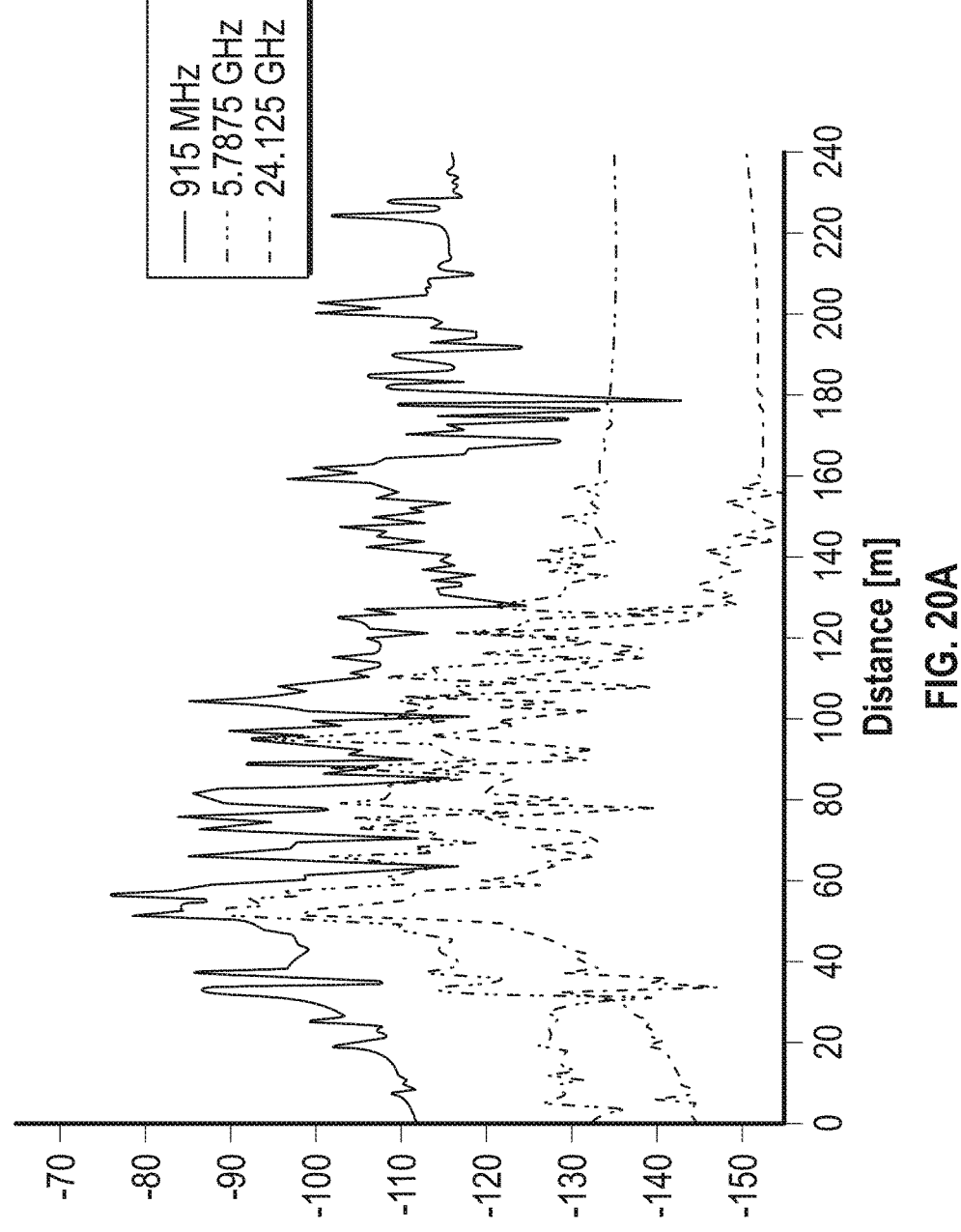
FIGS. 20A and 20B illustrate the magnitude of the impulse response of a channel for each of the three radar bands.
Figure 20B:
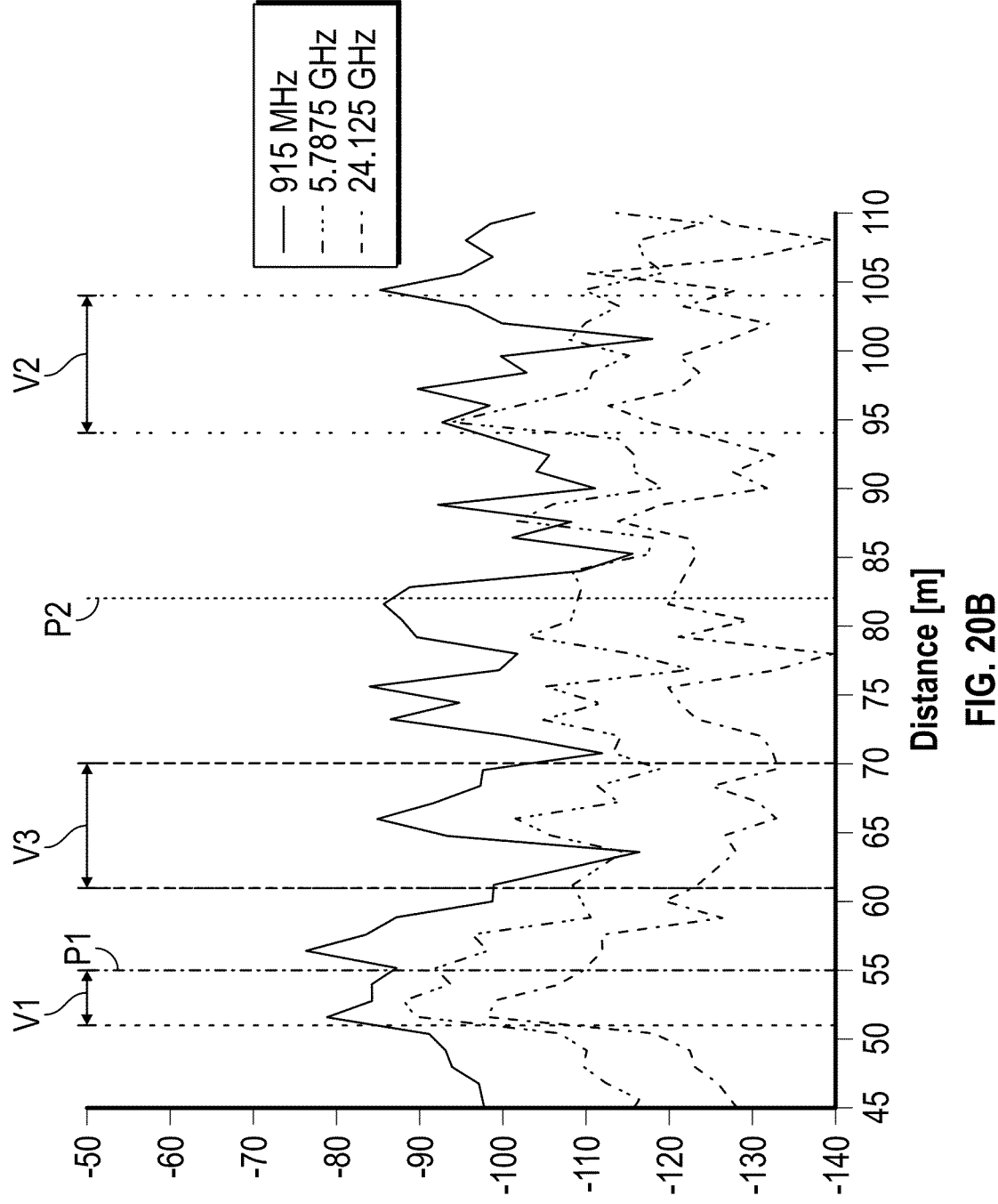

FIG. 20A illustrates the magnitude of the impulse response of the channel in dB (the signal received at a receive element when an impulse is transmitted at a transmit element) for each of the three bands. FIG. 20B is a zoomed-in version of the plot of FIG. 20A, which provides a clearer identification of the peaks in the impulse responses. The plots are given as a function of the round-trip distance, as opposed to time, to highlight the distance the EM waves travel before returning to the receiver. The round-trip distances can readily be converted to time by dividing them by the speed of light. The impulse responses can be thought of as the output of an ideal correlation receiver applied to the received signal against the radar system's transmitted pulse.

As can be seen from FIG. 20A, the impulse responses at 5.8 GHz and 24 GHz are largely silent after 160 m, whereas the impulse response for 900 MHz is not. The main reason is that 900 MHz allows for much stronger reflections off of walls and buildings. Thus, the peaks observed after 160 m round-trip correspond to such reflections. They are absent from higher frequencies because most of such reflections are absorbed and the signals attenuated.

Referring to FIG. 20B, for the car 300B ("V1"), there are peaks at around 52 m to 53 m for all three bands. For the car 300A ("V2"), there peaks at around 95 m and 96 m for all three bands. This implies that both of the cars 300A and 300B can be seen by all three bands. The pedestrians 302A ("P1") and 302B ("P2") are much more visible to the 900 MHz signal, where there are clear peaks at 56 m and 82 m, respectively. Corresponding peaks at 5.8 GHz and 24 GHz are less perceptible, likely because the RCS for a human being is much more robust to the pedestrian's orientation and gait at lower frequencies.

Note that the system 100 can also detect the car 300C ("V3"), which is blocked by a building and is "around the corner." The impulse responses for 900 MHz and 5.8 GHz have clear peaks at 66 m. This corresponds to EM waves that penetrate the building, reflect off of V3, and return by penetrating the building a second time. Note that this peak is absent from the 24 GHz impulse response because EM waves do not penetrate buildings at this high frequency.

A closer inspection of the ray tracing of FIG. 19C indicates that there is a second path through which the car 300C ("V3") can be observed. This corresponds to the EM waves penetrating the building on the bottom right corner, reflecting off of the car 300C to the left, and then reflecting off the building on the bottom left. Unlike the path to and from the car 300C that involved two building penetrations and one reflection, this path involves one building penetration and two reflections. The round-trip time for this path, as shown in FIG. 19C, is 88.8 m. There is a clear peak at 88 m to 89 m in the impulse response at 900 MHz. There are also slightly less pronounced peaks at around 87 m to 88 m at the higher bands of 5.8 GHz and 24 GHz, which may be attributable to this path.

There are a number of ways to perform sensor fusion (e.g., to combine information obtained from different frequency bands). For example, for each frequency band, for some or all of the return signals (e.g., reflected signals 148, echo signals 142, etc.) in that band, a probability can be computed that a target 130 is at a candidate position (e.g., as described above and further described in the discussion of FIGS. 26A and 26B below). This procedure results in a list of candidate positions of the targets 130, each associated with a probability. A "heat map" can then be created for each frequency band, for example, by placing a two-dimensional Gaussian distribution around each candidate position, where the mean of the Gaussian distribution is the candidate position of the target 130, the covariance matrix is determined by the range and angular accuracy of the estimated target 130, and the strength of the Gaussian is determined by the probability that the target 130 is located at the candidate position. Information from multiple bands can then be fused by, for example, pointwise multiplication of the individual heat maps from the different bands (assuming that each frequency band provides an independent measurement of the scenery) to obtain a fused heatmap. As more measurements are gathered over time, the fused heatmap evolves and becomes more accurate. As a result, ghost targets can be eliminated (e.g., by eliminating candidate positions that are below a threshold probability), and the true positions of targets 130 can be determined.

Figure 21A:
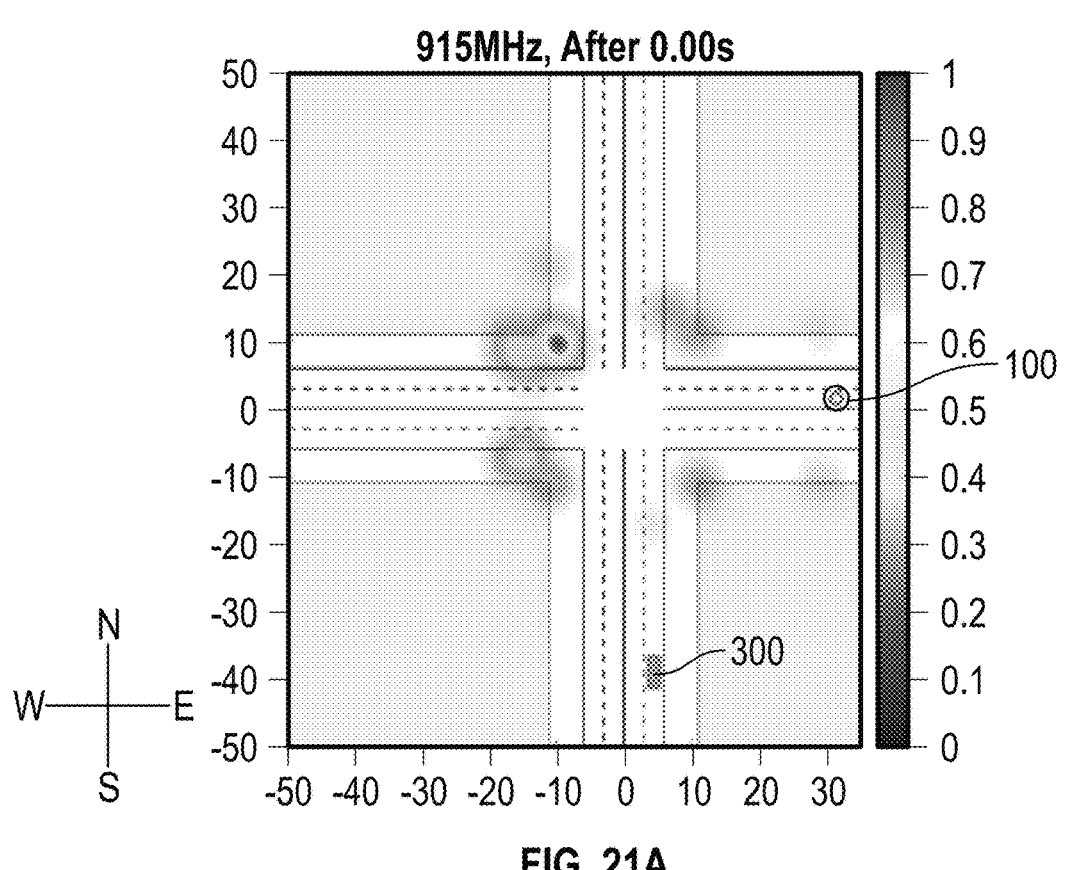
FIGS. 21A, 21B, 21C, 21D, 21E, 21F, 21G, 21H, and 21I provide additional visualization of simulation results in accordance with some embodiments.
Figure 21B:
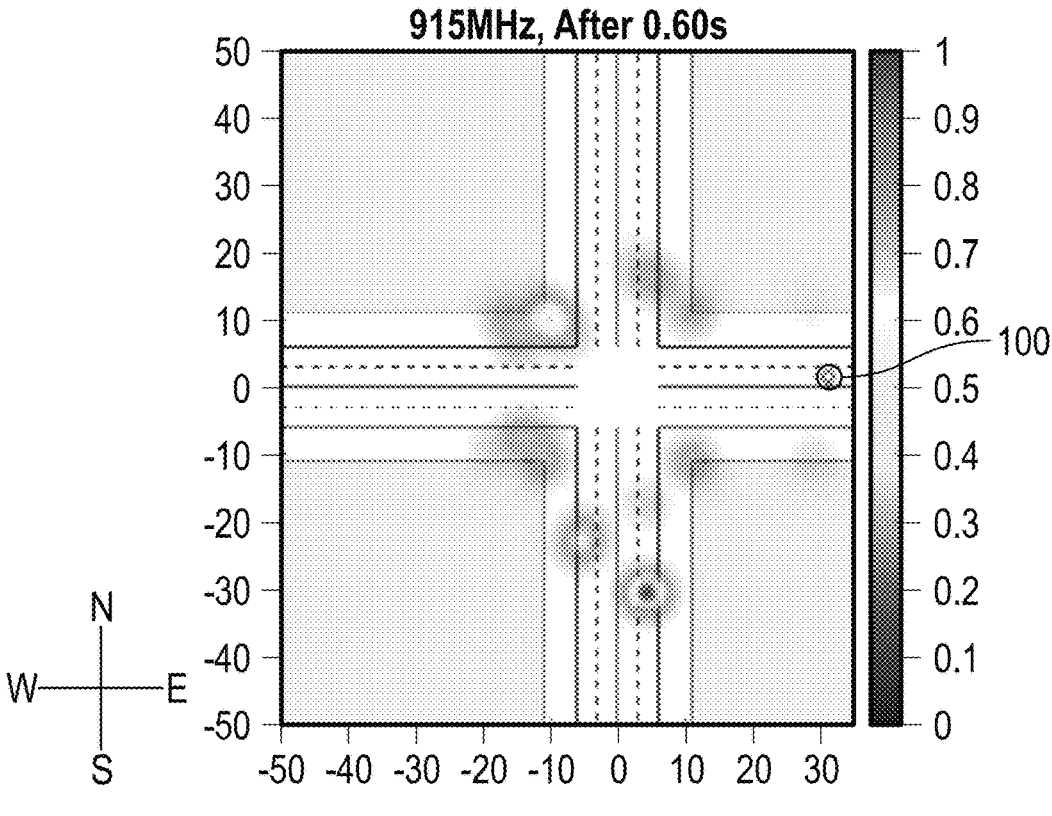
Figure 21C:
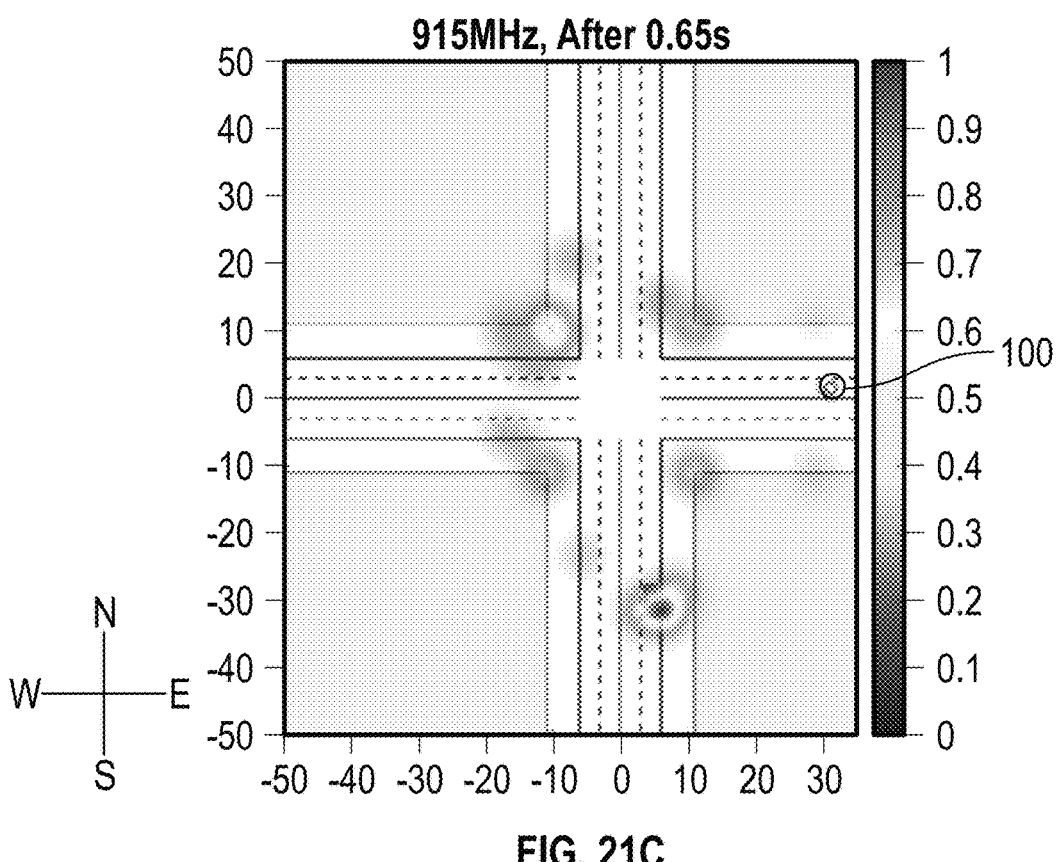
Figure 21D:
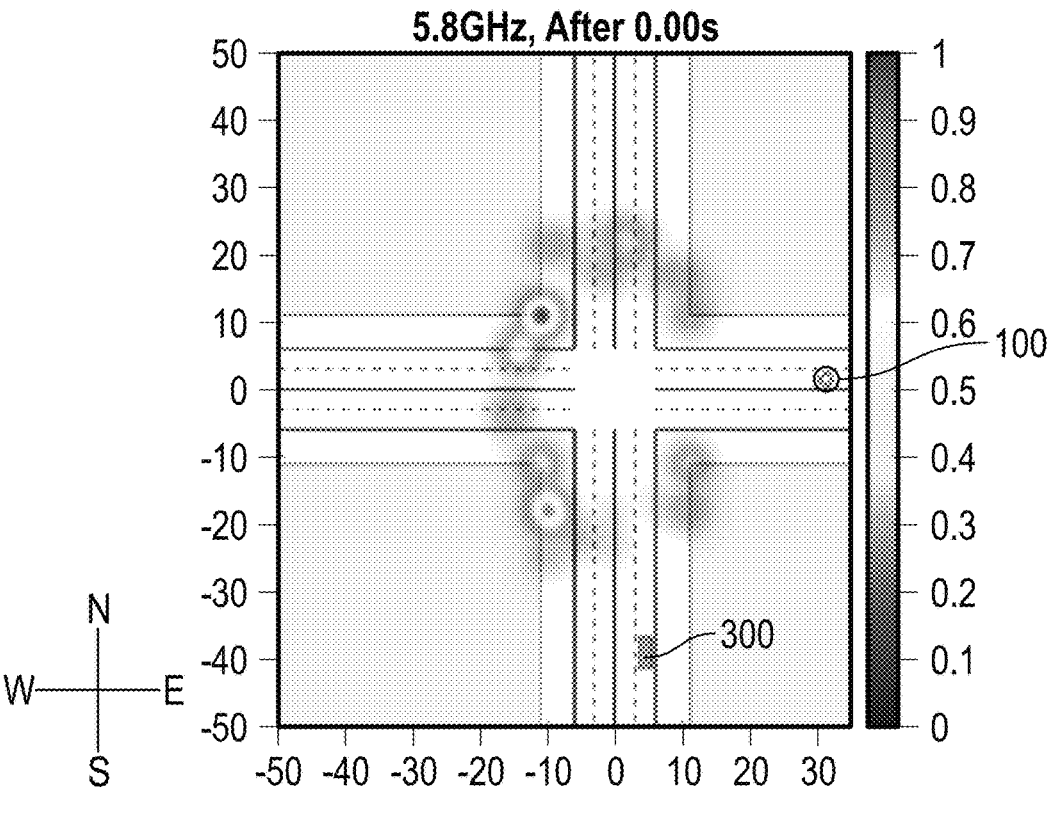
Figure 21E:
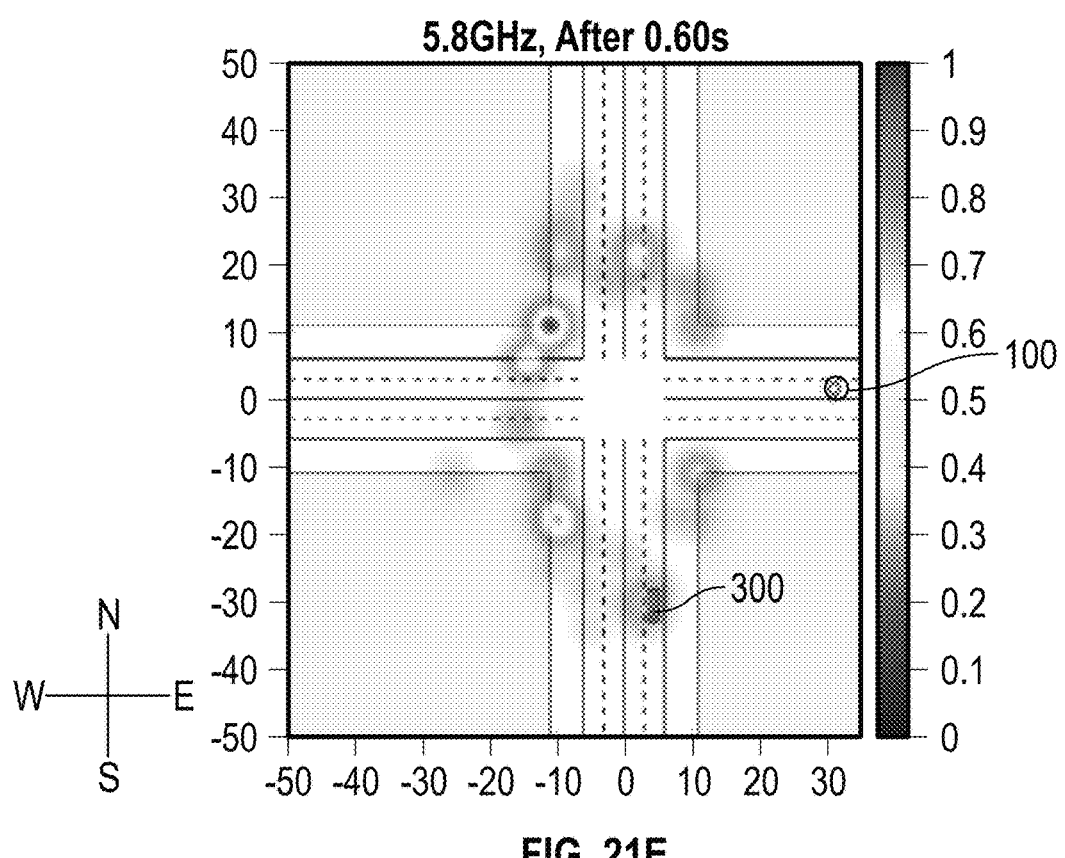
Figure 21F:
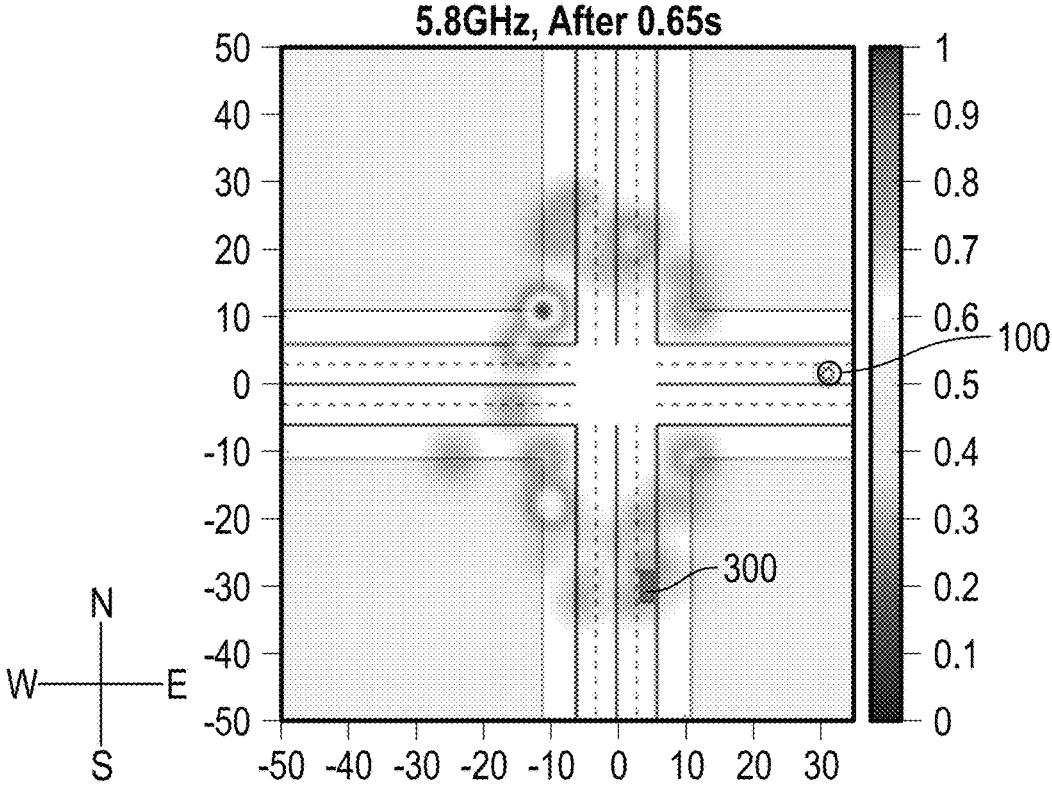

FIGS. 21A-21I are exemplary heat maps from simulations to illustrate the benefits of fusing information obtained using two radar bands (e.g., sensor fusion) and the ability of the system 100 to see around corners. A vehicle equipped with an exemplary system 100 is shown by the circle on the right-hand side of each figure. FIGS. 21A-21C show targets 130 detected using the UHF band (915 GHz), and FIGS. 21D-21F show results for the C band (5.8 GHz). (Corresponding figures for the K band are not included, nor are the targets 130 that are detected by signals in the 24 GHz band, because the K band does not reveal objects around the corner in the simulation conditions.) The strengths of the detected targets 130 are shown by the scale on the right-hand side of each figure.

FIGS. 21A and 21D show the targets 130 the system 100 detects at time zero using signals (e.g., transmitted waveforms 140 and reflected signals 148) transmitted simultaneously in the UHF and C bands, respectively. As can be seen in FIGS. 21A and 21D, the four building corners are detected by the system 100 at both the C and UHF bands. The buildings above and below the AV have strong reflections at the UHF band (and so are visible), but not at the C band. In other words, faint returns are detected immediately above and below the AV, and these faint returns can only be seen at UHF and not C band frequencies. As shown in FIGS. 21A and 21D, the car 300 that is approaching the intersection from the south (from the perspective of the AV, the car 300 approaches the intersection from the left) is not within the LOS of the system 100. Furthermore, at time zero, the car 300 is not detected as a NLOS target 130 by the system 100. In other words, the approaching vehicle, car 300, cannot be "seen" by the system 100 at time zero, when it is 40 m from the center of the intersection.

The simulations indicate that the exemplary system 100 can detect the approaching vehicle starting at around time 0.45 seconds, when the car 300 is roughly 33 m from the center of the intersection. FIGS. 21B and 21E show the targets 130 detected by the system 100 at time 0.6 seconds, and FIGS. 21C and 21F show the detected targets 130 at time 0.65 seconds. In both cases, the car 300 is approximately 30 m from the center of the intersection. At both of these times, the car 300 can be "seen" at both the UHF and C bands due to multi-path reflection and EM waves penetrating the building on the southeastern quadrant of the intersection.

Note that at all of the illustrated time instants, the building south-east of the intersection (to the left of the AV and system 100 and to the right of the car 300) completely blocks the system 100's direct view of the approaching car 300, making it a NLOS target 130. The exemplary system 100 detects the approaching car 300 because the system 100 is capable of detecting objects that are around the corner.

Finally, due to noise, clutter, etc., there are many "ghost targets" detected by the system 100 at each of the bands and at each of the times shown in FIGS. 21A through 21F. The true targets 130 can be distinguished from the ghost targets by fusing the results from the UHF and C bands. A sensor fusion algorithm can be used to combine the data from multiple bands (e.g., from a subset of bands or from all of the bands in use by the system 100). In some embodiments, the system 100 (e.g., the at least one processor 114 and/or at least one processor 128) fuses information from a diverse set of multi-modal sources of information, including multi-band radar (e.g., one or more bands thereof), LiDAR, cameras, GPS coordinates, road maps, etc. For example, to determine radar return ranges and angles for each target 130, knowledge of the surrounding scenery (e.g., vegetation, location of buildings, etc.) can be used to determine which signal returns (e.g., reflected signals 148) are LOS and which are NLOS and result from reflections, or penetrations, or both.

Figure 21G:
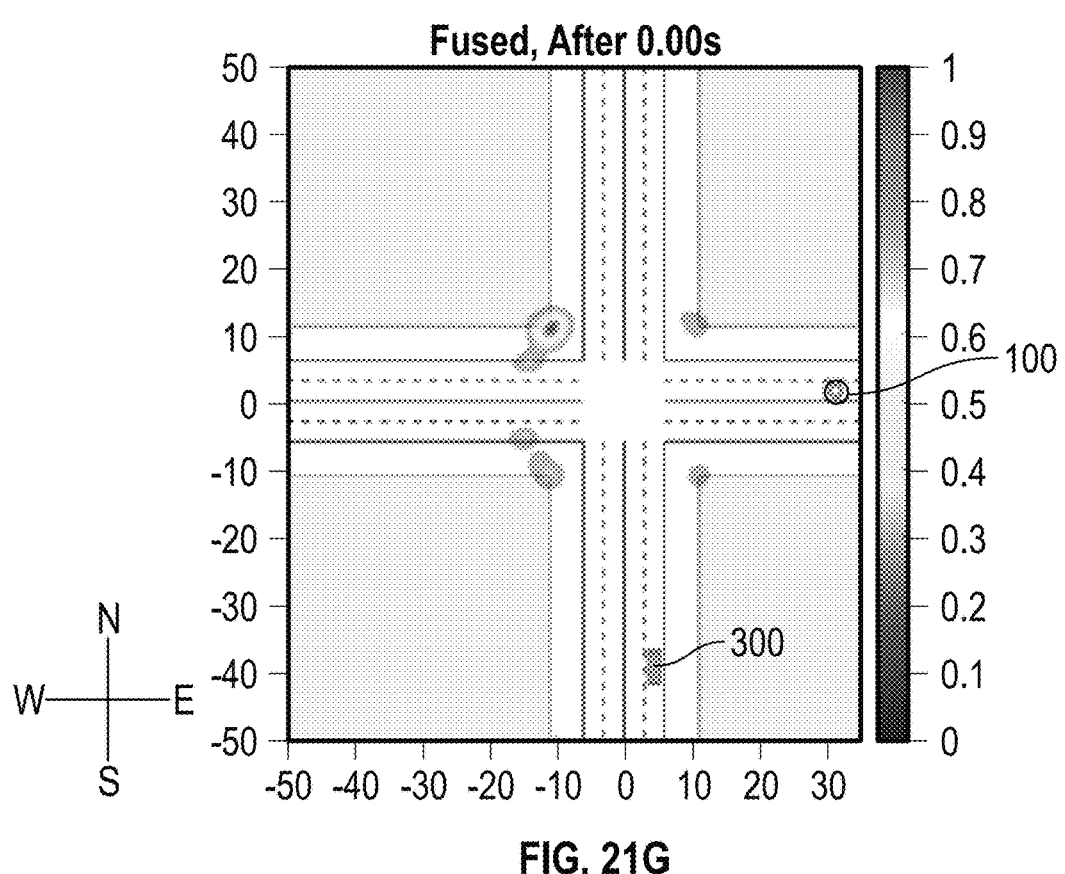
Figure 21H:
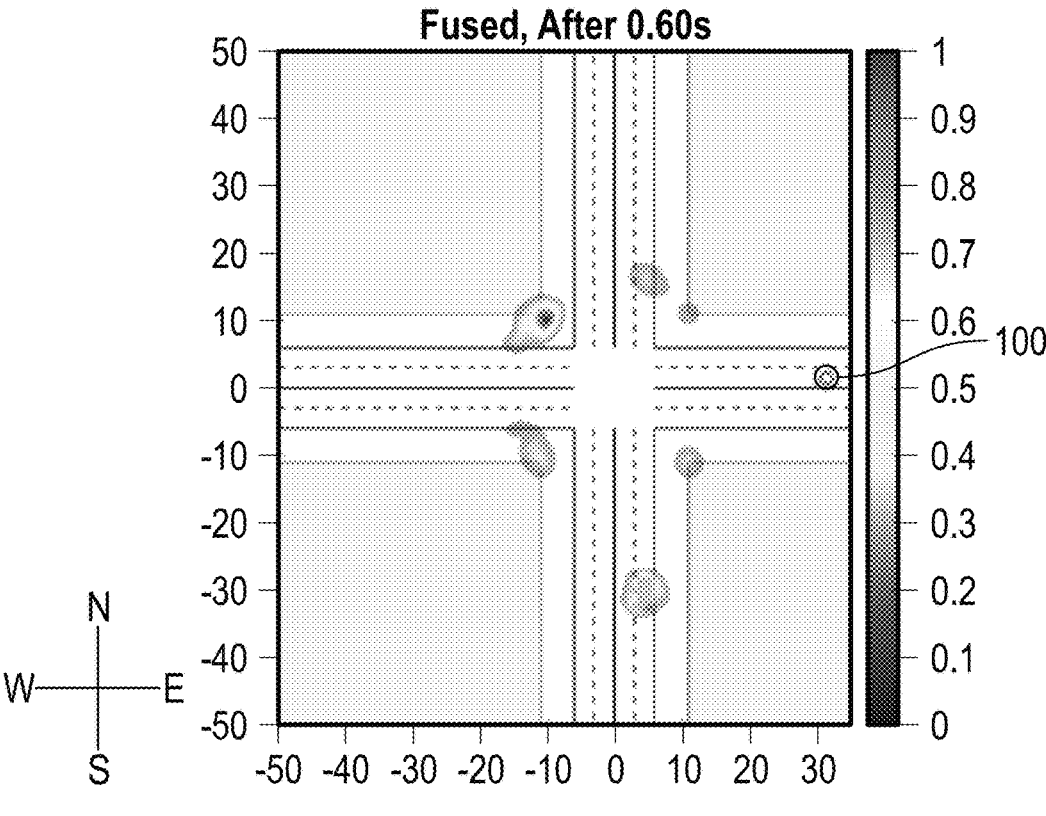
Figure 21I:
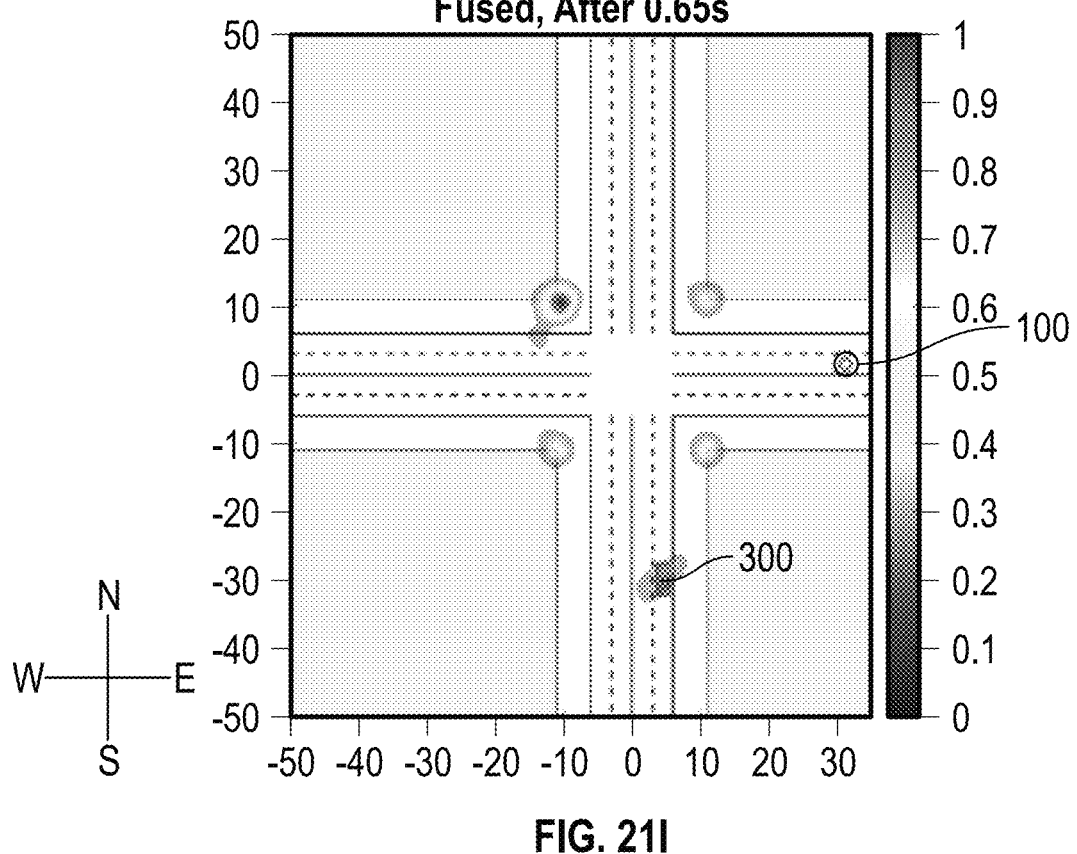

There are several approaches that can be used to implement sensor fusion. For example, Bayesian networks, which make optimal detection and estimation based on prior knowledge and current measurements, can be used. As will be appreciated by those having ordinary skill in the art, a Bayesian network (also known as a decision network) is a probabilistic graphical model that predicts the likelihood that any one of several possible known causes was the cause of an event that occurred by representing a set of variables and their conditional dependencies via a directed acyclic graph. Another option is to use deep networks (also known as deep neural networks), which are data driven (e.g., using very large data sets) and leverage past observations without the need to define bespoke features, models, or hypotheses for a problem. As will be appreciated by those having ordinary skill in the art, a deep network has many hidden layers (e.g., more than the one or two hidden layers of a conventional neural network) and can be considered to be stacked neural networks having weights, biases, nonlinear activation, and/or back-propagation. In addition, because the scene being reconstructed is dynamically changing, techniques such as particle filtering and scented Kalman filters can be used. FIGS. 21G, 21H, and 21I show the results after the system 100 fuses the data from the UHF and C bands at time instances 0.00 seconds, 0.60 seconds, and 0.65 seconds (e.g., FIG. 21G follows the fusing of data corresponding to FIG. 21A with that corresponding to FIG. 21D; FIG. 21H follows the fusing of fusing the data corresponding to FIG. 21B with that corresponding to FIG. 21E; and FIG. 21I follows the fusing of fusing the data corresponding to FIG. 21C with that corresponding to FIG. 21F). As can be seen in each of FIGS. 21G, 21H, and 21I, as a result of the fusion procedure, the only significant targets 130 remaining are the corners of the buildings around the intersection (particularly those northwest and southwest of the intersection), and the car 300 approaching the intersection from the south, which is around the corner. Thus, FIGS. 21G through 21I show that the sensor fusion process clears ghost targets from the scene.

It is to be understood that although FIGS. 21A through 21I illustrate sensor fusion using two radar bands, the disclosed techniques can be used to fuse information from different sensor types. For example, the techniques can be used to fuse information from a radar subsystem 170 with information from a LiDAR subsystem 320. Moreover, information from more than two frequency bands can be fused. For example, a system 100 may fuse information from more than two radar bands. As another example, a system 100 may fuse information from two or more radar bands used by a radar subsystem 170 with information from a band used by a LiDAR subsystem 320.

The simulation results shown and described above indicate that embodiments of the disclosed system 100 can identify and locate targets 130, such as vehicles, that are occluded by other objects, such as buildings. The simulations also demonstrate the value of the system 100's ability to operate simultaneously at multiple radar bands. The lower-frequency bands provide information that is not available at higher-frequency bands because lower-frequency EM waves penetrate through buildings, reflect better, behave less as light waves (and so provide information that is different from and complementary to that provided by LiDAR), and generally have better propagation properties, allowing longer ranges to be probed. The lower-frequency bands are also more robust to weather conditions and the orientation of the targets 130. On the other hand, the higher-frequency bands offer much higher angular resolution and can see detailed features that may be missed at lower frequencies. The use of multiple bands, and fusing the information they provide, allows the system 100 to obtain an accurate understanding of the scene to provide safe operation of autonomous vehicles.

The system 100 can include various combinations of subsystems to provide desired capabilities. For example, for AD applications, the system 100 could include, for example, (a) only a multi-band radar subsystem, (b) a multi-band radar subsystem and a LiDAR subsystem, (c) a multi-band radar subsystem, a LiDAR subsystem, and a camera subsystem. In any configuration, the system 100 can also consider other information, such as about stationary objects in a scene (e.g., their locations, material properties, etc.), such as, for example, buildings, fire hydrants, signs, guard rails, etc. The system 100 can also take into account information about temporary hazards, such as, for example, construction zones, potholes, scaffolding, etc.

Figure 22:
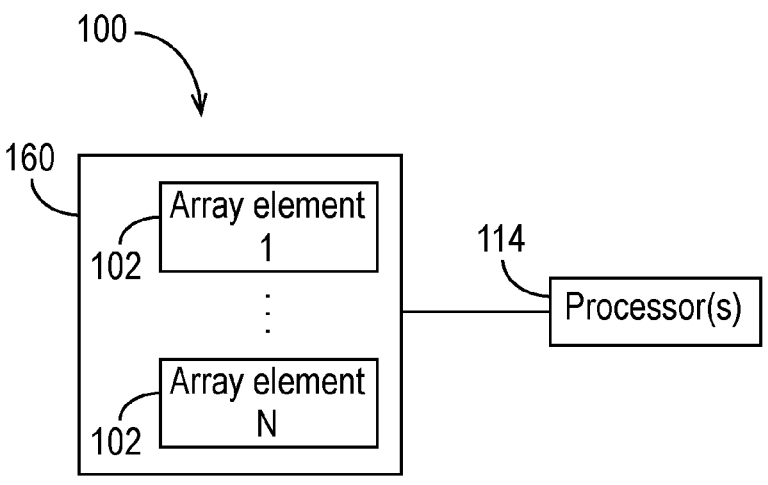
FIG. 22 is a block diagram of an exemplary system in accordance with some embodiments.

FIG. 22 is a block diagram of an exemplary system 100 in accordance with some embodiments. The exemplary system 100 comprises a sparse array 160 coupled to at least one processor 114. The sparse array 160 comprises a plurality of array elements 102. In FIG. 22, the array elements 102 are labeled 1 to N, but it is to be understood that there may be any number of at least two array elements 102. Each of the array elements 102 may be a transmit element or a receive element, or a combined transmit/receive element. For example, each of the array elements 102 may be a radar transmitter, a LiDAR transmitter, a radar receiver, a LiDAR receiver, a camera, etc. The sparse array 160 includes at least one transmit element and at least one receive element. The number of transmit elements may be the same as the number of receive elements, or there may be more or fewer transmit elements than receive elements.

The sparse array 160 may be distributed over the body of a vehicle, such as a car, as described above. The array elements 102 (e.g., transmit and receive antennas, possibly transmitting/receiving at different frequencies) of the system 100 can be embedded on/into the body of the car at various locations (e.g., the roof, the hood, the fenders, the front, the rear, the sides, around the wind shield, inside the windshield, etc.). The resulting sparse array 160 will likely be curvilinear in two dimensions, or on a curved surface having three dimensions. As discussed above, the placement of the array elements 102 should be such that there are multiple distinct pairwise differences in x, y, and z coordinates between array elements 102. The more distinct pairwise differences there are, the better the performance of the system 100 can be. Because the sparse array 160 is two- or three-dimensional, the system 100 (e.g., the at least one processor 114) will be able to estimate the elevation angles and the azimuth angles of the targets 130. The system 100 can jointly estimate the ranges, azimuth angles, and elevation angles of targets 130 using, for example, atomic norm minimization.

Figure 23:
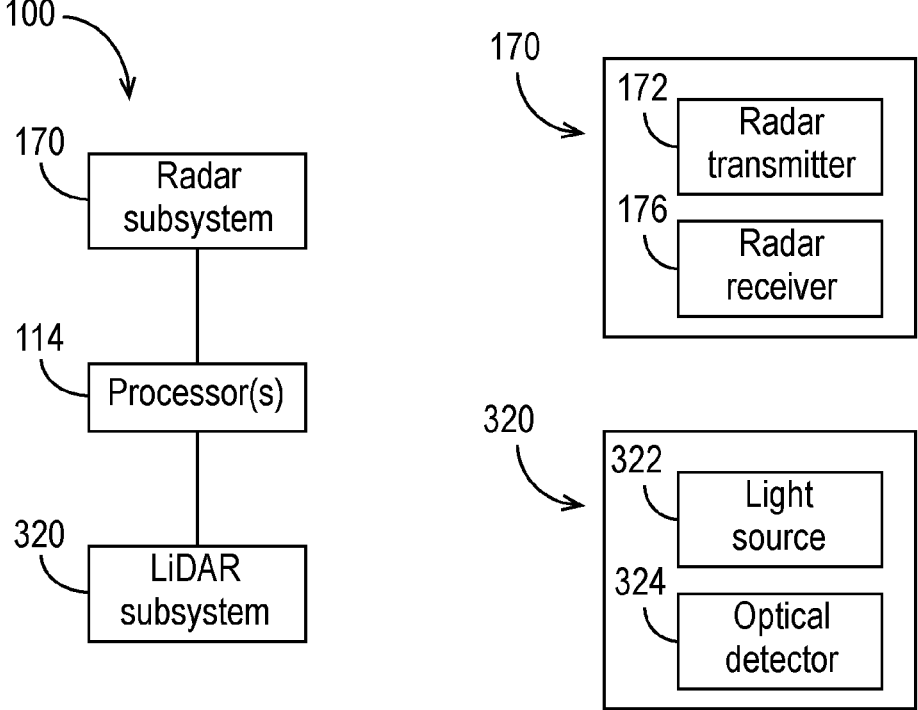
FIG. 23 illustrates another exemplary system in accordance with some embodiments.

FIG. 23 illustrates another exemplary system 100 in accordance with some embodiments. The exemplary system 100 comprises a radar subsystem 170 and a LiDAR subsystem 320, both of which are coupled to at least one processor 114. The exemplary system 100 may include other components that are not illustrated in FIG. 23. For example, the exemplary system 100 may include memory to store data collected by the radar subsystem 170 and/or the LiDAR subsystem 320.

The radar subsystem 170 comprises a plurality of transmit and receive elements, including at least one radar transmitter 172 and at least one radar receiver 176, which may be arranged in a sparse array 160 (e.g., on/within the body of a car). The number of radar transmitters 172 may be the same as the number of radar receiver 176, or there may be more or fewer radar transmitters 172 than radar receivers 176. Each radar transmitter 172 may comprise, for example, some or all of the components of the transmitter 105 shown in FIGS. 1-6 and described in the explanations thereof. Each radar receiver 176 may comprise, for example, some or all of the components of the receiver 120 shown in FIGS. 1-6 and described in the explanations thereof. The radar antenna may be shared by the radar receiver 176, or the radar receiver 176 may have a separate antenna (as described, for example, in the discussion of FIG. 9). The radar subsystem 170 may include components that are not illustrated in FIG. 23, such as, for example, the components shown in FIGS. 3 and 6 and described in the discussions thereof. Other components not described herein may also be included.

The LiDAR subsystem 320 comprises a plurality of transmit and receive elements, including at least one light source 322 and at least one optical detector 324, which may be arranged in an array (e.g., on the body of a car). The at least one light source 322 may comprise, for example, a laser. Each of the at least one optical detector 324 may comprise, for example, a photodetector (e.g., a photodiode such as an avalanche photodiode). The number of light sources 322 may be the same as the number of optical detectors 324, or there may be more or fewer light sources 322 than optical detectors 324. The LiDAR subsystem 320 may include components that are not illustrated in FIG. 23, such as, for example, the components shown and described in U.S. Pat. No. 11,047,982, the entirety of which is hereby incorporated by reference for all purposes. The LiDAR subsystem 320 may use light sources 322 and optical detectors 324 with overlapping fields of view in conjunction with sparse pulse sequences with low cross-correlation to allow the LiDAR subsystem 320 to detect targets 130 in the scene, as described in detail in U.S. Pat. No. 11,047,982. Other components not described herein or in U.S. Pat. No. 11,047,982 may also be included.

Thus, in some embodiments a system 100 for detecting targets in a scene comprises a radar subsystem 170, a LiDAR subsystem 320, and at least one processor 114 coupled to the radar subsystem 170 and to the LiDAR subsystem 320. The LiDAR subsystem 320 comprises a light source configured to emit a light signal and an optical detector configured to detect reflections of the emitted light signal. The radar subsystem 170 comprises a radar transmitter configured to transmit a radar signal and a radar receiver configured to detect reflections of the transmitted radar signal. The at least one processor 114 is configured to execute at least one machine-executable instruction that, when executed, causes the at least one processor 114 to obtain a representation of a reflection of the emitted light signal from the LiDAR subsystem 320, obtain a representation of a reflection (e.g., reflected signals 148) of the transmitted radar signal from the radar subsystem 170, and based at least in part on the representation of the reflection of the emitted light signal and the representation of the reflection of the transmitted radar signal, determine a location of at least one target 130 in the scene.

The radar subsystem 170 may comprise at least one radio-frequency signal generator and at least one antenna, as described above. In some embodiments, the radar subsystem 170 includes a sparse array 160 distributed over a body of a vehicle, wherein the sparse array 160 comprises a plurality of radar transmitters 172 and plurality of radar receivers 176. The sparse array 160 may be three-dimensional and/or nonuniformly distributed as described herein.

In some embodiments, the radar subsystem 170 is capable of operating simultaneously in at least two radar bands, such as, for example, two or more of the L, S, W, X, C, K, Ka, Ku, or UHF bands. For example, the radar subsystem 170 may be capable of operating simultaneously in the W or X band and in the UHF band.

In some embodiments, the LiDAR subsystem 320 comprises an optical array that has a plurality of optical components, wherein the plurality of optical components includes a plurality of light sources 322 and a plurality of optical detectors 324. In some embodiments, at least two optical components of the plurality of optical components are noncollinear.

Figure 24:
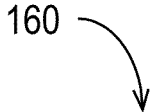
FIG. 24 illustrates a portion of system that includes an exemplary sparse array in accordance with some embodiments.
Figure 24:
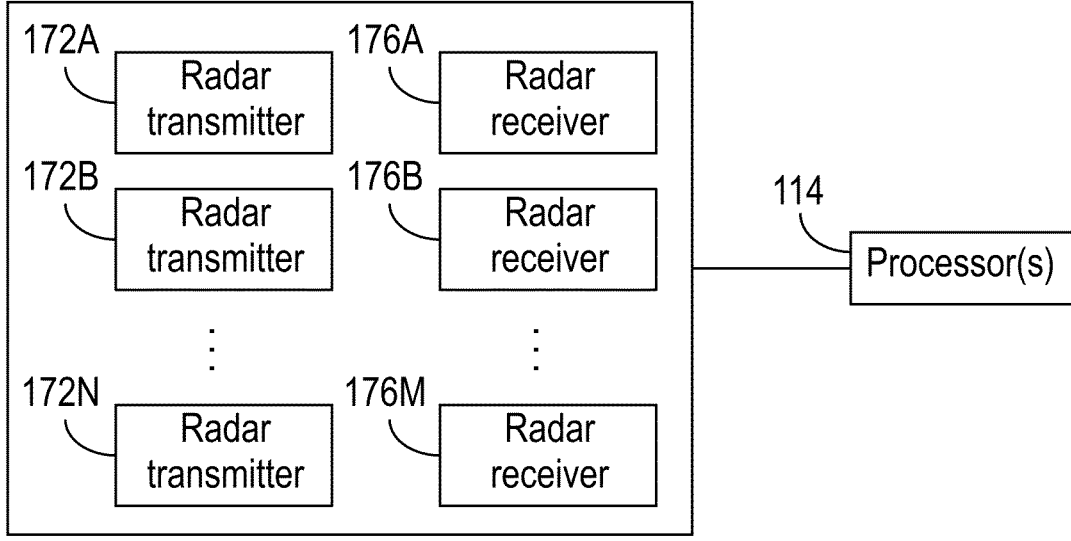

FIG. 24 illustrates a portion of system 100 that includes an exemplary sparse array 160 in accordance with some embodiments. The exemplary sparse array 160 comprises a plurality of radar transmitters 172 and a plurality of radar receivers 176. FIG. 24 shows at least three radar transmitters 172 in the exemplary sparse array 160, namely the radar transmitter 172A, the radar transmitter 172B, and the radar transmitter 172N. In some embodiments, the plurality of radar transmitters 172 in the sparse array 160 is capable of transmitting radar signals in multiple bands (e.g., at least two of L, S, X, C, K, Ka, Ku, W, UHF, etc.) as described above to implement a multi-band radar system. It is to be understood that the use in FIG. 24 of the reference numerals 172A, 172B, and 172N for the radar transmitters 172 is for convenience and not to suggest that the sparse array 160 necessarily includes exactly 14 radar transmitters 172. As explained above, the sparse array 160 can have any number of radar transmitters 172. In the case the sparse array 160 is used in a system 100 that uses multiple radar bands simultaneously, the number of radar transmitters 172 is greater than 1.

The exemplary sparse array 160 shown in FIG. 24 also includes a plurality of radar receivers 176. FIG. 24 shows at least three radar receivers 176 in the exemplary sparse array 160, namely the radar receiver 176A, the radar receiver 176B, and the radar receiver 176M. In some embodiments, the plurality of radar receivers 176 in the sparse array 160 is capable of detecting radar signals in multiple bands (e.g., two or more of L, S, X, C, K, Ka, Ku, W, UHF, etc.) as described above to implement a multi-band radar system. It is to be understood that the use in FIG. 24 of the reference numerals 176A, 176B, and 176M for the radar receivers 176 is for convenience and not to suggest that the sparse array 160 necessarily includes exactly 13 radar receivers 176. As explained above, the sparse array 160 can have any number of radar receivers 176. In the case the sparse array 160 is used in a system 100 that uses multiple radar bands simultaneously, the number of radar receivers 176 is greater than 1.

Thus, in some embodiments, a system 100 comprises at least one processor 114 and a sparse array 160 for emitting probing signals and detecting reflected signals in a scene. The sparse array 160 may be distributed over the body of a car. The sparse array 160 comprises a plurality of array elements, each of which is capable of transmitting and/or receiving signals. Among the plurality of array elements are at least one element capable of transmitting signals (e.g., transmitter 105) and at least one element capable of receiving signals (e.g., receiver 120). In some embodiments, a first array element of the sparse array 160 is situated in a first location having a first set of three-dimensional coordinates (X1, Y1, Z1), and a second array element of the sparse array 160 is situated in a second location having a second set of three-dimensional coordinates (X2, Y2, Z2), wherein X1≠X2 and/or Y1≠Y2 and/or Z1≠Z2. In some embodiments, X1≠X2 and Y1≠Y2 and Z1≠Z2. In some embodiments, the first and second locations may be a roof, a hood, a front, a bumper, a fender, a rear, a trunk, a left side, a right side, a windshield, or any other location on a car.

In some embodiments, the sparse array 160 is three-dimensional. In some embodiments, the sparse array 160 is nonuniformly distributed, meaning that at least some of the pairwise distances between nearest-neighbor elements of the sparse array 160 are different from each other. In some embodiments, the pairwise distances between nearest-neighbor elements of the sparse array 160 are unique.

In some embodiments, the sparse array 160 is capable of transmitting and receiving in multiple radar bands simultaneously (e.g., two or more of L, S, W, X, C, K, Ka, Ku, UHF, etc.). In some embodiments, the sparse array 160 comprises a first radar transmitter 172A and a first radar receiver 176A. In such embodiments, the sparse array 160 can also include a second radar transmitter 172B and a second radar receiver 176B, such that the radar transmitter 172A is configured to transmit in a first radar band (e.g., K or C), and the radar receiver 176A is configured to receive in the first radar band, and the radar transmitter 172B is configured to transmit in a second radar band (e.g., UHF) that is different from the first radar band, and the radar receiver 176B is configured to receive in the second radar band.

The at least one processor 114 is configured to execute at least one machine-executable instruction that, when executed, causes the at least one processor 114 to collect a plurality of reflected signals (e.g., reflected signals 148) detected by the sparse array 160, and, based at least in part on the plurality of reflected signals, estimate a position (e.g., range and/or angle (e.g., azimuth or elevation)) of at least one target 130 in the scene. In some embodiments, the at least one processor 114 jointly estimates the range, azimuth angle, and elevation angle to estimate the position of the at least one target 130. The joint estimation may comprise computing or minimizing an atomic norm. In some embodiments, the at least one processor 114 estimates the position of the at least one target 130 in part by denoising at least a portion of the plurality of reflected signals (e.g., by determining or minimizing an atomic norm), performing a correlation of the denoised at least a portion of the plurality of reflected signals, and identifying at least one peak in a result of the correlation. In some embodiments, the at least one processor 114 estimates the position of the at least one target in the scene in part by performing a correlation, and identifying at least one peak in a result of the correlation In some embodiments, the system 100 may also include a LiDAR subsystem 320 that has at least a first light source 322A and a first optical detector 324B. The first light source 322A may be configured to emit a first pulse sequence during a first time window. The first pulse sequence may be sparse. In some embodiments, the LiDAR subsystem 320 also includes a second light source 322B and a second first optical detector 324B. The second light source 322B may be configured to emit a second pulse sequence at the same time the 322A emits the first pulse sequence (e.g., during the first time window). The second pulse sequence may be sparse. In some embodiments, the second pulse sequence is different from the first pulse sequence. The first and second pulse sequences may be substantially uncorrelated with each other (e.g., they have low cross-correlation). The first and second pulse sequences may be substantially white.

Figure 25:
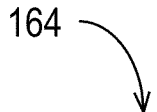
FIG. 25 illustrates a portion of a system that includes an exemplary optical array of the LiDAR subsystem in accordance with some embodiments.
Figure 25:
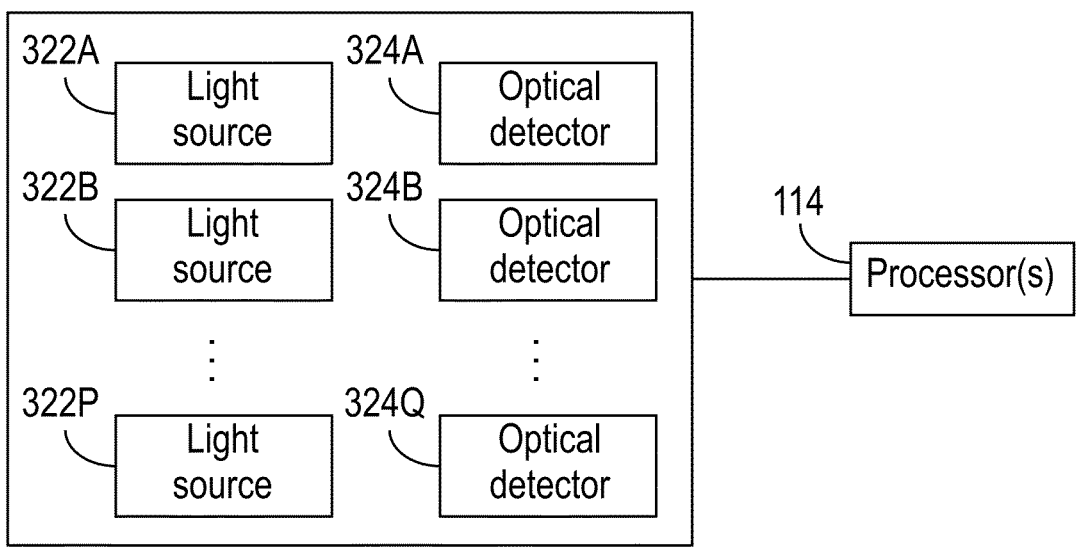

FIG. 25 illustrates a portion of a system 100 that includes an exemplary optical array 164 of the LiDAR subsystem 320 in accordance with some embodiments. The exemplary optical array 164 comprises a plurality of light sources 322 and a plurality of optical detectors 324. It is to be understood that, as explained in U.S. Pat. No. 11,047,982, the optical array 164 can provide high accuracy target detection using a variety of numbers of light sources 322 and optical detectors 324 (e.g., as few as one light source 322 or as few as one optical detector 324), as long as certain conditions regarding the total number of elements in the optical array 164 and their positions relative to each other are met. FIG. 25 shows at least three light sources 322 in the optical array 164, namely the light source 322A, the light source 322B, and the light source 322P. In some embodiments, the plurality of light sources 322 in the optical array 164 is capable of emitting light signals having multiple wavelengths and/or using different pulse sequences, as described in U.S. Pat. No. 11,047,982. In some embodiments, the optical array 164 assists in implementing multiple-input, multiple-output (MIMO) LiDAR as described in U.S. Pat. No. 11,047,982. It is to be understood that the use in FIG. 25 of the reference numerals 322A, 322B, and 322P is for convenience and not to suggest that the optical array 164 necessarily includes exactly 16 light sources 322. The optical array 164 can have any number of light sources 322 greater than 0, as described in U.S. Pat. No. 11,047,982.

The optical array 164 shown in FIG. 25 also includes a plurality of optical detectors 324. FIG. 25 shows at least three optical detectors 324 in the optical array 164, namely the optical detector 324A, the optical detector 324B, and the optical detector 324Q. In some embodiments, the plurality of optical detectors 324 in the optical array 164 is capable of detecting light at multiple wavelengths and in accordance with disparate pulse sequences (e.g., which may be substantially uncorrelated with each other), as described in U.S. Pat. No. 11,047,982. It is to be understood that the use in FIG. 25 of the reference number 324A, 324B, and 324Q is for convenience and not to suggest that the optical array 164 necessarily includes exactly 17 optical detectors 324. The optical array 164 can have any number of optical detectors 324 greater than 0, as described in U.S. Pat. No. 11,047,982.

FIG. 26A is a flow diagram of an exemplary method 200 of identifying the positions of targets 130 in a scene in accordance with some embodiments. The exemplary method 200 may be performed, for example, by one or more of the embodiments of the system 100 described herein. At block 202, a plurality of scanning signals (e.g., transmitted waveforms 140) is transmitted (e.g., by a radar subsystem 170). The scanning signals may be radar signals transmitted in distinct bands at different frequencies (e.g., L, S, X, C, K, Ka, Ku, W, UHF, etc.) as described above to allow the system 100 implementing the exemplary method 200 to see around corners and provide high accuracy detection of targets 130. For example, a first scanning signal may be transmitted in the C or K band, and a second scanning signal may be transmitted in the UHF band. Scanning signals can be sent at multiple times or during multiple time intervals. Similarly, multiple pluralities of reflected signals can be collected (e.g., received) at multiple times or during multiple time intervals.

At block 204, a plurality of reflected signals (e.g., reflected signals 148) is collected (e.g., received by a radar subsystem 170). At block 206, a classification for each of a least a subset of the plurality of reflected signals is determined. The classification may result in each of the reflected signals in the subset being deemed, for example, a LOS return, a multipath return, or a through-building return. Thus, in some embodiments, as a result of the classification, each reflected signal in the at least a subset is classified as a LOS return, a multipath return, or a through-building return.

At block 208, a projected position (e.g., range/distance and angle (e.g., elevation and/or azimuth) of a target 130 in the scene is determined based on the at least a subset of the plurality of reflected signals and the classification (e.g., LOS, multipath, through-building) of each signal in the at least a subset of the plurality of reflected signals. Optionally, information 210 about one or more stationary objects in the scene (e.g., positions, locations, and/or orientations of buildings, telephone poles, fire hydrants, and other fixed (permanent or temporary) obstacles, information about materials used in or properties of stationary objects, etc.) can be considered at block 208 to determine the projected position of the target 130 in the scene. The method 200 can be used to detect a plurality of targets 130 in a scene.

FIG. 26B is a flow diagram of an example procedure that can be performed to carry out the determination at 208 of FIG. 26A in accordance with some embodiments. At block 212, a probability is determined for each of a plurality of candidate positions of a target 130. The respective probability corresponding to each candidate position is the likelihood that the target 130 is in that candidate position. In other words, the result of block 212 is a set of candidate positions, each associated with a respective probability representing the likelihood that the target 130 is at that candidate position. At block 214, the largest probability is identified. At block 216, the projected position of the target 130 is chosen as the candidate position corresponding to the largest probability identified at block 214. In other words, after determining the probability of the target 130 being at each of the candidate positions, the candidate position having the largest probability is selected as the projected position of the target 130. The probabilities can be updated based on reflected signals collected at different times or in different time intervals to account for motion of a device or system implementing the method 200 and/or changes in position, location, or orientation (e.g., relative to the device or system implementing the method) of the target 130, other objects, and obstacles.

A system 100 can implement the exemplary method 200. The system 100 may be integrated into a vehicle, such as, for example, a car. In some embodiments, a system 100 configured to perform the exemplary method 200 comprises a radar subsystem 170 configured to transmit the plurality of scanning signals and collect the plurality of reflected signals (e.g., blocks 202 and 204 of the exemplary method 200), and at least one processor 114 that is coupled to the radar subsystem 170 and is configured to execute one or more machine-executable instructions that, when executed, cause the at least one processor 114 to perform blocks 206 and 208 of the exemplary method 200. The radar subsystem 170 may be capable of transmitting a first subset of the plurality of scanning signals in a first radar band (e.g., a lower-frequency band) during a first time period and transmitting a second subset of the plurality of scanning signals in a second (different) radar band (e.g., a higher-frequency band) during a second time period. In some embodiments, the radar subsystem 170 comprises a plurality of transmit elements (e.g., antennas, transmitters 105, etc.) and a plurality of receive elements (e.g., antennas, receivers 120) situated on and/or within the body of a vehicle (e.g., a car). In some embodiments, the radar subsystem 170 comprises a sparse array 160 that comprises a plurality of transmit elements and a plurality of receive elements. In some embodiments, the sparse array 160 is three-dimensional. In some embodiments, the sparse array 160 is nonuniformly distributed, meaning that at least some of the pairwise distances between nearest-neighbor elements of the sparse array 160 are different from each other. In some embodiments, the pairwise distances between nearest-neighbor elements of the sparse array 160 are unique.

In some embodiments, the system 100 implementing the exemplary method 200 also comprises a LiDAR subsystem 320 configured to transmit a plurality of optical signals and to collect a second plurality of reflected signals, and the at least one processor 114 determines the projected position of the target further based on the second plurality of reflected signals. In other words, in some embodiments, the at least one processor 114 performs sensor fusion using both radar return signals and LiDAR return signals. The system 100 may be integrated into a vehicle, such as, for example a car.

It is to be understood that in the embodiments described herein in which a transmitter has multiple transmitter elements or a receiver has multiple receiver sensors, and in contrast to conventional antenna arrays, the spacing between adjacent elements or sensors (e.g., antenna elements) in an array (whether for transmitting or receiving) need not be the same, although it can be. In conventional systems, even a slight variation in the distances between antenna elements results in undesirable sidelobes, which can cause many potential issues, such as false detection and vulnerability to the presence of strong interfering signals (e.g., jammer signals). In contrast to conventional antenna arrays, in which the antenna elements are spaced half a wavelength from each other to minimize sidelobes (where the wavelength is that of the transmitted/received signal used to detect targets), in the embodiments disclosed herein, there is no requirement that the elements (transmitter elements or receive sensors (e.g., antennas)) be any particular distance from each other. Thus, although the spacing may be regular (e.g., half of a wavelength as in conventional systems), the sensors may alternatively be placed at whatever spacing is convenient. When the transmitter elements (e.g., antennas) are not spaced at half-wavelength distances from one another, the systems and methods disclosed herein are able to take advantage of sidelobe energy as part of a broader transmit pulse in a wide spatial sense, as opposed to a narrow beam from the transmit beamformer of a conventional radar system.

Similarly, in embodiments including more than one transmitter element or more than one receiver sensor, neither the transmitter elements nor the receiver sensors in the systems disclosed herein need be collocated, although they can be. For example, some transmitter elements may be disposed in a first location, and other transmitter elements may be disposed in a second location. As another example, some receiver sensors may be disposed in a first location, and other receiver sensors may be disposed in a second location. Taking, for example, an embodiment in which a receiver sensor array is mounted on a car, some of the elements or sensors of the array may be mounted on, for example, the car's front bumper, others may be mounted on, for example, the car's roof, and still others may be mounted on, for example, the car's rear bumper. The receiver sensors may be positioned wherever it is convenient. Likewise, the transmitter elements may be positioned wherever it is convenient.

Each of the at least one processor 114 and at least one processor 128 may comprise, for example, a processing unit, memory for storing program code executed by the processing unit to effect the various methods and techniques of the above-described embodiments, and also to configure data or other information for effecting various programmed or configuration settings in accordance with the embodiments described above. Note that the processing unit itself may be implemented by a general or special purpose processor (or set of processing cores) and thus may execute sequences of programmed instructions to effectuate the various operations associated with controlling and/or synchronizing the operation of components of, for example, the radar subsystem 170, and LiDAR subsystem 320, and other components of the system 100. Each of the at least one processor 114 and at least one processor 128 may be implemented as a stand-alone processor (e.g., digital signal processor (DSP)), controller, CPU, or as a custom-built hardware (e.g., application-specific integrated circuit (ASIC)), or programmed on a programmable hardware device such as a field-programmable gate array, or any combination thereof within or external to the system 100.

The techniques disclosed herein and/or user interfaces for configuring and managing them may be implemented by machine execution of one or more sequences instructions (including related data necessary for proper instruction execution). Such instructions may be recorded on one or more non-transitory computer-readable media for later retrieval and execution within one or more processors of a special purpose or general purpose computer system or consumer electronic device or appliance, such as the system 100 (e.g., implemented in a vehicle, such as a car). Computer-readable media in which such instructions and data may be embodied include, but are not limited to, non-volatile storage media such as fixed or removable magnetic, optical, or semiconductor-based recording media to store executable code and related data, and volatile storage media such as static or dynamic RAM to store more transient information and other variable data.

In the foregoing description and in the accompanying drawings, specific terminology has been set forth to provide a thorough understanding of the disclosed embodiments. In some instances, the terminology or drawings may imply specific details that are not required to practice the invention.

It is to be understood that the use of a rectangular coordinate system to describe various aspects of the disclosure is for convenience and is not intended to be limiting. Other coordinate systems could be used.

Although this disclosure is presented primarily in the context of autonomous driving, it is to be appreciated that, in general, any system that uses reflected signals to identify a target, its distance from the sensor, its angle of arrival (abbreviated as AoA, and also referred to in the art more generally as the direction of arrival (DOA)), its velocity (direction and/or speed of movement, e.g., from Doppler shift), and/or its composition of material can benefit from the disclosures herein, as will be appreciated by those having ordinary skill in the art.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used herein, the terms "target" and "object" are used interchangeably unless the context indicates otherwise.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales (e.g., if the units of a measurement are meters, two features having lengths of 1.000 m and 1.001 m would have substantially equal lengths). As another example, a structure that is "substantially vertical" would be considered to be vertical for all practical purposes, even if it is not precisely at 90 degrees relative to horizontal.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A method of identifying positions of targets in a scene, the method comprising:

transmitting a plurality of scanning signals;

collecting a plurality of reflected signals;

determining a respective classification for each signal of at least a subset of the plurality of reflected signals, wherein at least one signal of the subset is classified as a through-building return; and based at least in part on (a) the at least the subset of the plurality of reflected signals, and (b) the respective classification for each signal of the at least the subset of the plurality of reflected signals, determining a projected position of a target in the scene.

2. The method recited in claim 1, wherein the respective classification each signal of the subset is one and only one of: line-of-sight, multipath, or through-building.

3. The method recited in claim 1, wherein determining the respective classification for each signal of the at least the subset of the plurality of reflected signals comprises determining, for a particular reflected signal of the at least the subset of the plurality of reflected signals, one or more of:

(i) a frequency of bands in which another reflected signal having a substantially similar time of flight and/or angle of arrival to the particular reflected signal is observed, (ii) a number of bands in which the another reflected signal having the substantially similar time of flight and/or angle of arrival to the particular reflected signal is observed, (iii) whether a strength of the particular reflected signal exceeds a threshold, (iv) a rate of change over time of an angle of arrival and/or a time of flight of the particular reflected signal, or (v) a polarization of the particular reflected signal.

4. The method recited in claim 1, wherein determining the projected position of the target is further based on information about at least one stationary object in the scene.

5. The method recited in claim 4, wherein the information about the at least one stationary object in the scene comprises at least one of: a location of the at least one stationary object, a position of the at least one stationary object, an orientation of the at least one stationary object, or a material of the at least one stationary object.

6. The method recited in claim 4, wherein the at least one stationary object includes a building.

7. The method recited in claim 1, wherein the plurality of scanning signals are radar signals.

8. The method recited in claim 1, wherein collecting the plurality of reflected signals comprises receiving the plurality of reflected signals.

9. The method recited in claim 1, wherein the projected position represents a range and an angle.

10. The method recited in claim 1, wherein determining the projected position of the target comprises:

determining a plurality of probabilities for a plurality of candidate positions of the target, each of the plurality of probabilities corresponding to a respective one of the plurality of candidate positions, each of the plurality of probabilities representing a likelihood that the target is in the respective one of the plurality of candidate positions, identifying a largest one of the plurality of probabilities, and choosing, as the projected position of the target, a particular one of the plurality of candidate positions that corresponds to the largest one of the plurality of probabilities.

11. The method recited in claim 10, wherein the at least the subset of the plurality of reflected signals is a first at least the subset of the plurality of reflected signals, wherein each of the first at least the subset of the plurality of reflected signals corresponds to a first time or a first time interval, and further comprising:

updating the plurality of probabilities based at least in part on a second at least the subset of the plurality of reflected signals, wherein each of the second at least the subset of the plurality of reflected signals corresponds to a second time or a second time interval.

12. The method recited in claim 1, wherein a first reflected signal of the plurality of reflected signals comprises a reflection of a first radar signal transmitted in a first frequency band, and a second reflected signal of the plurality of reflected signals comprises a reflection of a second radar signal transmitted in a second frequency band, wherein the first and second frequency bands are disjoint.

13. The method recited in claim 12, wherein the first frequency band is a L, S, W, X, C, K, Ka, Ku, or UHF band.

14. The method recited in claim 12, wherein the first frequency band is a C or K band, and the second frequency band is a UHF band.

15. A system for identifying positions of targets in a scene, the system comprising:

a radar subsystem configured to transmit a plurality of scanning signals and collect a plurality of reflected signals; and at least one processor coupled to the radar subsystem and configured to execute at least one machine-executable instruction that, when executed, causes the at least one processor to:

determine a respective classification for each signal of at least a subset of the plurality of reflected signals, wherein at least one signal of the subset is classified as a through-building return, and determine a projected position of a target in the scene based at least in part on (i) the at least the subset of the plurality of reflected signals, and (ii) the respective classification for each signal of the at least the subset of the plurality of reflected signals.

16. The system recited in claim 15, wherein the radar subsystem is capable of transmitting a first subset of the plurality of scanning signals in a first radar band during a first time period and transmitting a second subset of the plurality of scanning signals in a second radar band during the first time period, wherein the first radar band differs from the second radar band.

17. The system recited in claim 16, wherein the radar subsystem comprises a plurality of transmitters and a plurality of receivers situated on and/or within a body of a vehicle.

18. The system recited in claim 15, wherein the radar subsystem comprises a sparse array, the sparse array comprising a plurality of transmit elements and a plurality of receive elements.

19. The system recited in claim 18, wherein the plurality of transmit elements and the plurality of receive elements are distributed over and/or within a body of a vehicle.

20. The system recited in claim 18, wherein the sparse array is three-dimensional.

21. The system recited in claim 18, wherein the sparse array is nonuniformly distributed.

22. The system recited in claim 15, wherein the plurality of reflected signals is a first plurality of reflected signals, and wherein the system further comprises:

a light detection and ranging (LiDAR) subsystem configured to transmit a plurality of optical signals and collect a second plurality of reflected signals, and wherein, when executed, the at least one machine-executable instruction causes the at least one processor to determine the projected position of the target further based on the second plurality of reflected signals.

23. A vehicle comprising the system recited in claim 15.

* * * * *